United States Patent
Pani et al.

(10) Patent No.: US 8,358,614 B2
(45) Date of Patent: Jan. 22, 2013

(54) METHOD AND APPARATUS FOR HANDLING UPLINK TRANSMISSIONS USING MULTIPLE UPLINK CARRIERS

(75) Inventors: Diana Pani, Montreal (CA); Paul Marinier, Brossard (CA); Christopher R. Cave, Montreal (CA); Benoit Pelletier, Montreal (CA); Fengjun Xi, Huntington Station, NY (US)

(73) Assignee: InterDigital Patent Holdings, Inc., Wilmington, DE (US)

( * ) Notice: Subject to any disclaimer, the term of this patent is extended or adjusted under 35 U.S.C. 154(b) by 373 days.

(21) Appl. No.: 12/610,302

(22) Filed: Oct. 31, 2009

(65) Prior Publication Data

US 2010/0157895 A1 Jun. 24, 2010

Related U.S. Application Data

(60) Provisional application No. 61/109,978, filed on Oct. 31, 2008, provisional application No. 61/141,638, filed on Dec. 30, 2008, provisional application No. 61/159,659, filed on Mar. 12, 2009, provisional application No. 61/168,451, filed on Apr. 10, 2009, (Continued)

(51) Int. Cl.
H04W 4/00 (2009.01)

(52) U.S. Cl. ...... 370/328; 370/310.2; 370/339; 455/13.3; 455/59; 455/303; 455/422.1; 375/260; 375/349

(58) Field of Classification Search ...... 370/208–210, 370/281, 295, 310.2, 319, 328–339, 343, 370/344, 349, 358, 391, 436, 478, 480, 481, 370/535, 536, 542–544; 455/13.3, 59, 60, 455/112, 216, 303–306, 422.1; 375/229, 375/260–267, 349
See application file for complete search history.

(56) References Cited

U.S. PATENT DOCUMENTS

| 7,701,922 | B2 * | 4/2010 | Terry | 370/349 |
|---|---|---|---|---|
| 2004/0185892 | A1 | 9/2004 | Iacono et al. | |
| 2006/0039312 | A1 * | 2/2006 | Walton et al. | 370/319 |
| 2006/0268884 | A1 * | 11/2006 | Terry et al. | 370/394 |
| 2006/0268938 | A1 | 11/2006 | Terry | |
| 2006/0274712 | A1 | 12/2006 | Malladi et al. | |
| 2006/0280142 | A1 | 12/2006 | Damnjanovic et al. | |
| 2007/0014229 | A1 * | 1/2007 | Hepler et al. | 370/208 |
| 2007/0073895 | A1 * | 3/2007 | Sebire et al. | 709/230 |

(Continued)

FOREIGN PATENT DOCUMENTS

EP 1901494 A1 3/2008

OTHER PUBLICATIONS

3GPP TS 25.321 v8.3.0 (Sep. 2008), 3GPP Technical Specification Group Radio Access Network, Medium Access Control (MAC) protocol specification (Release 8), Sep. 2008, 3GPP.*

(Continued)

Primary Examiner — Hoon J Chung
(74) Attorney, Agent, or Firm — Condo Roccia LLP

(57) ABSTRACT

A method and an apparatus for uplink transmission using multiple uplink carriers are disclosed. A wireless transmit/receive unit (WTRU) selects a dedicated channel medium access control (MAC-d) flow with highest priority data to be transmitted and performs uplink carrier selection and enhanced dedicated channel (E-DCH) transport format combination (E-TFC) restriction and selection to select a carrier among a plurality of carriers and select an E-TFC based on a maximum supported payload, a remaining scheduled grant payload of the selected carrier and a remaining non-scheduled grant payload. The WTRU then generates a medium access control (MAC) protocol data unit (PDU) for E-DCH transmission via the selected carrier based on the selected E-TFC.

8 Claims, 10 Drawing Sheets

Related U.S. Application Data provisional application No. 61/218,208, filed on Jun. 18, 2009, provisional application No. 61/232,351, filed on Aug. 7, 2009, provisional application No. 61/235,995, filed on Aug. 21, 2009, provisional application No. 61/248,289, filed on Oct. 2, 2009, provisional application No. 61/250,804, filed on Oct. 12, 2009.

(56) References Cited

U.S. PATENT DOCUMENTS

| | | | |
|---|---|---|---|
| 2007/0109964 | A1 | 5/2007 | Kwak et al. |
| 2007/0155335 | A1* | 7/2007 | Love et al. ............... 455/69 |
| 2008/0069035 | A1 | 3/2008 | Pinheiro et al. |
| 2008/0159184 | A1* | 7/2008 | Niwano ................ 370/278 |
| 2008/0273463 | A1* | 11/2008 | Whitehead et al. ......... 370/235 |
| 2009/0103450 | A1* | 4/2009 | Peisa et al. ............. 370/253 |
| 2009/0154403 | A1* | 6/2009 | Niwano ................ 370/329 |
| 2009/0285187 | A1* | 11/2009 | Leroy et al. ............ 370/336 |

OTHER PUBLICATIONS

"Dual-Cell HSDPA operation on adjacent carriers," 3GPP TSG RAN #40, RP-080490 (May 27-30, 2008).
Alcatel-Lucent, "On Greedy Filling Power Allocation in E-TFC Selection for DC-HSUPA," 3GPP TSG-RAN WG2 Meeting #67, R2-09XXXX (Aug. 2009).
Ericsson et al., "DC-HSUPA—E-TFC selection system simulation results," 3GPP TSG RAN WG1 Meeting #57bis, R1-092762 (Jun. 2009).
Ericsson et al., "Definition for the Happy Bit," 3GPP TSG RAN WG2 #67bis, R2-095716 (Oct. 2009).
Ericsson et al., "Happy Bit for DC-HSUPA," 3GPP TSG RAN WG2 #67, R2-094383 (Aug. 2009).
Ericsson et al., "Scheduling Information for DC-HSUPA," 3GPP TSG RAN WG2 #67, R2-094385 (Aug. 2009).
ETSI MCC, "Report of 3GPP TSG RAN WG2 meeting #66," TSG-RAN Working Group 2 meeting #66bis, R2-094087 (Jun. 29-Jul. 3, 2009).
Huawei, "Happy bit for DC-HSUPA," 3GPP TSG RAN WG2 Meeting #67, R2-094542 (Aug. 2009).
Huawei, "SI report for DC-HSUPA," 3GPP TSG RAN WG2 Meeting #67, R2-094541 (Aug. 2009).
Huawei, "Support of Home NB and Home eNB enhancements RAN2 aspects," TSG-RAN Meeting #43, RP-090351 (Mar. 2009).
Interdigital et al., "Happy Bit Setting with Improved L2 for UL," 3GPP TSG-WG2 Meeting #63bis, R2-085128 (Sep. 29-Oct. 3, 2008).
Interdigital, "E-TFC Selection for DC-HSUPA," 3GPP TSG-RAN WG2 (Aug. 11, 2009).
Interdigital, "Happy bits usage for DC-HSUPA," 3GPP TSG-RAN WG2 Meeting #67bis, R2-095663 (Oct. 2009).
Interdigital, "On the usage of the Happy Bits for DC-HSUPA," 3GPP TSG-RAN WG2 Meeting #67, R2-094795 (Aug. 2009).
Motorola, "LTE-UMTS: Inbound mobility to CSG cell from LTE cell," 3GPP TSG-RAN WG2#66bis, R2-093920 (Jun. 29-Jul. 3, 2009).
Nokia Siemens Networks, "On usage of happy bits in dual carrier HSUPA," 3GPP TSG-RAN WG2 Meeting #67, R2-094372 (Aug. 2009).

QUALCOMM Europe, "E-TFC Selection in DC-HSUPA," 3GPP TSG-RAN WG2 #67, R2-09XXXX (Aug. 2009).
QUALCOMM Europe, "Triggering and Reporting of SI and Happy Bit in DC-HSUPA," 3GPP TSG-RAN WG2 #67, R2-094452 (Aug. 2009).
RAN2 Vice-Chairman, "Report of RAN2 Conference Call on E-TFC selection algorithm for DC-HSUPA," 3GPP TSG-RAN WG2 meeting #67, R2-054557 (Aug. 2009).
Third Generation Partnership Project, "Technical Specification Group Radio Access Network; Medium Access Control (MAC) protocol specification (Release 8)," 3GPP TS 25.321 V8.3.0 (Sep. 2008).
Third Generation Partnership Project, "Technical Specification Group Radio Access Network; Medium Access Control (MAC) protocol specification (Release 8)," 3GPP TS 25.321 V8.7.0 (Sep. 2009).
Third Generation Partnership Project, "Technical Specification Group Radio Access Network; Medium Access Control (MAC) protocol specification (Release 9)," 3GPP TS 25.321 V9.0.0 (Sep. 2009).
Third Generation Partnership Project, "Technical Specification Group Radio Access Network; Physical layer procedures (FDD) (Release 8)," 3GPP TS 25.214 V8.3.0 (Sep. 2008).
Third Generation Partnership Project, "Technical Specification Group Radio Access Network; Physical layer procedures (FDD) (Release 8)," 3GPP TS 25.214 V8.7.0 (Sep. 2009).
Third Generation Partnership Project, "Technical Specification Group Radio Access Network; Physical layer procedured (FDD) (Release 9)," 3GPP TS 25.214 V9.0.0 (Sep. 2009).
Third Generation Partnership Project, "Technical Specification Group Radio Access Network; Requirements for support of radio resource management (FDD) (Release 8)," 3GPP TS 25.133 V8.4.0 (Sep. 2008).
Third Generation Partnership Project, "Technical Specification Group Radio Access Network; Requirements for support of radio resource management (FDD) (Release 8)," 3GPP TS 25.133 V8.8.0 (Sep. 2009).
Third Generation Partnership Project, "Technical Specification Group Radio Access Network; Requirements for support of radio resource management (FDD) (Release 9)," 3GPP TS 25.133 V9.1.0 (Sep. 2009).
Third Generation Partnership Project, "Technical Specification Group Radio Access Network; High Speed Downlink Packet Access (HSDPA); Overall description; Stage 2 (Release 9)," 3GPP TS 25.308 V9.1.0 (Sep. 2009).
Third Generation Partnership Project, "Technical Specification Group Radio Access Network; High Speed Downlink Packet Access (HSDPA); Overall description; Stage 2 (Release 8)," 3GPP TS 25.308 V8.7.0 (Sep. 2009).
Third Generation Partnership Project, "Technical Specification Group Radio Access Network; High Speed Downlink Packet Access (HSDPA); Overall description; Stage 2 (Release 8)," 3GPP TS 25.308 V8.3.0 (Sep. 2008).
European Telecommunications Standards Institute (ETSI), TS 125 321, V8.3.0, "Universal Mobile Telecommunications System (UMTS); Medium Access Control (MAC) Protocol Specification (3GPP TS 25.321 version 8.3.0 release 8)", Oct. 1, 2008, 172 pages.
3rd Generation Partnership Project (3GPP), R2-095957, "Remaining Issues in E-TFC Selection in DC-HSUPA", QUALCOMM Europe, 3GPP TSG-RAN WG2, Meeting #67, Miyazaki, Japan, Oct. 12-16, 2009, 14 pages.

* cited by examiner

METHOD AND APPARATUS FOR HANDLING UPLINK TRANSMISSIONS USING MULTIPLE UPLINK CARRIERS

CROSS REFERENCE TO RELATED APPLICATIONS

This application claims the benefit of U.S. provisional application Nos. 61/109,978 filed Oct. 31, 2008, 61/141,638 filed Dec. 30, 2008, 61/159,659 filed Mar. 12, 2009, and 61/168,451 filed Apr. 10, 2009, 61/218,208 filed Jun. 18, 2009, 61/232,351 filed Aug. 7, 2009, 61/235,995 filed Aug. 21, 2009, 61/248,289 filed Oct. 2, 2009, and 61/250,804 filed Oct. 12, 2009, which are incorporated by reference as if fully set forth herein.

FIELD OF INVENTION

This application is related to wireless communications.

BACKGROUND

Wireless communication systems keep evolving to meet the needs for providing continuous and faster access to a data network. In order to meet these needs, wireless communication systems may use multiple carriers for the transmission of data. A wireless communication system that uses multiple carriers for the transmission of data may be referred to as a multi-carrier system. The use of multiple carriers is expanding in both cellular and non-cellular wireless systems.

A multi-carrier system may increase the bandwidth available in a wireless communication system according to a multiple of how many carriers are made available. For instance, a dual carrier system will double the bandwidth when compared to a single carrier system and a tri-carrier system will triple the bandwidth when compared to a single carrier system, etc. In addition to this throughput gain, diversity and joint scheduling gains may also be expected. This may result in improving the quality of service (QoS) for end users. Further, the use of multiple carriers may be used in combination with multiple-input multiple-output (MIMO).

By way of example, in the context of third generation partnership project (3GPP) systems, a new feature called dual cell high speed downlink packet access (DC-HSDPA) has been introduced in Release 8 of the 3GPP specifications. With DC-HSDPA, a base station (which may also be referred to as a Node-B, an access point, site controller, etc. in other variations or types of communications networks) communicates to a wireless transmit/receive unit (WTRU) over two downlink carriers simultaneously. This not only doubles the bandwidth and the peak data rate available to WTRUs, but also has a potential to increase the network efficiency by means of fast scheduling and fast channel feedback over two carriers.

For DC-HSDPA operation, each WTRU is assigned two downlink carriers: an anchor carrier and a supplementary carrier. The anchor carrier carries all physical layer dedicated and shared control channels associated with transport channels such as the high speed downlink shared channel (HS-DSCH), the enhanced dedicated channel (E-DCH), and the dedicated channel (DCH) operations. Such physical layer channels include, by way of example, the fractional dedicated physical channel (F-DPCH), the E-DCH HARQ indicator channel (E-HICH), the E-DCH relative grant channel (E-RGCH), the E-DCH absolute grant channel (E-AGCH), the common pilot channel (CPICH), the high speed shared control channel (HS-SCCH), and the high speed physical downlink shared channel (HS-PDSCH), and the like). The supplementary carrier may carry a CPICH, an HS-SCCH and an HS-PDSCH for the WTRU. The uplink transmission remains on a single carrier in the current system. The high speed dedicated physical control channel (HS-DPCCH) feedback information is provided on the uplink carrier to the Node-B and contains information for each downlink carrier.

FIG. 1 shows the medium access control (MAC) layer structure for DC-HSDPA operation in a 3GPP context. The MAC-ehs entity includes one hybrid automatic repeat request (HARQ) entity per HS-DSCH transport channel. This implies that HARQ retransmissions may take place over the same transport channel which somewhat restricts the benefit of frequency diversity potentially brought by the use of more than one carrier if each HS-DSCH transport channel has a fixed mapping to physical channel resources. However, it has been suggested that the mapping between an HS-DSCH and physical resources (e.g., codes and carrier frequencies) may be dynamically modified in order to provide a diversity benefit.

As mentioned above, multi-carrier transmissions increase the throughput and efficiency of the downlink. However, in the uplink, physical layer channels are carried using a single carrier. Therefore, a need exists for a method and apparatus for handling uplink transmissions using multiple uplink channels.

SUMMARY

A method and apparatus for handling uplink transmissions using multiple uplink carriers are disclosed. A WTRU selects a dedicated channel medium access control (MAC-d) flow with the highest priority data to be transmitted and performs uplink carrier selection and enhanced dedicated channel (E-DCH) transport format combination (E-TFC) restriction and selection to select a carrier among a plurality of carriers and select an E-TFC based on, for example, a maximum supported payload, a remaining scheduled grant payload of the selected carrier and a remaining non-scheduled grant payload. The WTRU then generates a medium access control (MAC) protocol data unit (PDU) for E-DCH transmission via the selected carrier based on the selected E-TFC. The WTRU selects another carrier and repeats the above steps, and transmits the generated MAC PDUs.

BRIEF DESCRIPTION OF THE DRAWINGS

A more detailed understanding may be had from the following description, given by way of example in conjunction with the accompanying drawings wherein.

DETAILED DESCRIPTION

When referred to hereafter, the terminology "WTRU" includes but is not limited to a user equipment (UE), a mobile station, a fixed or mobile subscriber unit, a pager, a cellular telephone, a personal digital assistant (PDA), a computer, a machine-to-machine (M2M) device, a sensor or any other type of device capable of operating in a wireless environment. When referred to hereafter, the terminology "Node-B" includes but is not limited to a base station, a site controller, an access point (AP), or any other type of interfacing device capable of operating in a wireless environment.

The network may assign at least one downlink and/or at least one uplink carrier as an anchor downlink carrier and an anchor uplink carrier, respectively. In multi-carrier operation a WTRU may be configured to operate with two or more carriers or also referred to as frequencies. Each of these carriers may have distinct characteristics and logical association with the network and the WTRU, and the operating frequencies may be grouped and referred to as anchor or primary carrier and supplementary and secondary carrier. Hereinafter, the terminologies "anchor carrier" and "primary carrier", and "supplementary carrier" and "secondary carrier" will be used interchangeably, respectively. If more than two carriers are configured the WTRU may contain more than one primary carrier and/or more than one secondary carrier(s). The embodiments described herein are applicable and can be extended to these scenarios as well. For example, the anchor carrier may be defined as the carrier for carrying a specific set of control information for downlink/uplink transmissions. Any carrier that is not assigned as an anchor carrier may be a supplementary carrier. Alternatively, the network may not assign an anchor carrier and no priority, preference, or default status may be given to any downlink or uplink carriers. Hereinafter, the terms "anchor carrier", "primary carrier", "uplink carrier 1", "first carrier", and "first uplink carrier", are used interchangeably herein for convenience. Similarly, the terms "supplementary carrier", "secondary carrier", "uplink carrier 2", "second carrier", and "second uplink carrier" are also used interchangeably herein. For multi-carrier operation more than one supplementary carriers or secondary carriers may exist.

Figure 1:
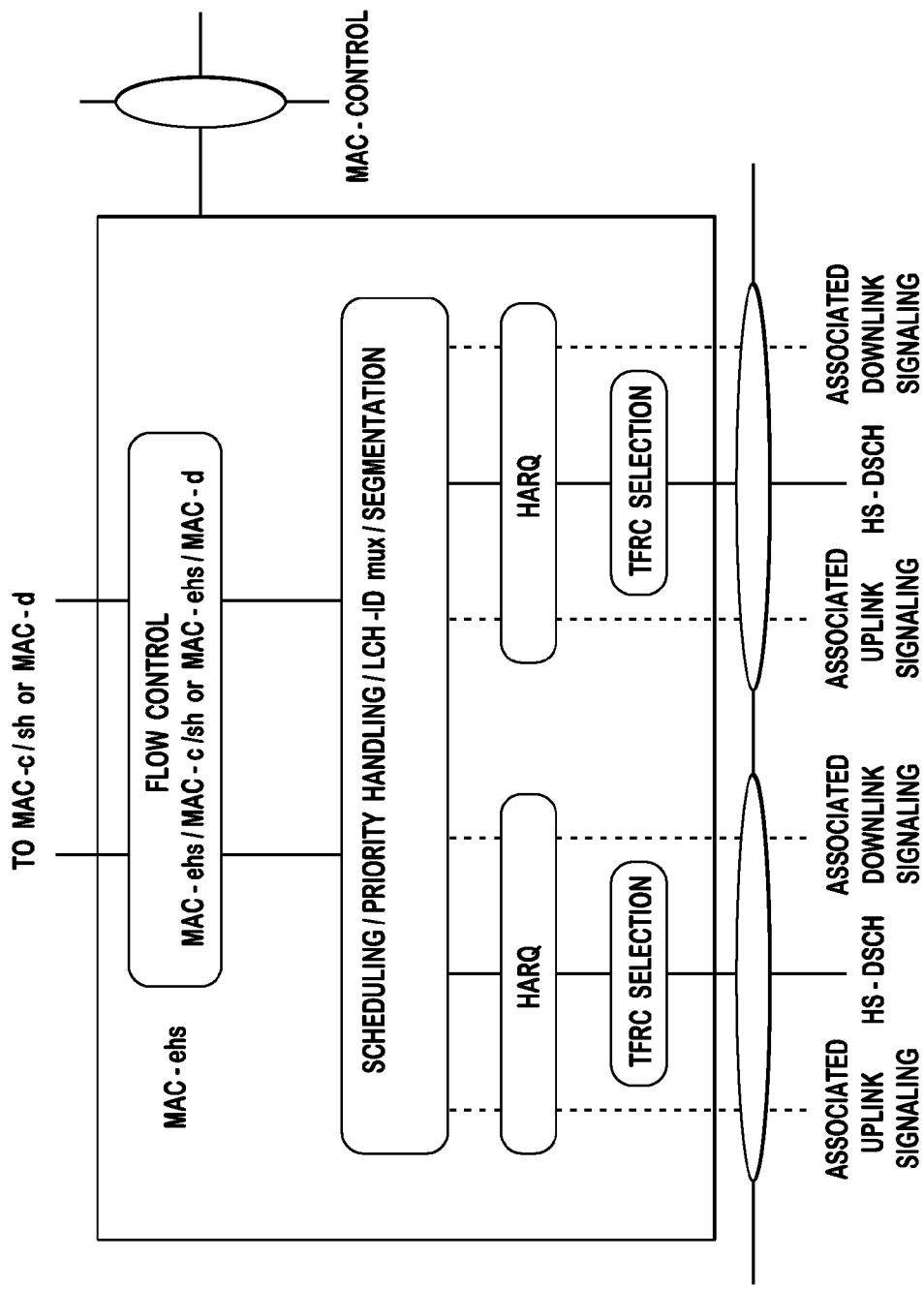
FIG. 1 shows the MAC layer structure for DC-HSDPA operation according to the prior art.
Figure 2:
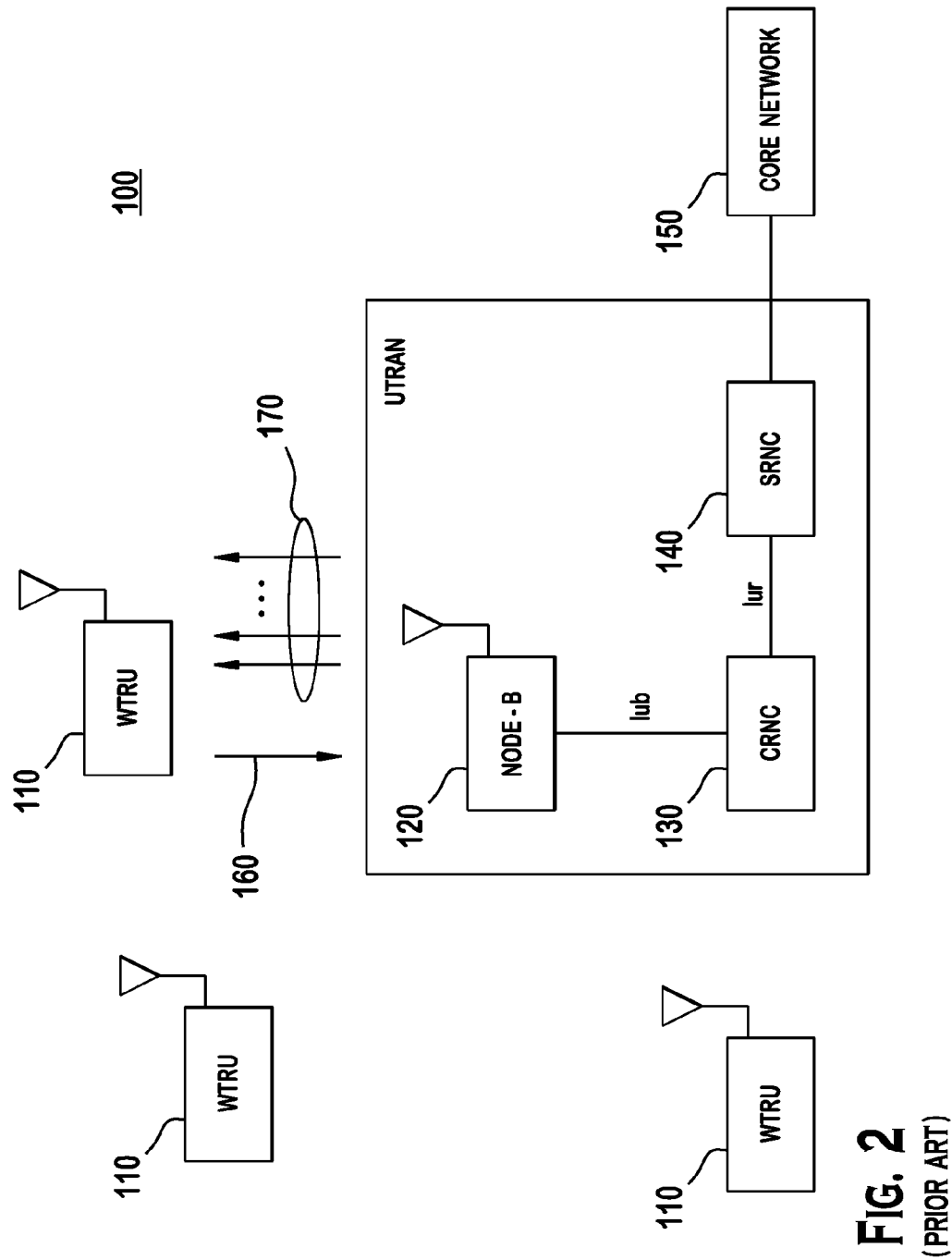
FIG. 2 shows an example wireless communication system according to the prior art.

FIG. 2 shows an example wireless communication system 100 according to the prior art where uplink transmissions are handled with a single carrier 160 and downlink transmissions are handled using multiple carriers 170. The wireless communication system 100 includes a plurality of WTRUs 110, a Node-B 120, a controlling radio network controller (CRNC) 130, a serving radio network controller (SRNC) 140, and a core network 150. The Node-B 120 and the CRNC 130 may collectively be referred to as the UTRAN.

As shown in FIG. 2, the WTRUs 110 are in communication with the Node-B 120, which is in communication with the CRNC 130 and the SRNC 140. Although three WTRUs 110, one Node-B 120, one CRNC 130, and one SRNC 140 are shown in FIG. 2, it should be noted that any combination of wireless and wired devices may be included in the wireless communication system 100.

Figure 3:
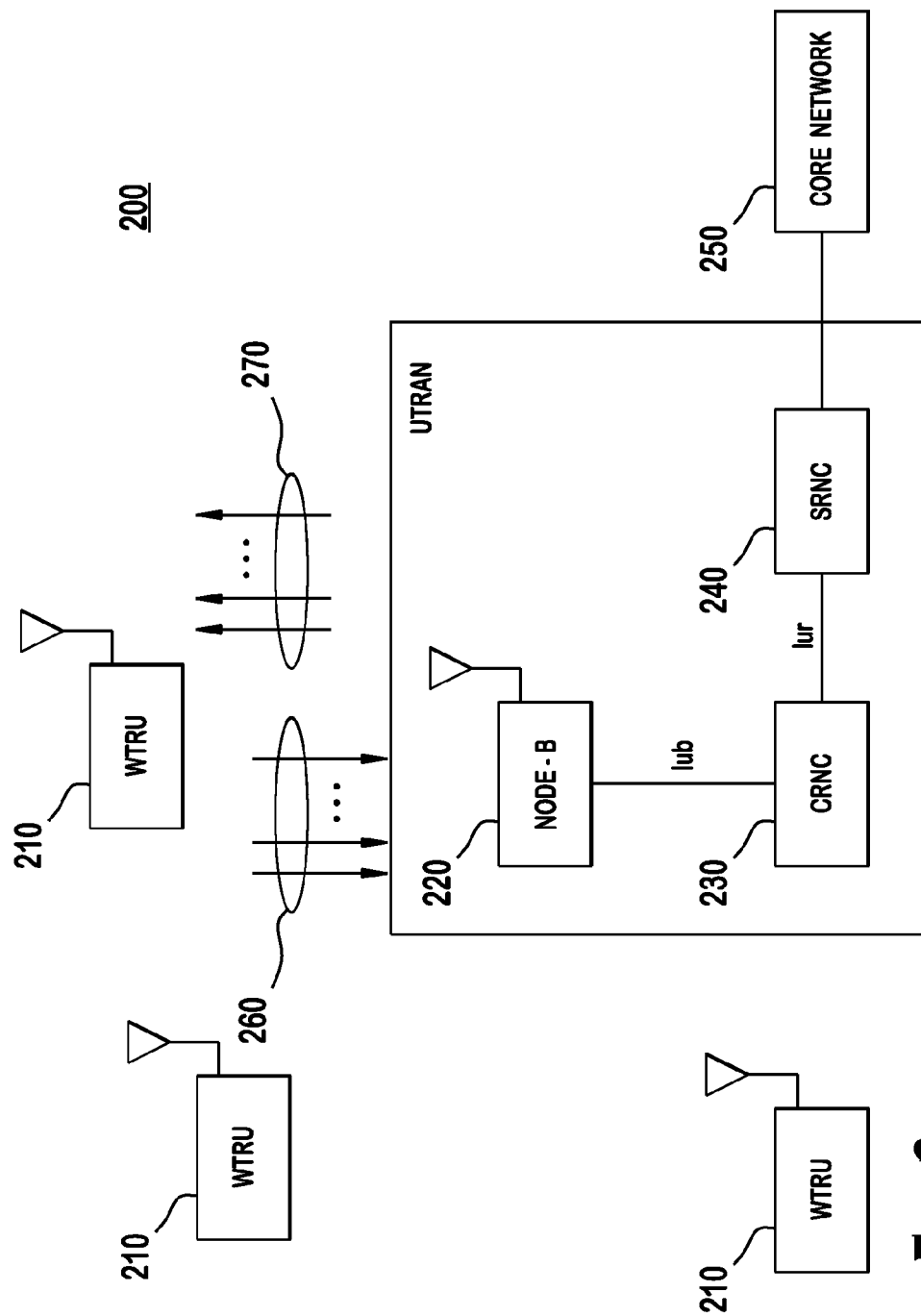
FIG. 3 shows an example wireless communication system wherein uplink transmissions are handled using multiple uplink carriers.

FIG. 3 shows an example wireless communications system 200 according to an example embodiment where uplink transmissions are handled using multiple carriers 260 and downlink transmissions are handled using multiple carriers 270. The wireless communication system 200 includes a plurality of WTRUs 210, a Node-B 220, a CRNC 230, a SRNC (240), and a core network 250. The Node-B 220 and the CRNC 230 may collectively be referred to as the UTRAN.

As shown in FIG. 3, the WTRUs 210 are in communication with the Node-B 220, which is in communication with the CRNC 230 and the SRNC 240. Although three WTRUs 210, one Node-B 220, one CRNC 230, and one SRNC 240 are shown in FIG. 3, it should be noted that any combination of wireless and wired devices may be included in the wireless communication system 200.

Figure 4:
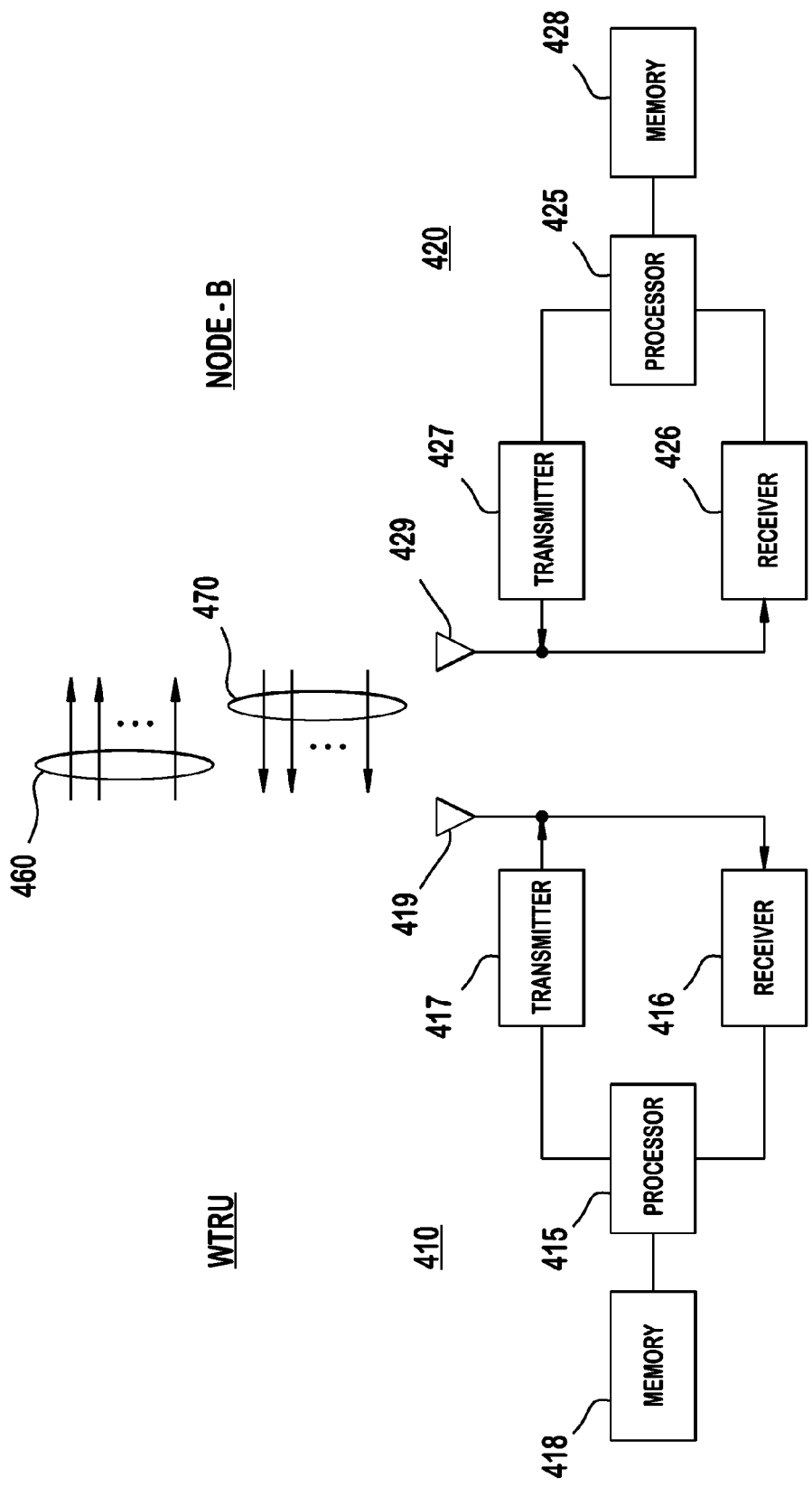
FIG. 4 is a functional block diagram of an example WTRU and an example Node-B of the wireless communication system of FIG. 3.

FIG. 4 is a functional block diagram of the WTRU 410 and the Node-B 220 of the wireless communication system 200 of FIG. 3. As shown in FIG. 3, the WTRU 410 is in communication with the Node-B 420 and both are configured to perform a method wherein uplink transmissions from the WTRU 410 are transmitted to the Node-B 420 using multiple uplink carriers 460. The WTRU 410 includes a processor 415, a receiver 416, a transmitter 417, a memory 418, an antenna 419, and other components (not shown) that may be found in a typical WTRU. The antenna 419 may include a plurality of antenna elements or plurality of antennas may be included in the WTRU 410. The memory 418 is provided to store software including operating system, application, etc. The processor 415 is provided to perform, alone or in association with software and/or any one or more of the components, a method of performing uplink transmissions with multiple uplink carriers. The receiver 416 and the transmitter 417 are in communication with the processor 415. The receiver 116 and the transmitter 117 are capable of receiving and transmitting one or more carriers simultaneously. Alternatively, multiple receivers and/or multiple transmitters may be included in the WTRU 410. The antenna 419 is in communication with both the receiver 416 and the transmitter 417 to facilitate the transmission and reception of wireless data.

The Node B 420 includes a processor 425, a receiver 426, a transmitter 427, a memory 428, an antenna 429, and other components (not shown) that may be found in a typical base station. The antenna 429 may include a plurality of antenna elements or plurality of antennas may be included in the Node B 420. The memory 428 is provided to store software including operating system, application, etc. The processor 425 is provided to perform, alone or in association with software and/or any one or more of the components, a method wherein uplink transmissions from the WTRU 410 are transmitted to the Node-B 420 using multiple uplink carriers in accordance with embodiments disclosed below. The receiver 426 and the transmitter 427 are in communication with the processor 425. The receiver 426 and the transmitter 427 are capable of receiving and transmitting one or more carriers simultaneously. Alternatively, multiple receivers and/or multiple transmitters may be included in the Node B 420. The antenna 429 is in communication with both the receiver 426 and the transmitter 427 to facilitate the transmission and reception of wireless data.

Embodiments described herein provide several approaches for implementing multi-carrier uplink transmission, for performing power control on multiple uplink carriers, and for allocating power and data across multiple different uplink carriers. It is noted that although embodiments described herein are described in terms of a dual uplink carrier scenario, it should be understood that the embodiments described herein are applicable to scenarios where any number of uplink carriers are implemented.

It is also noted that although the embodiments described herein are described with reference to channels associated with 3GPP Releases 4 through 7, it should be noted that the embodiments are applicable to further 3GPP releases (and the channels used therein) such as LTE Release 8 as well as any other type of wireless communication system, and the channels used therein. It should also be noted that the embodiments described herein may be applicable in any order or in any combination.

Figure 5:
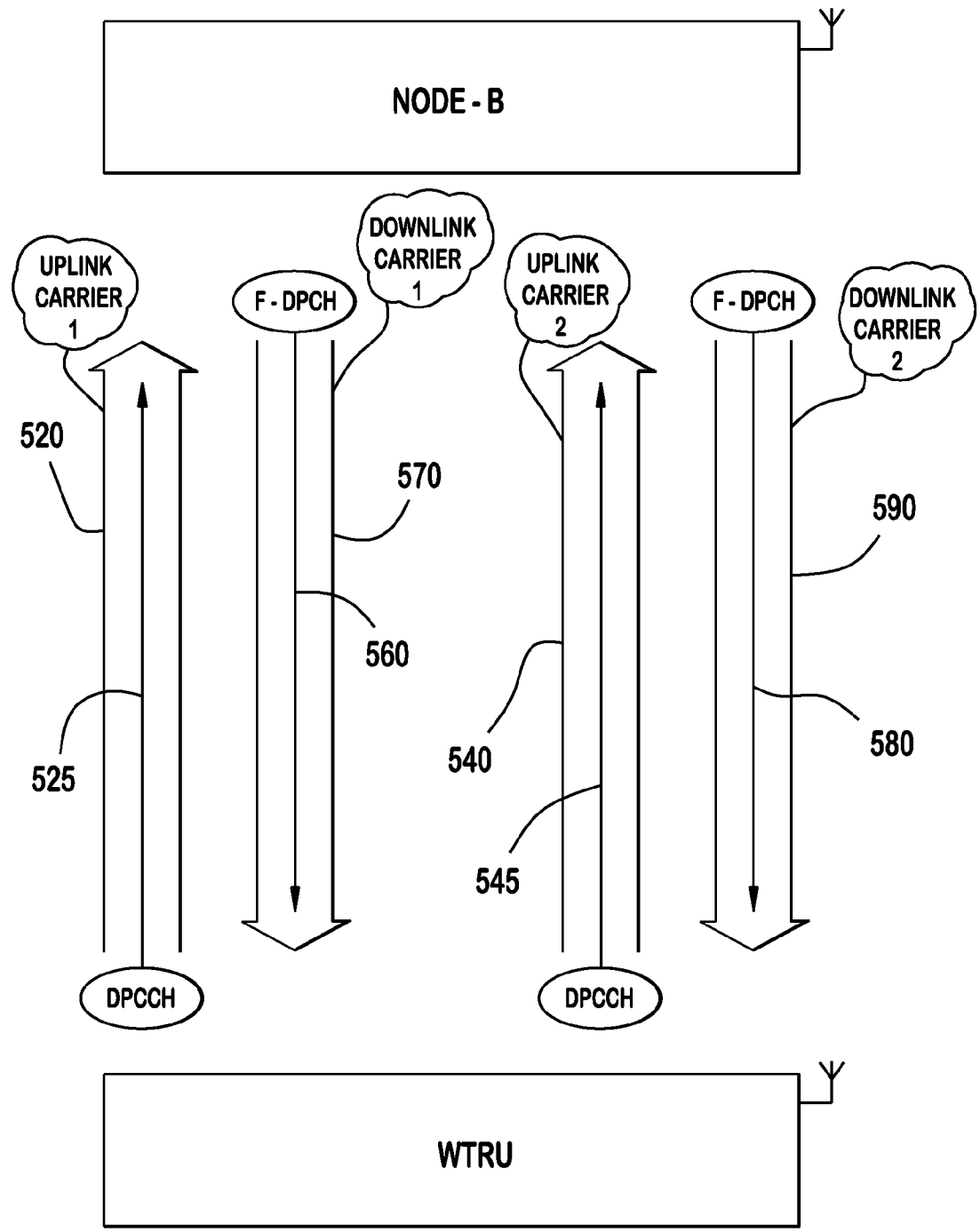
FIG. 5 is a functional block diagram wherein two uplink carriers are controlled by transmit power control (TPC) commands transmitted to a WTRU on two downlink carriers.

Referring now to FIG. 5, embodiments to perform power control on both uplink carriers 520, 540 (i.e., in a dual-carrier scenario) and allocate power and data across the uplink carriers are described hereafter. It is noted that while specific channels are shown being carried by uplink and downlink carriers in FIGS. 5-7 and FIG. 9, any channels may be carried in such carriers.

In accordance with one embodiment, the transmission powers of the uplink dedicated physical control channel (DPCCH) transmissions 525, 545 on both uplink carriers 520, 540 are controlled by two separate transmit power control (TPC) commands transmitted by the Node-B. One TPC command controls the power of the first uplink carrier 520 and the other TPC command controls the power of the second uplink carrier 540. The WTRU varies the power of the DPCCH 525, 545 on each uplink carrier 520, 540 based on the corresponding TPC command A Node-B may transmit a TPC command for an uplink carrier over an F-DPCH 560, 580 on a downlink carrier 570, 590 corresponding to that uplink carrier 520, 540 respectively. A mapping between the uplink carrier and the downlink carrier may be pre-defined. The WTRU typically obtains the TPC commands by listening to two channels (e.g., F-DPCH) transmitted over two different downlink carriers, but of course different channels may be used for transmitting such commands.

Figure 6:
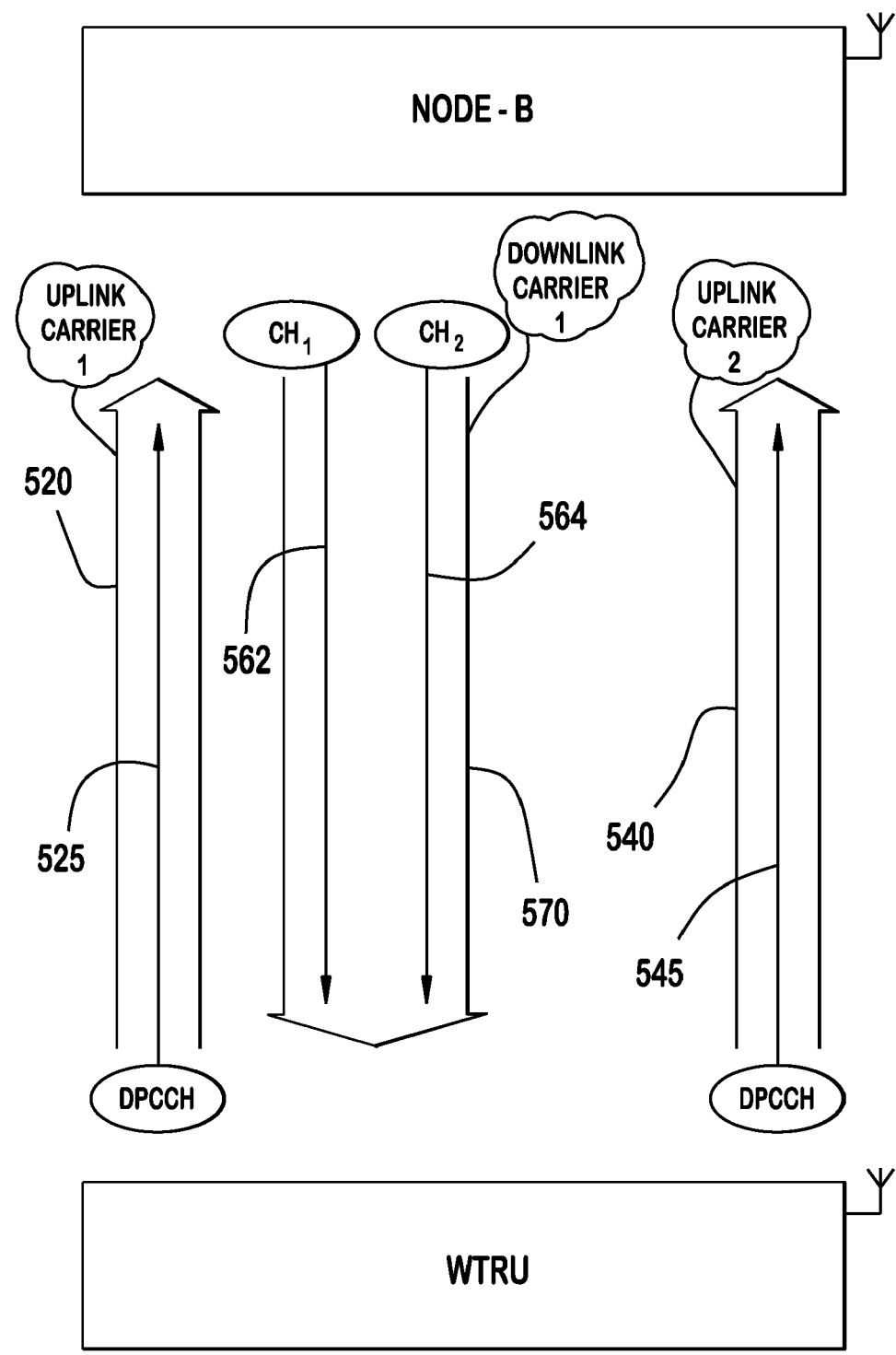
FIGS. 6 and 7 are functional block diagrams wherein two uplink carriers are controlled by transmit power control (TPC) commands transmitted to a WTRU on a single downlink carrier.

Alternatively, referring now to FIG. 6, the TPC commands for the two uplink carriers 520, 540 may be transmitted on two different channels 562, 564 on the same downlink carrier 570 (either one of the downlink carriers 570 or 590 may be used, but 570 is shown as being used in this embodiment). In this embodiment, the WTRU is not required to listen to both downlink carriers 570 and 590 if there is no other activity on at least one of the downlink carriers.

Figure 7:
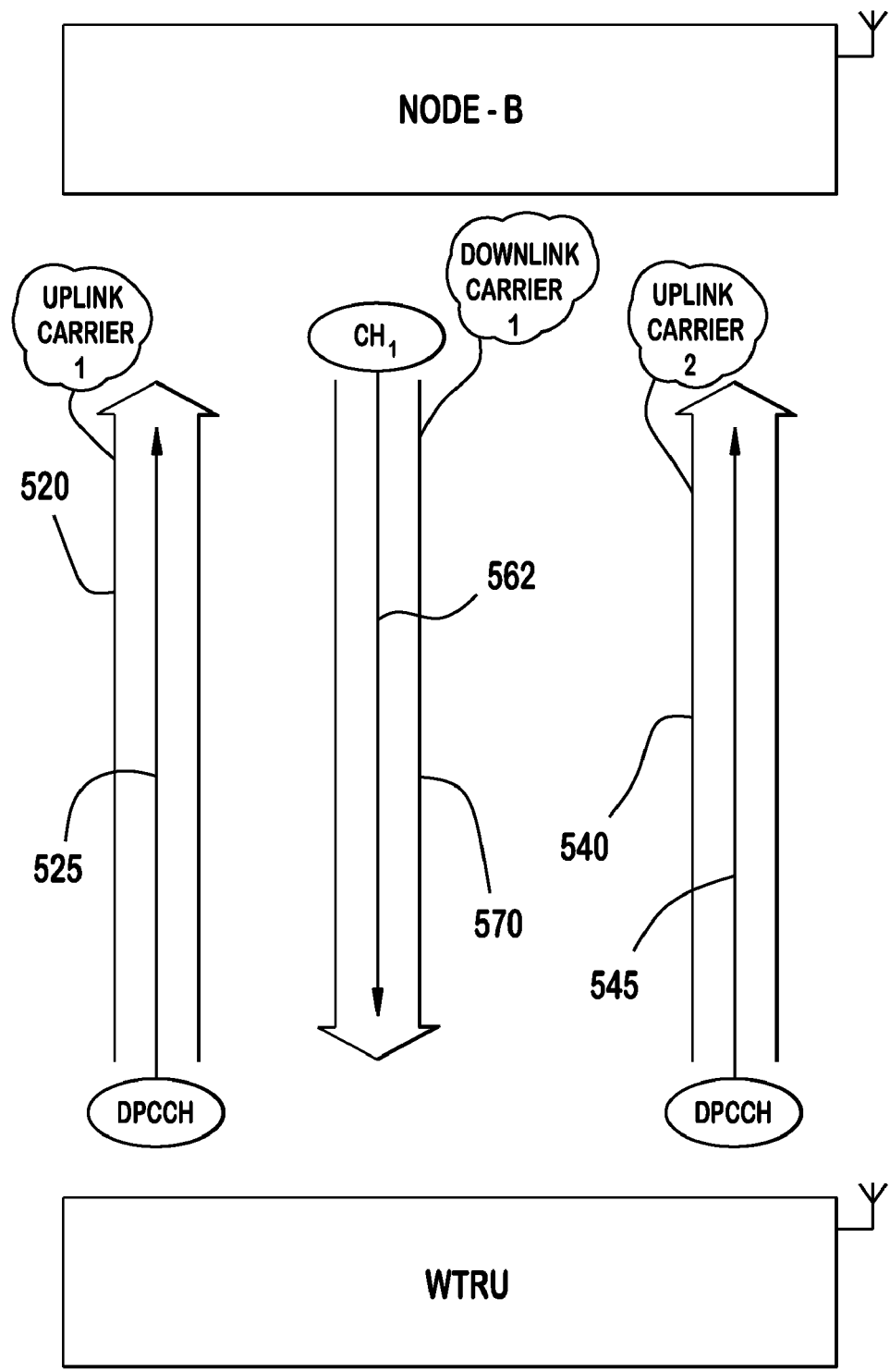
Figures 8, 11:
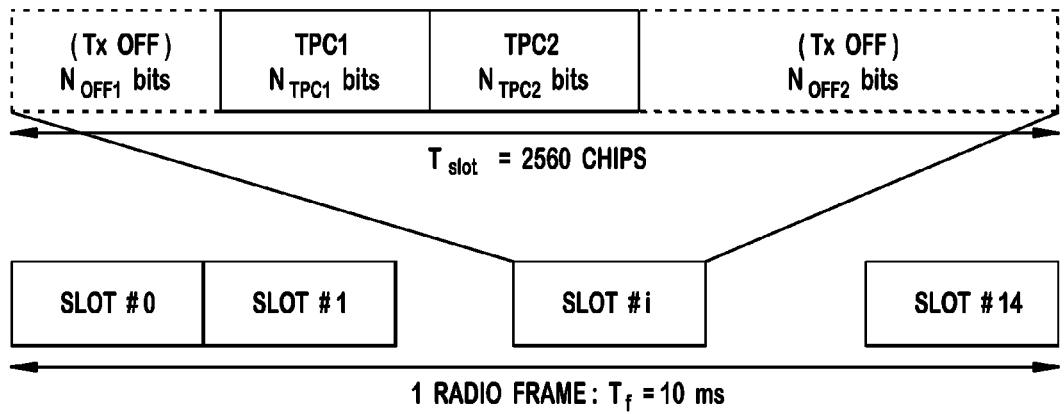
FIG. 8 shows an example F-DPCH slot format in accordance with one embodiment.
FIG. 11 shows scheduling information format in accordance with one embodiment.

In a further alternative embodiment, shown in FIG. 7, the TPC commands for the two uplink carriers 520, 540 may be carried over a single channel 562 (e.g., F-DPCH) in a single downlink carrier 570 (again, either one of the downlink carriers 570 or 590 may be used, but 570 is shown as being used in this embodiment). FIG. 8 shows an example F-DPCH slot format in accordance with this alternative embodiment. An F-DPCH slot format includes two TPC fields per slot, where TPC1 and TCP2 each contain a power control command (UP or DOWN) for uplink carrier 1 and uplink carrier 2, respectively.

Referring again to FIG. 7, in another alternative embodiment, where power control commands for both uplink carriers are transmitted on a single channel 562 such as the F-DPCH channel, the power control commands are time multiplexed. The time-multiplexing of power control commands may be achieved in a number of different ways. The power control commands may evenly alternate between uplink carrier 1 520 and uplink carrier 2 540. For example, the uplink carrier for which the power control command is destined may be determined as:

If (current connection frame number (CFN)+slot number) modulo 2=0, then TPC is for uplink carrier 1;
Else, TPC is for uplink carrier 2.

For example, power control commands for uplink carrier 1 520 may be carried in radio slots #0, 2, 4, 6, 8, 10, 12, and 14; whereas power control commands for uplink carrier 2 540 may be carried in radio slots #1, 3, 5, 7, 9, 11, and 13, or vice versa. Alternatively, more power control commands may be allocated to uplink carrier 1 520 than uplink carrier 2 540. For example, power control commands for uplink carrier 1 520 may be carried in radio slots #0, 1, 3, 4, 6, 7, 9, 10, 12, and 13, whereas power control commands for uplink carrier 2 540 may be carried in radio slots #2, 5, 8, 11, and 14. This alternative may be used if there is a reason why providing more power control commands will increase overall efficiency. Such a scenario may be, for example, where uplink carrier 1 520 is carrying more physical layer channels than uplink carrier 2 540.

Synchronization may also be defined on a per-carrier basis. The WTRU may apply the synchronization procedure on both carriers separately. The WTRU may be allowed to transmit on a carrier depending on the synchronization status on that carrier. Radio link failure may be declared upon loss of synchronization on both carriers.

Still referring to FIG. 7, in yet another alternative of the scenario where power control commands for both uplink carriers are transmitted on a single channel 562 such as the F-DPCH, the transmission powers of the DPCCH transmissions on both uplink carriers may be controlled by a single TPC command transmitted by the Node-B on, in this scenario, the F-DPCH. When the TPC command from the Node-B indicates to increase the power, the power is (e.g., equally) increased on both uplink carriers, and when the TPC command indicates to decrease the power, the power is (e.g., equally) decreased on both uplink carriers. For example, the power control commands may be joint-coded into a single TPC field. Example joint coding of the TPC commands is shown in Table 1 for $N_{TPC}=2$ and $N_{TPC}=4$, where $N_{TPC}$ is the number of TPC command bits.

TABLE 1

| TPC Bit Pattern | | TPC Command | |
| --- | --- | --- | --- |
| $N_{TPC} = 2$ | $N_{TPC} = 4$ | Uplink Carrier 1 | Uplink Carrier 2 |
| 00 | 0000 | 0 | 0 |
| 01 | 0011 | 0 | 1 |
| 10 | 1100 | 1 | 0 |
| 11 | 1111 | 1 | 1 |

Figure 9:
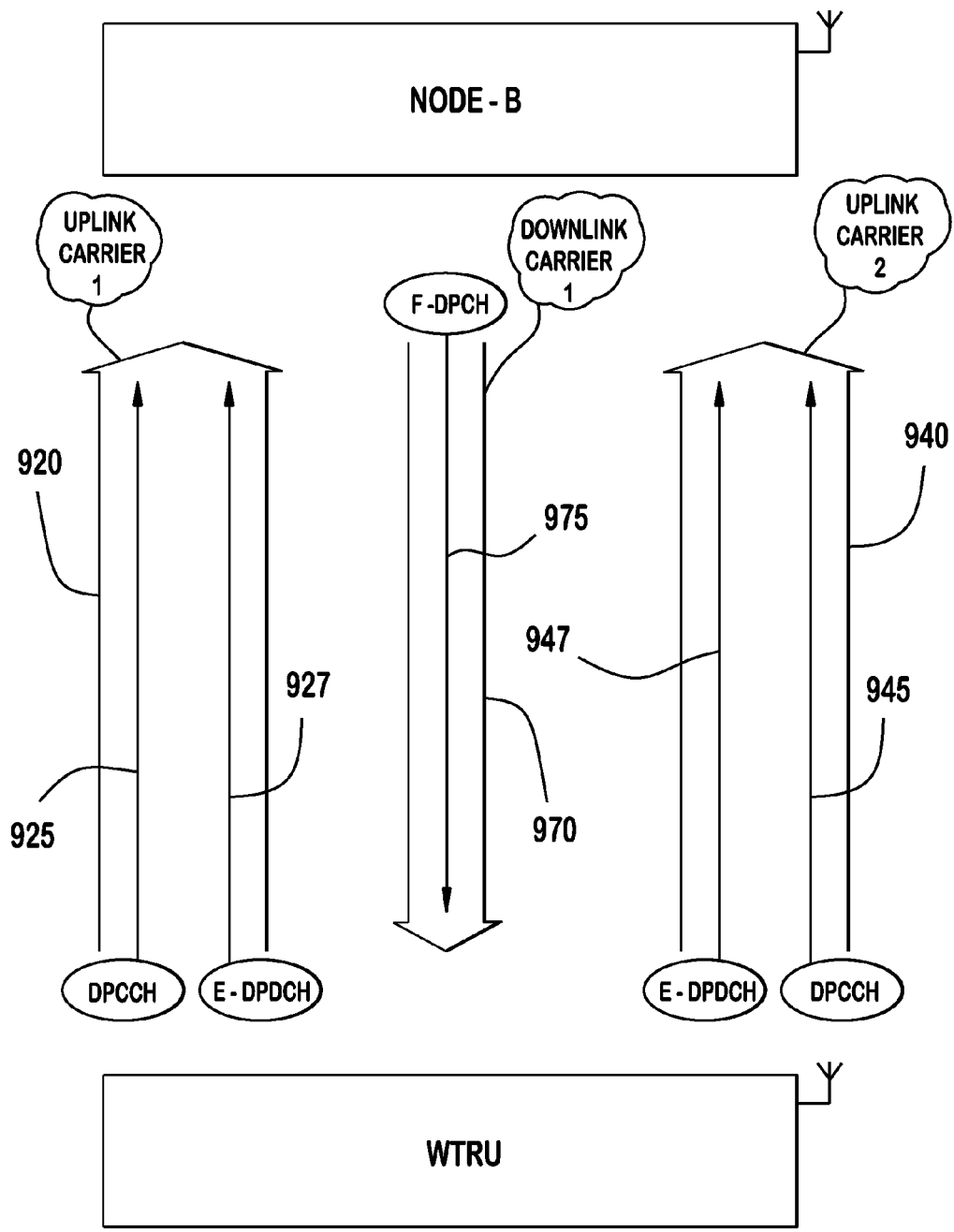
FIG. 9 is a functional block diagrams wherein transmit power control (TPC) commands are sent in the uplink in a multiple uplink carrier environment.

Referring now to FIG. 9, the following embodiments are in relation to the uplink transmission of transmit power control (TPC) commands from the WTRU to the Node-B on the uplink DPCCH for purposes of downlink power control. The WTRU may transmit a TPC command on the uplink DPCCH 925 of only one of the uplink carriers (in this example 920). On another uplink carrier (in this case 940), the WTRU may use either discontinuous transmission (DTX) in place of transmitting the TPC bits, or a new slot format with no TPC field. The TPC command may be derived from the quality measured on the downlink carrier 970 on which a downlink channel such as, for example, the F-DPCH 975 is transmitted. This approach has an advantage of somewhat reducing the interference from the WTRU. The WTRU may transmit the uplink DPCCH 925, 945 with only the pilot bits used for channel estimation by the Node-B.

Alternatively, the WTRU may transmit the same TPC command on the uplink DPCCH 925, 945 of both uplink carriers 920, 940. The TPC command may be derived from the quality measured on the downlink carrier 970 on which the F-DPCH 975 is transmitted. The Node-B may combine the TPC command signals from the two uplink DPCCHs 925, 945 to improve reliability of the TPC signals from the WTRU.

Alternatively, the WTRU may transmit independent TPC commands on the uplink DPCCH 925, 945 of each uplink carrier 920, 940. In this case, the TPC command sent on an uplink carrier 920, 940 may be derived based on the signal quality measured from the corresponding downlink carrier(s) (not shown) independently of the downlink carrier on which the F-DPCH 970 is transmitted. This scheme has the benefit of providing the network with some additional information regarding the downlink channel.

Since the uplink channels 925, 927, 945 on the two uplink carriers may not behave the same, it is possible that the channel quality changes on one carrier 920 differently than on another carrier 940. It is also possible that the channel quality on one carrier 920 changes whereas channel quality does not change on another carrier 940. In one example, channel quality degrades on one uplink carrier 920 while it improves on the other uplink carrier 940. In this case the Node-B has different options for setting the value of the TPC bits on the F-DPCH 975. The Node-B may set the TPC bit to "up" whenever the quality from one of the carriers 920, 940 is below a threshold, and "down" otherwise. This option may result in the uplink DPCCH power being high on one of the carriers 920, 940 making channel estimation easier for the Node-B. Alternatively, the Node-B may set the TPC bit to "down" whenever the quality from one of the carriers 920, 940 is above a threshold, and "up" otherwise. This option may result in the uplink DPCCH 925, 945 power being lower than a threshold for one of the carriers 920, 940 so the Node-B may derive an acceptable channel estimate on this carrier using the information from the other carrier.

If the average uplink interference (noise rise) level is not the same on both uplink carriers 920, 940, there may be a long-term and significant discrepancy in channel quality between the uplink carriers. The WTRU may apply an offset to the transmission power of one of the uplink carriers (e.g., 920) compared to the other uplink carrier (e.g., 940). This offset may be signaled by the network via higher layer signaling, (e.g., RRC signaling), or the like. The network may set the offset so that the average signal quality from both uplink carriers 920, 940 would be the same or similar.

The network may define different sets of reference E-DCH transport format combination index (E-TFCI) and corresponding gain factors for the two uplink carriers 920, 940, so that the signal-to-interference ratio (SIR) of the E-DPDCH 927, 947 (which contains data bits) is approximately the same on both uplink carriers 920, 940. For instance, if the DPCCH SIR of uplink carrier 1 920 is −22 dB in average while the DPCCH SIR of uplink carrier 2 940 is −19 dB in average, setting a reference gain factor 3 dB lower for uplink carrier 2 (for the same reference E-TFCI) would result in approximately the same E-DPDCH SIR for both uplink carriers 920, 940 and a given E-TFC (the reference gain factor of uplink carrier 2 940 may actually be set slightly lower than 3 dB below uplink carrier 1 920 given the better channel estimate with uplink carrier 2 940).

Synchronization may be defined on a per-carrier basis. The WTRU may apply the synchronization procedure on both carriers separately. The WTRU may be allowed to transmit on a carrier depending on the synchronization status on that carrier. Radio link failure may be declared upon loss of synchronization on both carriers.

Still referring to FIG. 9, embodiments for E-TFC restriction and selection are described hereafter. A WTRU transmission may be restricted by a maximum allowed transmit power. The maximum allowed transmit power of the WTRU may be a minimum of a signaled configured value and a maximum power allowed due to WTRU design limitation. The maximum allowed transmit power of the WTRU may be configured as a total maximum power in a given transmission time interval (TTI) for both uplink carriers 920, 940, or may be carrier-specific. In the latter case, the same maximum power value may be assigned to each uplink carrier 920, 940 or a different maximum power value may be assigned to each uplink carrier 920, 940. This may depend on the particular configuration of the device, (e.g., the number of power amplifiers and antennas of the WTRU), and/or on network control and configuration. The total maximum transmit power and the per-carrier maximum transmit power may be simultaneously configured.

The WTRU behavior and operation may be quite different in both cases (i.e., one total maximum transmit power or independent per-carrier maximum transmit power). Therefore, the WTRU may indicate the power capabilities of the WTRU, (i.e., one maximum power or a maximum power defined per carrier), to the network so that the network knows whether the WTRU has a total maximum power for both uplink carriers 920, 940 or a carrier-specific maximum power for each uplink carrier 920, 940, and may schedule operations and correctly interpret the uplink power headroom reported by the WTRU. If the power requirements are specified in the standards the WTRU may not need to signal these capabilities.

Figure 10:
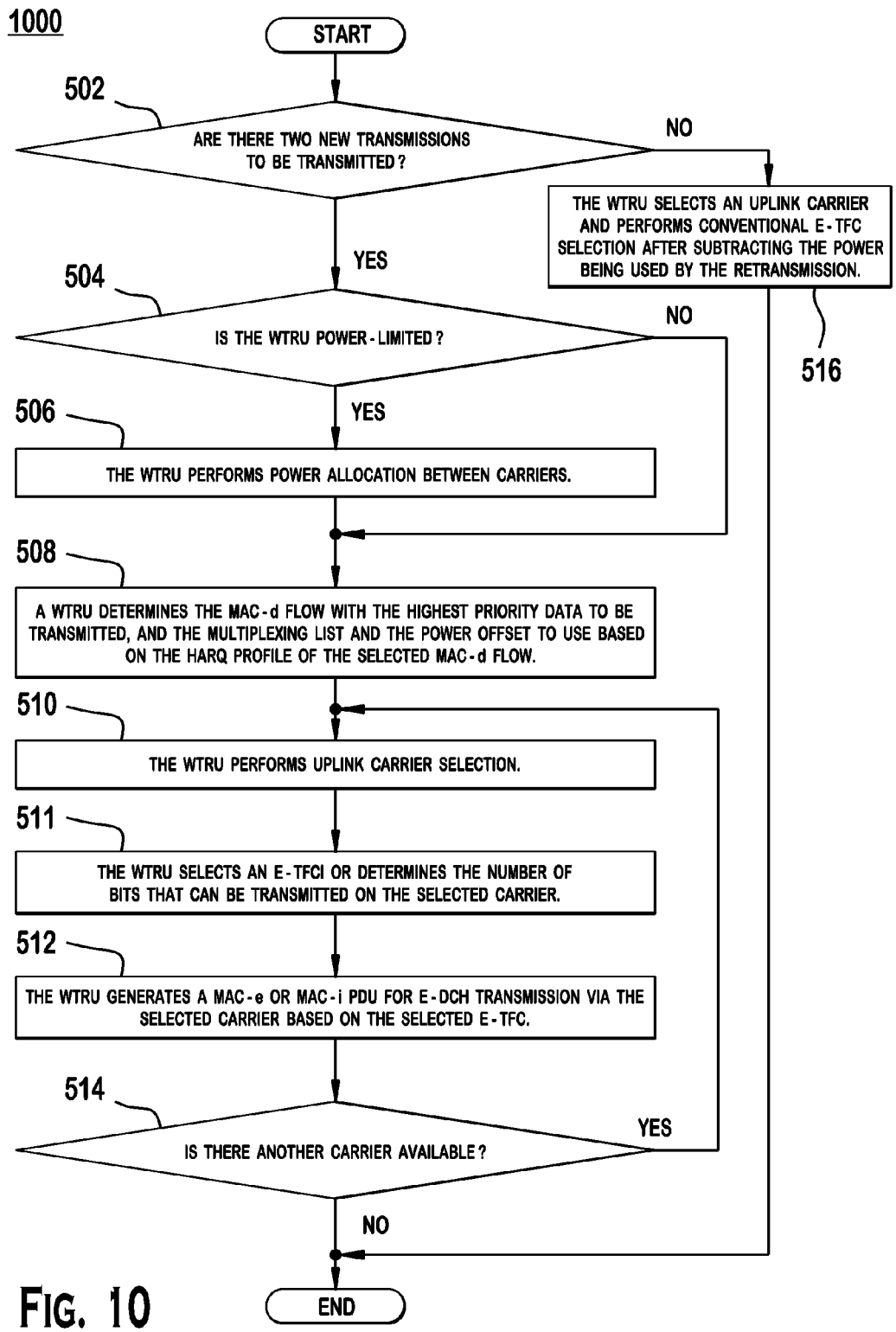
FIG. 10 is a flow diagram of an example process for E-TFC selection and MAC-e or MAC-i PDU generation while utilizing two uplink carriers.

FIG. 10 is a flow diagram of an example process 1000 for E-TFC selection and MAC-i PDU generation while utilizing two uplink carriers is shown. As mentioned above, specific terms for referring to the carriers are used interchangeably herein, but it is noted that in an HSPA+ type system, the two carriers may be referred to as an anchor (or primary) carrier and a supplementary (or secondary) carrier and these terms will be used for convenience in describing FIG. 10. A WTRU determines whether there are two (N in general, N being an integer larger than one) new transmissions to be transmitted for the upcoming TTI (step 502). If there is one new transmission for the upcoming TTI, (e.g., there are one new transmission and one retransmission of the previous failed transmission), the WTRU selects an uplink carrier (the carrier for the new transmission) for E-TFC selection and performs an E-TFC selection procedure for the new transmission while the supported E-TFCIs for the new transmission are determined after subtracting the power being used by the retransmission (step 516). If there are two new transmissions to be transmitted, the WTRU determines whether the WTRU is power limited, (i.e., sum of the total power that would be used by the WTRU in each carrier given the grants (scheduled and non-scheduled) and control channels exceed the maximum power allowed by the WTRU, optionally including backoff) (step 504). If not, the process 500 proceeds to step 508. If so, the WTRU performs power allocation between the uplink carriers (step 506). Alternatively, the WTRU may proceed to step 506 for power allocation between the carriers without checking if the WTRU is power limited. Once power allocation is performed the WTRU fills up the transport blocks sequentially one carrier after the other.

The WTRU determines the MAC-d flow with the highest priority data to be transmitted, and the multiplexing list and the power offset to use based on the HARQ profile of the selected MAC-d flow (step 508). When determining the highest priority MAC-d flow the WTRU may, for every carrier, determine the highest priority MAC-d flow configured with data available amongst all MAC-d flows. In an alternate embodiment, the WTRU may, for every carrier for which E-TFC selection or highest priority MAC-d flow selection is being performed, determine the highest priority MAC-d flow amongst all MAC-d flows allowed to be transmitted on the given carrier. The WTRU performs an uplink carrier selection procedure to select an uplink carrier among a plurality of uplink carriers to fill up with data first (step 510). It should be noted that the steps of carrier selection, MAC-d flow determination may not necessarily be performed in the order described, but may be performed in any order). The WTRU selects an E-TFCI or determines the number of bits that can be transmitted on the selected carrier based on a maximum supported payload (i.e., set of supported E-TFCIs), a remaining scheduled grant payload, a remaining non-scheduled grant payload, data availability and logical channel priorities (step 511).

The WTRU generates a MAC-e or MAC-i PDU for E-DCH transmission via the selected carrier based on the selected E-TFC (step 512). If scheduling information (SI) needs to be sent for the selected carrier, the WTRU may initially include the SI on this carrier before including any other data. Once the WTRU has completed the available space on the selected carrier or has exceeded the data in the buffer allowed to be transmitted in the TTI, the WTRU determines whether there is another uplink carrier available and data is still available (step 514). If not, the process 500 ends. If so, the process 500 returns to step 510 (or alternatively to step 508) to select the E-TFCI of the next carrier.

At this point, (in step 508), the WTRU may optionally re-determine the highest priority MAC-d flow that has data to be transmitted. The re-selected highest priority MAC-d flow may be different than the one determined initially before filling up the previously selected carrier. If a new highest MAC-d flow is selected, the WTRU determines the power offset based on the HARQ profile of the newly selected MAC-d flow, and may then determine the maximum supported payload (or set of supported E-TFCs) and remaining scheduled grant payload according to the new power offset. Alternatively, the WTRU may determine the MAC-d flow priority only once at the beginning of the procedure (e.g., step 508) and apply the selected HARQ profile and multiplexing list to both carriers. This implies that the WTRU determines the maximum supported payload (or supported E-TFCs and remaining scheduled payload) for both carriers either simultaneously in parallel or only at the time these values are needed according to E-TFC selection sequence. In this case for the second selected carrier the WTRU may return to step 510. It should be noted that the process 500 is applicable to the case that more than two uplink carriers are utilized.

Details of the power allocation, carrier selection, and E-TFC restriction and selection will be explained below.

The maximum supported payload refers to the maximum allowed number of bits that may be transmitted based on the available power for any uplink carrier. This, as an example, may also be referred to as the maximum supported E-TFCI. The maximum supported payload or the set of supported or blocked E-TFCIs, for example in HSPA systems are determined as part of the E-TFC restriction procedure and may be dependent on the selected HARQ offset. Additionally, the set of supported E-TFCI may also be dependent on the minimum set E-TFCI. Embodiments for E-TFC restriction and determination of supported/blocked E-TFCI are described below.

Where referred to hereafter, a MAC-d flow may also refer to a logical channel, a group of logical channels, a data flow, a data stream, or data service or any MAC flow, application flow, etc. All the concepts described herein are equally applicable to other data flows. For example in HSPA system for E-DCH, each MAC-d flow is associated to a logical channel (e.g., there is a one-to-one mapping) and has a priority from 1 to 8 associated to it.

Generally, there are scheduling mechanisms used for uplink transmissions and data transmissions. The scheduling mechanisms may be defined by the quality of service (QoS) requirements and/or the priority of the data streams to be transmitted. Depending of QoS and/or priority of the data streams, some of the data streams may or may not be allowed to be multiplexed and transmitted together in one TTI. Generally, data flows and streams can be grouped in best effort or non real time services and guaranteed bit rate service with some strict delay requirements. In order to meet QoS requirements different scheduling mechanisms are used, some dynamic in nature and some less dynamic.

Generally, wireless systems, such as LTE and high speed uplink packet access (HSUPA), operate on a request-grant basis where WTRUs request a permission to send data, via uplink feedback, and the Node-B (eNB) scheduler and/or RNC decides when and how many WTRUs will be allowed to do so. Hereafter, this is referred to as scheduled mode transmissions. For example in HSPA systems, a request for transmission includes indication of the amount of buffered data in the WTRU and WTRU's available power margin (i.e., UE power headroom (UPH)). The power that may be used for the scheduled transmissions is controlled dynamically by the Node-B through absolute grant and relative grant.

For some data streams with strict delay requirements and guaranteed bit rate, such as voice over IP (VoIP) or signaling radio bearers or any other service that need to meet these requirements, the network may ensure the timely delivery of such transmissions via special scheduling mechanisms that are less dynamic in nature and allow the WTRUs to transmit data from a particular flow on at pre-scheduled time periods, resources, and up to a configured data rate. These flows in some systems such as HSPA for example are referred to as non-scheduled flows. In other systems, such as LTE, they may be referred to as semi-persistent scheduling and flows. Even though the embodiments described herein are described in terms of scheduled and non-scheduled data, it should be understood that they are equally applicable to other systems that use similar scheduling procedure and distinctions between data flows.

Dynamic scheduling, where control channels are used to allocate the resources for certain transmissions and for the possible retransmissions, gives full flexibility for optimizing resource allocation. However, it requires control channel capacity. In order to avoid control channel limitation problem, semi-persistent scheduling (SPS) may be used in systems such as LTE and non-scheduled transmission in systems such as UMTS. Flows that use dynamic scheduling or the dynamic grant-based mechanism (e.g., via physical channel control signaling) will be referred to as scheduled transmissions. Data streams that use a more semi-static and periodic allocation of resources will be referred to as non-scheduled transmissions.

For example, in HSPA, each MAC-d flow is configured to use either scheduled or non-scheduled modes of transmissions, and the WTRU adjusts the data rate for scheduled and non-scheduled flows independently. The maximum data rate of each non-scheduled flow is configured by higher layers, and typically not changed frequently.

In the E-TFC selection procedure, the WTRU may also determine the remaining non-scheduled grant payload for each MAC-d flow with a non-scheduled grant, which refers to and corresponds to the number of bits allowed to be transmitted according to the configured non-scheduled grant for the given MAC-d flow.

The remaining scheduled grant payload in the procedure above refers to the highest payload that could be transmitted according to the network allocated resources. For example, a network allocated resource refers to the serving grant, or to an allocated E-DPDCH to DPCCH power ratio for HSPA systems. The value of the serving grant used for calculating the remaining scheduled grant payloads for the uplink carriers may be based on the value of the actual serving grant allocated for the uplink carriers and selected HARQ power offset. Alternatively, as the remaining scheduled grant payload for the primary carrier and/or the secondary carrier may be based on the scaled or fictitious or virtual grant after power allocation is performed, the WTRU may use the "virtual" or "fictitious" or scaled serving grant to determine the remaining scheduled grant payload. The three terms may be used interchangeably and refer to the power allocation or power split for scheduled transmissions for each carrier. The scaling of the grants is described as part of the power allocation schemes below. Alternatively, if the WTRU is sharing one serving grant for both uplink carriers, (i.e., one serving grant is given for both uplink carriers), the WTRU may use half the serving grant for each uplink carrier. Alternatively, the WTRU may assume that all serving grant is being allocated to one uplink carrier when performing this calculation.

The non-scheduled grant may be carrier specific, (e.g., the configured non-scheduled grant value is assigned and configured for only one carrier, the carrier for which non-scheduled transmission is allowed). The carrier in which non-scheduled transmission is configured/allowed may be predetermined, (e.g., the non-scheduled transmission may be allowed on the primary carrier or alternatively on the secondary carrier). Alternatively, it may be configured by the network dynamically. The value of non-scheduled grant may be carrier independent, in which case a total number is determined for both carriers.

Data flows may be configured to be carrier specific (e.g., network configures a flow and an associated carrier over which this flow may be transmitted). If data flows are carrier specific the WTRU may perform the E-TFC selection procedure independently for each carrier. The network may provide a non-scheduled grant based on a HARQ process that belongs to a carrier, or provide a non-scheduled grant that is applicable to a TTI, and the WTRU chooses a carrier.

If the WTRU is power limited as determined in step 504 in FIG. 5, the WTRU may perform power allocation and split the power between the two (or more than two) carriers within the restriction that the total transmission power over the two carriers does not exceed the maximum power. Further details on how UE determines that it is power limited are described hereafter.

Embodiments for power allocation are disclosed hereafter. The maximum transmission power that is allocated to each carrier may be calculated in a number of ways. In one embodiment, the UL carriers may be equally allocated power up until the individual maximum allowed scheduled transmission power on each carrier, which is based on the serving grants and current channel conditions (e.g., UL DPCCH power). Once the maximum allowed scheduled transmission power is reached on any of the UL carriers, any additional available transmission power is allocated to the other carrier until either the maximum scheduled transmission power is reached on that carrier or the maximum total transmission power has been reached.

Let $P_{max}$ represent the total allowed maximum transmission power combined across both uplink carriers, optionally including backoff, and $P_{granted,z}$ represent the maximum transmission power allowed on carrier z (z=x or y, or z=1 or 2) based on the grant (scheduled and/or non-scheduled) and control channels. Carrier x or y may correspond to either primary or secondary carrier. If more than two carriers are configured, it is understood that more that $P_{granted,z}$ is calculated for all carriers z=1 . . . k, where k is the number of configured carriers. As an example, $P_{granted,z}$ may be calculated as:

$$P_{granted,z} = SG \times P_{DPCCH,z} + P_{DPCCH,z} + P_{E\text{-}DPCCH,z} + P_{HS\text{-}DPCCH,z}. \quad \text{Equation (1)}$$

The term $P_{HS\text{-}DPCCH,z}$ may be removed from equation (1) if the HS-DPCCH is not transmitted on carrier z. Optionally, taking into account non-scheduled transmissions and, the total transmission power that would result in carrier z is equivalent to:

$$P_{granted,z} = SG \times P_{DPCCH,z} + P_{non\text{-}SG} + P_{DPCCH,z} + P_{E\text{-}DPCCH,z} + P_{HS\text{-}DPCCH,z}. \quad \text{Equation (2)}$$

The WTRU determines that it is power limited if the $P_{granted,x} + P_{granted,y} > P_{max}$.

This power allocation scheme aims at equalizing the power used between the two carriers. The power allocated to each carrier may be determined as follows (optionally the following power allocation scheme may be performed if the WTRU is in a power limited state, (i.e., $P_{max} \leq P_{granted,x} + P_{granted,y}$), otherwise the power or grants may not be scaled):

If $\min(P_{max}/2, P_{granted,x}, P_{granted,y}) = P_{max}/2$:

$P_{max,x} = P_{max}/2$ and $P_{max,y} = P_{max}/2$;

Else if $\min(P_{max}/2, P_{granted,x}, P_{granted,y}) = P_{granted,x}$:

$P_{max,x} = P_{granted,x}$ and $P_{max,y} = P_{max} - P_{granted,x}$;

Else (i.e., $\min(P_{max}/2, P_{granted,x}, P_{granted,y}) = P_{granted,y}$):

$P_{max,y} = P_{granted,y}$ and $P_{max,x} = P_{max} - P_{granted,y}$.

Optionally, the power may be capped as shown below (for example, if the method above is performed regardless of the power limitation state):

If $\min(P_{max}/2, P_{granted\_x}, P_{granted\_y}) = P_{max}/2$:

$P_{max\_x} = P_{max}/2$ and $P_{max\_y} = P_{max}/2$;

Else if $\min(P_{max}/2, P_{granted\_x}, P_{granted\_y}) = P_{granted\_x}$:

$P_{max\_x} = P_{granted\_x}$ and $P_{max\_y} = \min(P_{granted\_y}, P_{max} - P_{granted\_x})$;

Else (i.e., $\min(P_{max}/2, P_{granted\_x}, P_{granted\_y}) = P_{granted\_y}$):

$P_{max\_y} = P_{granted\_y}$ and $P_{max\_x} = \min(P_{granted\_x}, P_{max} - P_{granted\_y})$.

Once $P_{max,x}$ is determined in accordance with any of the options described above (this is also applicable to the one described below), the final $P_{max,x}$ to be used may ensure that it does not exceed the allowed power allocated by the actual serving grant for that carrier x, $P_{granted\,x}$. This may be done in the following way:

$P_{max\,x} = \min(P_{max\,x}, P_{granted\,x})$.

Optionally, if the WTRU is in a power limited state, (e.g., $P_{max} < P_{granted\_x} + P_{granted\_y}$) the WTRU may perform the following (otherwise the serving grants and powers are not scaled):

If $\min(P_{granted\_x}, P_{granted\_y}) = P_{granted\_x}$ (i.e., $P_{grant\_x} < P_{grant\_y}$)

$P_{max\_x} = \min(P_{granted\_x}, P_{max}/2)$ and $P_{max\_y} = P_{max} - P_{granted\_x}$ else $P_{max\_y} = \min(P_{granted\_y}, P_{max}/2)$ and $P_{max\_x} = P_{max} - P_{granted\_y}$ The following may also be performed.

If $\min(P_{granted\_x}, P_{granted\_y}) = P_{granted\_x}$ or $P_{grant\_x} < P_{grant\_y}$ $P_{max\_x} = \min(P_{granted\_x}, P_{max}/2)$ and $P_{max\_y} = \min(P_{granted\_y}, P_{max} - P_{granted\_x})$ else $P_{max\_y} = \min(P_{granted\_y}, P_{max}/2)$ and $P_{max\_x} = \min(P_{granted\_x}, P_{max} - P_{granted\_y})$ Alternatively, the power may be split in such a way that the total power used is equalized even in situations where there is not enough power to fill up both carriers up to the minimum grant. More specifically, if $2 \times P_{lowest} < P_{max}$, where $P_{lowest} = \min(P_{granted,x}, P_{granted,y})$ then the formula above may result in some power imbalances, since more power would be allocated to one of the carriers. In order to optimize power allocation the following may be performed and the grant may be scaled if $P_{max} < P_{granted,x} + P_{granted,y}$:

If $2 \times P_{lowest} <= P_{max}$

Then $\theta = P_{max}/(2 \times P_{lowest})$ $P_{max,x} = \theta \times P_{granted,x}$ and $P_{max,y} = \theta \times P_{granted,y}$ Else If $P_{granted,x} < P_{granted,y}$ $P_{max,x} = P_{granted,x}$ (i.e., $SG_{input,x} = SG_x$) and $P_{max,y} = P_{max} - P_{granted,x}$ Else $P_{max,x} = P_{max} - P_{granted,y}$ and $P_{max,y} = P_{granted,y}$ Otherwise the power or grants are not scaled.

Alternatively, the following may be used for power allocation:

If $P_{max} > P_{granted,x} + P_{granted,y}$

Do nothing and keep the same SGs;

Else if $\min(P_{granted,x}, P_{granted,y}) = P_{granted,x}$ or $P_{granted,x} < P_{granted,y}$ Then $P_{max,x} = P_{granted,x}$ or $SG_{max,x} = SG_x$ and $P_{max,y} = P_{max} - P_{granted,x}$;

Else (i.e., $\min(P_{max}/2, P_{granted,x}, P_{granted,y}) = P_{granted,y}$)

Then $P_{max,y} = P_{granted,y}$ or $SG_{max,y} = SG_y$ and $P_{max,x} = P_{max} - P_{granted,y}$;

Else if $P_{granted,x} = P_{granted,y}$.

For both cases the calculated $P_{max,x}$ may be used as a new limit for E-TFC restriction. Alternatively, $P_{max,x}$ may be used to calculate a new scaled, fictitious serving grant $SG_{input\_x} = (P_{max,x} - P_{DPCCH,x} - P_{E-DPCCH,x} + P_{HS-DPCCH,x})/P_{DPCCH,x}$. In the latter case the grant may be the limiting factor on both carriers.

Alternatively, instead of attempting to equalize the total power used between the two carriers the WTRU may attempt to equalize the serving grants being used. Assuming that the maximum E-DPDCH/DPCCH power ratio is provided by the serving grant the WTRU may calculate or estimate the power the WTRU may use for E-DCH scheduled transmissions for carrier $z=\{x,y\}$ as follows:

$$P_{E-DPDCH,z} = SG_z P_{DPCCH,z}. \quad \text{Equation (3)}$$

If $P_{granted,x} + P_{granted,y} < P_{max}$ or equivalently $P_{E-DPDCH,x} + P_{E-DPDCH,y} > P_{max} - (P_{DPCCH,z} + P_{HS-DPCCH,z} + P_{E-DPCCH,z}) = P_{DATA,max}$ then the power used across both carriers need to be scaled down and equalized. The WTRU may then perform a similar procedure as above, but instead of using $P_{granted,z}$ and $P_{max}$ the WTRU may use $P_{E-DPDCH,z}$ and $P_{DATA,max}$, respectively.

Optionally, a minimum power allocation or power ratio may be defined for one or both carriers.

Optionally, both a minimum power allocation for transmission of control channels $P_{min,z}$ ($z=x$ or $y$) and a minimum power ratio for the transmission of data may be defined for one or both of the carriers. $P_{min,z}$ may be calculated as follows:

$$P_{min,z} = P_{DPCCH,z} + P_{E-DPCCH,z} + P_{HS-DPCCH,z}. \quad \text{Equation (4)}$$

The term $P_{HS-DPCCH,z}$ may be omitted if the HS-DPCCH is not transmitted on carrier z. Let $Beta_{ed\_min\_z}$ represent the power ratio required to send the minimum allowed transport block size on carrier z ($z=x$ or $y$). Power is allocated for transmission of control channels as follows: $P_{max,x} = P_{min,x}$ and $P_{max,y} = P_{min,y}$. Remaining power is then allocated to satisfy minimum power ratio requirement of the first carrier, carrier x, as follows:

Set $P_{remaining} = P_{max} - (P_{max,x} + P_{max,y})$

If $P_{remaining} > Beta_{ed\_min,x} \times P_{DPCCH,x}$

Then set $P_{max,x} = Beta_{ed\_min,x} \times P_{DPCCH,x} + P_{max,x}$

Else $P_{remaining}$ may optionally be allocated to carrier y:

$P_{max,y} = P_{max,y} + P_{remaining}$

Remaining power may then be allocated to satisfy minimum power ratio requirement of the second carrier, carrier y, as follows:

Set $P_{remaining} = P_{max} - (P_{max,x} + P_{max,y})$

If $P_{remaining} > Beta_{ed\_min,y} \times P_{DPCCH,y}$

Then set $P_{max,y} = Beta_{ed\_min,y} \times P_{DPCCH,y} + P_{max,y}$

Else $P_{remaining}$ may optionally be allocated to carrier x:

$P_{max,x} = P_{max,x} + P_{remaining}$

Remaining power may then be allocated to both carriers according to any of embodiments disclosed herein, (e.g., by computing a ratio for each carrier).

In the above embodiment, carriers x and y may be interchanged. The carrier to allocate the remaining power first may be chosen using any of the following criteria or any of the carrier selection criteria disclosed above. Carrier x or anchor carrier may be selected first. Alternatively, the carrier with the largest power headroom may be selected first. Alternatively, the carrier with the largest serving grant may be selected first.

In an alternate power allocation embodiment, power may be allocated to each carrier such that power ratios are equally distributed to the two carriers up to the maximum allowed power ratios. This is in contrast to the previous embodiment where absolute power is allocated rather than the power ratios for transmission of data (i.e., $Beta_{ed}$). $P_{max}$ represents the total maximum transmission power combined across both carriers. $SG_z$ represents the serving grant (or equivalently scheduling grant) on carrier z (z=x or y). $PR_z$ represents the power ratio that is allocated to carrier z for transmission of E-DCH. $P_{DPCCH,z}$ represents the transmission power of the UL DPCCH on carrier z. $PC_z$ represents the transmission power of control channels (including UL DPCCH) on carrier z.

$PR_x$ may be calculated assuming both carriers are equally assigned power ratios up to the total transmission power as follows:

$$PR_x = PR_y = (P_{max} - PC_x - PC_y)/(P_{DPCCH,x} + P_{DPCCH,y}).$$

If $PR_x$ exceeds $SG_x$, remaining power may be allocated to carrier y as follows:

If $PR_x > SG_x$, then set $PR_x = SG_x$; and $$PR_y = (P_{max} - PC_x - PC_y - PR_x \times P_{DPCCH,x})/P_{DPCCH,y}.$$

If $PR_y$ exceeds $SG_y$, remaining power may be allocated to carrier x as follows:

If $PR_y > SG_y$, then set $PR_y = SG_y$; and $$PR_x = \min(SG_x, ((P_{max} - PC_x - PC_y - PR_y \times P_{DPCCH,y})/P_{DPCCH,x}))$$

The maximum transmission power for carrier z may be calculated as:

$$P_{max,z} = PR_z \times P_{DPCCH,z} + PC_z.$$

Optionally, a minimum power ratio may be defined for each carrier, $PR_{min,z}$. In this case, the above equations may be modified as follows. $PR_z$ is calculated assuming both carriers are equally assigned power ratios up to the total transmission power as follows:

$$PR_x = PR_y = (P_{max} - PC_x - PC_y)/(P_{DPCCH,x} + P_{DPCCH,y}).$$

It is then verified that minimum power ratio has been assigned to carrier x (if $PR_{min,x}$ is configured and greater than 0) as follows:

If $PR_x < PR_{min,x}$, then assign allocated power of carrier x to carrier y $PR_y = (P_{max} - PC_x - PC_y)/P_{DPCCH,y}$; and $PR_x = 0$.

It is then verified that minimum power ratio has been assigned to carrier y (if $PR_{min,y}$ is configured and greater than 0) as follows:

If $PR_y < PR_{min,y}$, then assign allocated power of carrier y to carrier x $PR_x = (P_{max} - PC_x - PC_y)/P_{DPCCH,x}$; and $PR_y = 0$.

The carriers x and y may be interchanged. Carrier x or anchor carrier may be selected first. Alternatively, the carrier with the largest power headroom or the carrier with the largest serving grant may be selected first.

Power allocation embodiments for reducing wasted power are disclosed hereafter. These may be combined with the power allocation embodiments disclosed above. While the parallel allocation of power and/or grant may result in a lower power imbalance, a waste in power may occur when the grant is scaled down and the WTRU suffers from buffer limitation in the first carrier due to MAC-d flow multiplexing restrictions.

In accordance with one embodiment, a WTRU may determine a scaling factor to scale the power or grant in order to balance the power between the carriers. It is understood that the scaling factor or scaling value may be applicable to the serving grant or power for each carrier and may be calculated via any methods. The scaling factor will be referred to as $\theta$ or may be referred to as $\rho_z$.

Assuming that the maximum E-DPDCH/DPCCH power ratio is provided by the serving grant the WTRU may calculate or estimate the power the WTRU may use for E-DCH scheduled transmissions for carrier z={x,y} as follows (where for example x=1 and y=2, or alternatively x=2, and y=1):

$$P_{E-DPDCH,z} = SG_z \times PDPCCH_z. \quad \text{Equation (5)}$$

Optionally, $P_{E-DPDCH,z}$ may include the power required to transmit scheduled and non-scheduled transmissions, according to allocated serving grant and non-scheduled grant on the carrier (if allowed) or alternatively, the power required for non-scheduled transmissions is captured in the calculation of total transmission power for carrier z as shown below.

In the power limited case, the WTRU needs to reduce the transmit power associated to each carriers so that the total power used does not exceed the maximum power, $P_{max}$. The WTRU may be considered in power limited situation when $P_x + P_y > P_{max}$, or equivalently $P_{E-DPDCH,x} + P_{E-DPDCH,y} > P_{max} - (P_{DPCCH,z} + P_{HS-DPCCH,z} + P_{E-DPCCH,z}) = P_{DATA,max}$. $P_z$ corresponds to the total power used for transmission on carrier z, which may or may not include non-scheduled transmissions, and is determined as follows:

$$P_z = P_{DPCCH,z} + P_{HS-DPCCH,z} + P_{E-DPCCH,z} + P_{E-DPDCH,z}. \quad \text{Equation (6)}$$

In the optional embodiment where non-scheduled power is taken into account for carrier z (if allowed):

$$P_z = P_{DPCCH,z} + P_{HS-DPCCH,z} + P_{E-DPCCH,z} + P_{E-DPDCH,z} + P_{non-SG,z}. \quad \text{Equation (7)}$$

$P_{DATA,max}$ represents the power that may be allocated to E-DCH traffic. Initially, as a first step when the WTRU is power limited, the WTRU computes a scaling factor $\theta = P_{DATA,max}/(P_{E-DPDCH,x} + P_{E-DPDCH,y})$ which may be used to scale the $P_{E-DPDCH,x}$ and/or $P_{E-DPDCH,y}$ or to scale the serving grant.

As part of this embodiment, the $P_{max}$ used may account for the worst case backoff situation (i.e., the backoff incurred if the WTRU were to transmit $P_{E-DPDCH,z}$ according to the serving grant). However, this may result in the power of the WTRU being wasted, because if the WTRU is power limited the actual $P_{E-DPDCH,z,used}$ will correspond to a lower value than the one provided by the serving grant, and therefore the real backoff may be much lower. The same applies to the estimated $P_{E-DPCCH,z}$ value in case E-DPCCH power boosting is configured. The WTRU may use a worst case scenario value, assuming a final $P_{E-DPDCH,z}$ level according to the $SG_z$. However, a power waste may also occur in this case since the used $P_{E-DPDCH,z,used}$ will most likely result in a lower value than the one allowed by the serving grant and therefore the $P_{E-DPCCH,z}$ may be lower than the assumed power used in the equation. Therefore, in order to not waste power the WTRU may use $P_{max}$ without any backoff taken into account, or alternatively with the lowest backoff and the minimum allowed $P_{E\text{-}DPCCH,z}$ value.

Once a scaling factor or value is determined, the WTRU may use this scaling factor or value on one carrier and allow the other carrier to fully use the remaining power and the allowed serving grant. More specifically, the E-TFCI determination (and data filling) may have to be performed sequentially, one carrier at a time, because data from the joint buffer has to be taken sequentially and filled up for one carrier at a time to ensure in-order delivery, and determination of highest priority MAC-d flow may be different in the two carriers depending on buffer and multiplexing restrictions, and therefore the HARQ profile (offset and retransmissions may be different), and E-TFC restrictions, or more specifically the determination of supported E-TFCIs, needs to be done sequentially since the set of supported E-TFCI will depend on the HARQ offset being used and also the back off in the second carrier will be dependent on the E-TFC (amount of codes transmitted in the other carrier).

According to this embodiment, the scaling factor or value determined may only be applied to the first carrier selected. This may impose an absolute maximum E-DPDCH to DPCCH power ratio that the WTRU is allowed to use on the first carrier. A modified power level associated with the E-DPDCH of carrier x may be computed as $P_{E\text{-}DPDCH,mod,x} = \theta \times P_{E\text{-}DPDCH,x}$ where x is the first carrier selected to perform E-TFC selection first. This power may then be mapped into the a fictitious "serving grants" $SG_{input,x} = \theta \times SG_x$.

The WTRU as part of the E-TFC selection for carrier x determines the highest priority MAC-d flow, multiplexing list and HARQ profile and performs the E-TFC selection procedure to determine how many bits the WTRU may fit into this first carrier. The WTRU then determines the set of supported E-TFCs as part of E-TFC restriction for carrier x. The E-TFC restriction may be performed sequentially for the carriers. For example, in this approach the WTRU may assume that it has the full available power and no E-DPDCH and E-DPCCH is being transmitted in the other carrier, when determining the set of supported E-TFCs, (i.e., the scaled serving grant will ensure that the WTRU will not exceed a certain power allocation).

The WTRU then uses $SG_{input,x} = \theta \times SG_x$ as the value for the maximum E-DPDCH/DPCCH to be used to determine the maximum number of bits, k for scheduled transmissions. Based on the logical channel or MAC-d flow priorities, buffer availability, fictitious scheduled grant, and non-scheduled grant, the WTRU then determines the E-TFCI for carrier x.

Once a first carrier is selected and the number of bits that may be included in this carrier have been determined, the WTRU performs E-TFC selection on the other carrier, carrier y. Since due to buffer limitations in the first carrier, not all the allowed power given by the $SG_{input,x}$ may have been used, when performing E-TFC selection on the other carrier the WTRU assumes that it may use all the remaining power up to the actual provided serving grant. More specifically, the $SG_{input,y} = SG_y$, or equivalently the scaling factor, $\theta = 1$ such that $SG_{input,y} = \theta \times SG_y$. Optionally, it may be considered that $P_{max,y} = P_{max}$.

This scheme will allow any unused power to be used by the second carrier, while the parallel allocation scheme is still ensuring that the power of the first carrier never exceeds the allocated power and therefore the power on the second carrier will also never exceed it. Therefore, for carrier y, the WTRU may determine a new higher priority MAC-d flow and new multiplexing list and HARQ profile for the new carrier. E-TFC restriction is performed for this carrier, assuming that the full remaining power is available to the carrier and the power used for the E-DPDCH and E-DPCCH in the other carrier x is taken into account. The WTRU then determines the number of bits or the E-TFCI to use for carrier y, based on the set of supported E-TFCs, the real serving grant of carrier y, and the buffer availability.

This mechanism ensures the following. If there is enough data for carrier x, (i.e., $SG_{input,x}$ is fully used or $P_{E\text{-}DPDCHused,x} = P_{E\text{-}DPDCHmod,x}$ (this is an approximation used as in the initial power allocation scheme), then:

$$P_{E\text{-}DPDCHusedmax,y} = P_{DATA,max} - P_{E\text{-}DPDCHused,x} = P_{DATA,max} - P_{E\text{-}DPDCHmod,x} = P_{E\text{-}DPDCHmod,y}. \quad \text{Equation (8)}$$

This means that the imbalance and allocation are as if both grants were scaled. If there is not enough data for carrier x (i.e., $SG_{input,x}$ is not fully used or $P_{E\text{-}DPDCHused,x} < P_{E\text{-}DPDCHmod,x}$), then $P_{E\text{-}DPDCHmod,x} - P_{E\text{-}DPDCHused,x}$ will be used by the second carrier. This ensures that $P_{E\text{-}DPDCHusedmax,y} = P_{DATA,max} - P_{E\text{-}DPDCHused,x} < P_{DATA,max} - P_{E\text{-}DPDCHmod,x} < P_{E\text{-}DPDCHmod,y}$ therefore $P_{E\text{-}DPDCHmod,y} < P_{E\text{-}DPDCHusedmax,y} < P_{E\text{-}DPDCH,y}$.

Therefore, even though this may sometimes result in the second carrier slightly utilizing a higher power than the scaled $P_{y,new}$, it is ensuring that no power goes to waste and the power imbalance is still within a limit of tolerance.

Alternatively, the WTRU may perform an additional calculation of $P_{input,E\text{-}DPDCHy} = P_{Data} - P_{E\text{-}DPDCHused,x}$. $P_{input,E\text{-}DPDCHy}$ corresponds to $P_{E\text{-}DPDCHmod,y}$, which may be used to calculate $SG_{input,y} = P_{input,E\text{-}DPDCHy} / P_{DPCCHy}$.

Alternatively, the power may be allocated based on an SG and a DPCCH power. The power on each carrier may be scaled with respect to the ratio of the serving grant to DPCCH power on that carrier. More specifically, a fraction of the remaining power allocated for the E-DPDCH on each carrier, $\rho_z$, may be based on the scaling factor $W_z$, z=x,y as follows:

$$\rho_z = W_z / (W_x + W_y), \quad \text{Equation (9)}$$

where $W_z = SG_z / (P_{DPCCH,z})$ z=x,y, $SG_z$ and $P_{DPCCH,z}$ are the serving grant and DPCCH power on carrier z, respectively.

While this approach has shown promising results, it remains difficult for the network to predict the amount of power used on each carrier by a WTRU, as the DPCCH power level varies quickly, and this information is unavailable at the Node-B scheduler.

Alternatively, an average value for the DPCCH power may be used when calculating $W_z$. This averaging may be done in a number of ways. For example, the WTRU may calculate the DPCCH power averaged over a fixed period of time (sliding window). This period of time may be fixed in the specifications, or optionally, this period of time may be configured by the network. The WTRU may use the averaged DPCCH power used in the calculation of the UPH. The WTRU may use the averaged DPCCH power used in the calculation of the UPH for the last transmitted SI. The WTRU may use the averaged DPCCH power used in the calculation of the UPH for the last successfully transmitted SI. The WTRU may use the averaged DPCCH power used in the calculation of the UPH for the last successfully transmitted periodic SI. This approach to DPCCH power estimation may be used for any of the power allocation schemes requiring the power of the DPCCH.

Parallel power allocation schemes while taking into account non-scheduled transmissions are explained hereafter. The network gives a non-scheduled grant based on a HARQ process that belongs to a carrier, or gives a non-scheduled grant that is applicable to a TTI and the WTRU chooses the carrier.

In the embodiments for the parallel power allocation schemes, where the maximum power is scaled and allocated across both carriers prior to filling up the carriers, non-scheduled data and the priority associated with their transmission has not been taken into account. The transmission of non-scheduled data may be allowed on the primary carrier only. This means that if the WTRU is in power limited situation and if the power is split over both carriers, the WTRU may not be able to fully transmit all allowed non-scheduled data, since a portion of the power that could have been used for non-scheduled transmission has been allocated to the other carrier which cannot transmit non-scheduled data. The determination may be made in step 504 in FIG. 10. The WTRU may determine it is in a power limited situation if $P_x+P_y>P_{max}$. $P_x$ may be calculated according to the power required to transmit the E-DCH scheduled data based on the SG, the power required to transmit the E-DCH non-scheduled transmissions, the E-DPCCH, the DPCCH code power and HS-DPCCH power if present. For example, $P_x=(SG\times P_{DPCCH}+P_{non\text{-}SG}+P_{DPCCH}+P_{HS\text{-}DPCCH}+P_{E\text{-}DPCCH})$. $P_y$ is calculated as described in the above embodiment. It is understood that in this example, carrier x corresponds to the carrier in which non-scheduled transmissions are performed.

In accordance with one embodiment, prior to splitting the power across the carriers the WTRU attempts to allocate to the primary carrier the power that the WTRU requires to transmit the allowed and available (if available)_ non-scheduled transmissions. $P_{non\text{-}SG}$ is referred to as the power required to transmit the allowed non-scheduled MAC-d flows for the given TTI, (e.g., the sum of remaining non-scheduled grant payload for each of the allowed MAC-d flow, or each of the allowed MAC-d flows with available data). The allowed MAC-d flows are determined according to the multiplexing list of the highest priority MAC-d flow.

The $P_{non\text{-}SG}$ may be calculated by determining the power required to transmit all allowed and available non-scheduled MAC-d flows. As described above this may be the power required to transmit the total or sum of remaining non-scheduled grant payload for each allowed and available non-scheduled flow. Alternatively, it may be calculated by adding the configured non-scheduled grants up to available number of bits and determining the gain factors or the power required to transmit the calculated number of bits given the HARQ offset of the highest priority MAC-d flow. Using this method allows the WTRU to more precisely calculate the power required according to availability of data. The available number of bits may be a limiting factor even if the WTRU has more non-scheduled grant. Therefore, the "number of non-scheduled bits" for each allowed MAC-d flow that may be transmitted may correspond to min(remaining non-scheduled payload, available number of bits).

The total number of bits that may be transmitted based on the non-scheduled grants and the available bits is equal to N, where N=Σ (non-scheduled data per MAC-d flow allowed according to highest priority MAC-d flow and multiplexing list), where non-scheduled data per MAC-d flow may be determined as min (available non-scheduled data, non-scheduled grant) or as remaining non-scheduled grant payload (which as defined refers to the non-scheduled grant). Optionally, headers may be taken into account. The WTRU may then determine the power required to transmit N bits, or the E-TFCI that would allow the transmission of this data, $P_{non\text{-}SG}$. The allowed MAC-d flow may correspond to the MAC-d flows that are allowed to be transmitted on the given TTI, and/or to the MAC-d flows allowed according to the multiplexing list of the highest priority MAC-d flow with data available or the highest priority MAC-d flow with data available for the given carrier or the highest priority non-scheduled MAC-d flow (excluding scheduled transmissions). The $P_{non\text{-}SG}$ may optionally take into account the DPCCH powers and HS-DPCCH power if available in the calculation or alternatively be equivalent to:

$$P_{non\text{-}SG}=\text{Gainfactor}\times\text{DPCCH power(primary carrier DPCCH power)}, \quad \text{Equation (10)}$$

where GainFactor is the E-DPDCH gain factor calculated for the non-scheduled transmissions, using for example the E-DPDCH power extrapolation formula or alternatively the E-DPDCH power interpolation formula in 3GPP TS 25.214. The GainFactor calculation may potentially use the HARQ offset of the highest priority MAC-d flow for which there is non-scheduled data available, or alternatively the highest priority MAC-d flow for which there is any kind of data available, or alternatively a preconfigured HARQ offset.

Given the $P_{non\text{-}SG}$, the power allocation across both carriers may then be determined in one of the following options. In accordance with a first option, the WTRU determines the $P_{max}$ to be used for splitting the power across both carriers for scheduled transmissions as follows:

$$P_{remaining}=P_{max}-P_{non\text{-}SG}; \quad \text{Equation (11)}$$

where the initial $P_{max}$ is the maximum power allowed by the WTRU, potentially taking into account a power backoff. The WTRU then uses the new remaining power to determine how to share and split the power across both carriers according to any of the embodiments described herein for the scheduled grants and data. For instance in order to determine θ as described above, the WTRU may use $P_{remaining}$ in equation (11) instead of $P_{max}$ or for one of the following solutions:

$$P_{DATA,max} = P_{remaining} - \sum_i P_{DPCCH,i} + P_{HS\text{-}DPCCH,i} + P_{E\text{-}DPCCH,i}, \quad \text{Equation (12)}$$

or $$P_{DATA,max} = P_{max} - \left(P_{non\text{-}SG} + \sum_{i=1}^{2} P_{DPCCH,i} + P_{HS\text{-}DPCCH,i} + P_{E\text{-}DPCCH,i}\right). \quad \text{Equation (13)}$$

This means that calculated $P_{DATA,max}$ is the available power that may be used for scheduled transmissions. In the case where no non-scheduled transmissions are available, $P_{remaining}=P_{max}$.

In accordance with a second option, the WTRU may attempt to balance the power across both carriers by first allocating the power to the primary carrier for non scheduled transmission and allocating the remaining power to the other carrier if enough grant is available. $P_{E\text{-}DPDCH,i}$ is equivalent to the power required for E-DPDCH transmission in carrier i. Therefore, in this option the WTRU provides $P_2$ to carrier 2 as follows:

$$P_2=\text{Min}(P_{max}-P_{non\text{-}SG},P_{E\text{-}DPDCH,2}). \quad \text{Equation (14)}$$

If power still remains, the WTRU allocates it to carrier 1 up to minimum of available grant and power. The second option may be followed if the following condition is true: $P_{tot}=P_1+P_2>P_{max}$ where $P_1$ and $P_2$ are the total transmit power allowed by scheduled and non-scheduled transmissions on each carrier, respectively.

Alternatively, if the WTRU allocates $P_{non\text{-}SG}$ to the primary carrier then the WTRU allocates to carrier 2 at least the same power as allocated to the primary carrier for non-scheduled transmission initially (i.e., $P_2=\text{Min}(P_{non-SG}, P_{E-DPDCH,2}, P_{remaining})$), where $P_{remaining}$ is the remaining power after non scheduled data in the primary carrier is taking into account. If power is still available (i.e., $P_{remaining} > P_2 + P_{non-SG}$) then scaling of the remaining power across both carriers may be done using any of the methods described for the parallel power sharing approaches.

In accordance with a third option, θ or scaling factor is determined for scheduled transmissions independently without taking into account the power that would be required by non-scheduled transmissions. More specifically, the scaling factor is calculated assuming that the total headroom, $P_{DATA,max}$, is available for scheduled transmissions and the scaling factor is determined accordingly.

In addition, in one embodiment, E-TFC restriction on the first carrier may be performed assuming all the power (i.e., $P_{max}$) is available to this carrier only and assuming that no data is being transmitted on the other carrier (i.e., $P_{E-DPDCH,2}$ and $P_{E-DPCCH,2}$ are zero). This ensures that all the available power will go to the non-scheduled transmissions if non-scheduled grant, data, and power are all available. Additionally, if scheduled transmissions have higher priority than non-scheduled transmissions they may get a higher priority in utilizing the available power up to the serving grant (or scaled grant). The remaining power may then be allocated to non-scheduled transmissions. This is different when compared to the serving grant being scaled as in option 1 or option 2. In the case that the scheduled data have higher priority then non-scheduled data, the WTRU will have a limited amount of data it may actually transmit, since some power has been pre-allocated to non-scheduled transmissions.

When scheduled transmissions have higher priority than non-scheduled transmissions, in a situation where the serving grant or fictitious serving grant in the first carrier has been fully utilized, and data from this scheduled higher priority MAC-d flow still remains, the WTRU may still have power available and scheduled higher priority data in the buffer, but the SG of the first carrier has been exceeded. In such situation, the WTRU may continue to fill up the first carrier with non-scheduled data even though non-scheduled transmissions may have a lower priority. Once data up to non-scheduled grants has been included in the first carrier, the WTRU may then move to the second carrier and continue the transmission of the higher priority scheduled MAC-d flow. Even though this implies that the available power is being used by lower priority data while higher priority data is still available, for simplicity reasons it is better to complete one carrier first then move on to the other.

Alternatively, in order to minimize the amount of power used for lower priority data, the WTRU may chose to fill up the secondary carrier first. This may be desirable, if the WTRU has scheduled transmissions with higher priority than non-scheduled transmissions. This will allow the WTRU to optimize one carrier with the higher priority data using the serving grant and then once the grant/power/or available data is utilized the WTRU moves to the primary carrier. In the primary carrier, if scheduled MAC-d flows with higher priority still exist, the WTRU may utilize the power and serving grant of the primary carrier to transmit this data. Based on remaining power, if the next highest priority data is a non-scheduled data the WTRU may then use the remaining of the power to transmit the non-scheduled data.

In accordance with a fourth option, the WTRU may perform E-TFC selection on the anchor carrier for non-scheduled MAC-d flows first. This allows the WTRU to determine the number of non-scheduled data that may be transmitted in the primary carrier and the power required for this transmission. The WTRU then performs dual carrier E-TFC selection for scheduled transmissions by determining a scaling factor where the maximum power accounts for what is known to be transmitted by non-scheduled by the first E-TFC selection.

When determining whether the WTRU is power limited or for power allocation, if, for the given TTI, the HARQ process is deactivated, or the WTRU is not allowed or configured to transmit scheduled transmissions for that TTI, then the power for E-DPDCH transmission for scheduled transmissions may not be included in the calculations. This may imply that $P_{E-DPDCH,z}=0$ if only considering scheduled transmissions. Alternatively, the WTRU may still assume it may transmit scheduled data on the carrier.

Optionally, the WTRU may not consider $P_{E-DPCCHz}$ for that carrier, if no scheduled transmissions are allowed and no non-scheduled transmissions are available or allowed. Alternatively, the WTRU may consider the power of E-DPCCH, even if no E-DCH data will be transmitted. Alternatively, if an SI is triggered for this carrier, the WTRU may consider the power of E-DPCCH and/or E-DPDCH to be the power required to transmit an SI only, as formulated below $P_{E-DPDCH,z}=P_{E-DPDCH,0,z}$ and $P_{E-DPCCH,z}=P_{E-DPCCH,0,z}$.

Embodiments for selecting an uplink carrier for initial E-TFC selection are disclosed hereafter. The embodiments for carrier selection described below may be performed individually or in combination with any other embodiments disclosed herein. The procedures affecting the choice of the number of bits to be transmitted in each uplink carrier and the power to use in each uplink carrier, and the like are all dependent on which uplink carrier the WTRU selects and treats first.

In accordance with one embodiment, a WTRU may give priority to, and treat first, the anchor carrier. This may be desirable if non-scheduled transmissions are allowed on the anchor carrier. Alternatively, the secondary carrier may be given a priority and selected first.

Alternatively, the WTRU may determine the highest priority carrier to minimize inter-cell interference, maximize WTRU battery life, and/or provide the most efficient energy per bit transmission. More specifically, the WTRU may choose the uplink carrier that has the largest calculated carrier power headroom. The WTRU may base this determination on the current power headroom, (e.g., UE power headroom (UPH)) measurement for each carrier (UPH indicates the ratio of the maximum WTRU transmission power and the corresponding DPCCH code power) or on the results of the E-TFC restriction procedure, (e.g., normalized remaining power margin (NRPM) calculation for each carrier, or remaining power), which equivalently translates to the carrier with the lowest DPCCH power ($P_{DPCCH}$). For instance, the uplink carrier selection may be made in terms of the number of bits, (e.g., a priority may be given to the carrier which provides a greater "maximum supported payload" between the anchor carrier and the supplementary carrier). The maximum supported payload is the payload determined based on the remaining power (e.g., NRPM or other value disclosed below) of the WTRU.

Alternatively, the WTRU may give a priority to the uplink carrier which provides the WTRU with the largest available grant, which allows the WTRU to send the highest amount of data and possibly create the least number of PDUs and thus increase efficiency and reduce overhead. The WTRU may select a carrier based on the maximum value between the serving grant for the anchor carrier (SGa) and serving grant for the supplementary carrier (SGs).

Alternatively, the WTRU may provide a priority to the carrier that provides the greater "remaining scheduled grant payload" between the anchor carrier and the supplementary carrier. The remaining scheduled grant payload is the available payload determined based on the scheduling grant from the network and remaining after processing of the DCH and HS-DPCCH.

Alternatively, the WTRU may optimize between maximum power and maximum grant. More specifically, the WTRU may select a carrier that allows the highest number of bits to be transmitted. The WTRU determines the number of bits that may be transmitted for anchor carrier and supplementary carrier limited by both power and grant, (i.e., "available payload" for the anchor carrier and "available payload" for the supplementary carrier), and may select the carrier that provides the highest available payload. The available payload may be determined as a minimum between the remaining scheduled grant payload and the maximum supported payload.

Optionally, the sum of "remaining non-scheduled payload" for each MAC-d flow that may be multiplexed (or all non-scheduled MAC-d flows that may have data available) may also be taken into account when calculating the available payload. More specifically, the available payload may be determined as a minimum of (remaining scheduled grant payload+SUM(remaining non-scheduled payloads for all allowed non-scheduled flows)) and the maximum supported payload. If non-scheduled flows are allowed in one carrier only, (e.g., in the anchor carrier only), the available payload for the anchor carrier is considered.

Even though the embodiments above were described in terms of the number of bits, it is equally applicable to the carrier selection based in terms of the power ratios. For example, the WTRU may use the serving grant (SG), which provides the maximum number of bits that may be transmitted in terms of grant (serving grant for anchor carrier (SGa) and serving grant for supplementary carrier (SGs)), where $SG=P_{E-DPDCH}/P_{DPCCH}$. Alternatively, the WTRU may use the remaining power, which provides the maximum number of bits based on remaining power. The remaining power (RP) may be computed in any manner by subtracting out any power parameters from the maximum transmit power (typically referred to as $P_{MAX}$) for a particular carrier. For example, the RP that may be used to select a carrier may be one or a combination of the following (where z=x or y):

$$RPz=P_{MAX}/P_{DPCCH,target,z}; \quad (1)$$

$$RPz=(P_{MAX}-P_{E-DPCCH,z}-P_{HS-DPCCH}-P_{DPCCH,target,z})/P_{DPCCH,target,z}; \text{ or} \quad (2)$$

$$RPz=\text{Normalized remaining power margin (NRPM).} \quad (3)$$

$P_{MAX}$ is the maximum WTRU transmitter power.

$P_{DPCCH,target,z}$ is derived as follows. $P_{DPCCH,x}(t)$ and $P_{DPCCH,y}(t)$ represents a slotwise estimate of the current WTRU DPCCH power in carrier x and y respectively at time t. If at time t, the WTRU is transmitting a compressed mode frame in carrier z, where z can take value x or y, then $P_{DPCCH,comp,z}(t)=P_{DPCCH,z}(t)\times(N_{pilot,C}/N_{pilot,N})$ else $P_{DPCCH,comp,z}(t)=P_{DPCCH,z}(t)$. If the WTRU is not transmitting uplink DPCCH during the slot at time t over carrier z, either due to compressed mode gaps or when discontinuous uplink DPCCH transmission operation is enabled then the power may not contribute to the filtered result. Samples of $P_{DPCCH,comp,z}(t)$ may be filtered using a filter period of 3 slotwise estimates of $P_{DPCCH,comp,z}(t)$ when the E-DCH TTI is 2 ms or 15 slotwise estimates of $P_{DPCCH,comp,z}$ when the E-DCH TTI is 10 ms to give $P_{DPCCH,filtered,z}$. If the target E-DCH TTI for which $NRPM_j$ evaluated does not correspond to a compressed mode frame then $P_{DPCCH,target,z}=P_{DPCCH,filtered,z}$. If the target E-DCH TTI for which $NRPM_j$ is being evaluated corresponds to a compressed mode frame then $P_{DPCCH,target,z}=P_{DPCCH,filtered,z}\times(N_{pilot,N}/N_{pilot,C})$. $N_{pilot,C}$ is the number of pilot bits per slot on the DPCCH in compressed frames, and $N_{pilot,N}$ is the number of pilot bits per slot in non-compressed frames.

$P_{HS-DPCCH}$ is an estimated HS-DPCCH transmit power based on the maximum HS-DPCCH gain factor based on $P_{DPCCH,target,z}$ and the most recent signalled values of $\Delta_{ACK}$, $\Delta_{NACK}$ and $\Delta_{CQI}$. If the target E-DCH TTI for which $NRPM_j$ is being evaluated corresponds to a compressed mode frame then the modification to the gain factors which occur due to compressed mode may be included in the estimate of $P_{HS-DPCCH,z}$. The HS-DPCCH may be allowed to be transmitted in one carrier which may be carrier x or carrier y, in which case z=x and z=y, respectively. If HS-DPCCH is transmitted in both carriers then $P_{HS-DPCCH,z}$ corresponds to the estimated DPDCH power in both carriers.

$P_{E-DPCCH,z}$ is an estimated E-DPCCH transmit power for E-TFCI determined for carrier z, (z=x or y).

Referring now to another embodiment, a maximum supported available power (MSAP) may be computed. The MSAP is the power that may be used for a transmission on that carrier based on the serving grant and the remaining power for carrier x and y as follows:

$$MSAPx=MIN(SGx,RPx); \text{ and}$$

$$MSAPy=MIN(SGy,RPy),$$

where MSAPx is MSAP for the anchor carrier (or the first carrier), MSAPy is MSAP for the supplementary carrier (or the second carrier), RPx is RP of the anchor carrier (or the first carrier), and RPy is RP of the supplementary carrier (or the second carrier).

The WTRU may chose to initially fill up (i.e., give a priority to) the carrier with the maximum MSAP. Once the selected carrier is filled up and if there is remaining power, the remaining power is allocated to the other carrier. If the MSAP is equal on both carriers, then the WTRU may chose the carrier with the highest remaining power or equivalently the carrier with the lowest $P_{DPCCH}$. If the remaining powers and $P_{DPCCH}$ are equal on both carriers, the WTRU may chose the carrier with the highest grant or just chose the anchor carrier for transmission.

If the non-scheduled grants are provided on a per carrier basis or if the non-scheduled transmissions are allowed on one carrier, the WTRU may give priority to the carrier that contains the highest priority non-scheduled MAC-d flow to be transmitted in that TTI or allows a non-scheduled MAC-d flow. For instance, if the non-scheduled transmissions are allowed on the primary carrier only and for the given HARQ process the WTRU is configured with non-scheduled data and data is available, the WTRU may give priority to the primary carrier (i.e., fill the primary carrier first). If in a given TTI the highest priority MAC-d flow does not correspond to a non-scheduled flow, but a non-scheduled flow is allowed to be multiplexed with the selected highest priority MAC-d flow, the WTRU may still give priority to the carrier which allows non-scheduled transmissions. Therefore, if any non-scheduled flows are allowed to be transmitted in a current TTI and non-scheduled data is available, the WTRU may first fill up the carrier which allows transmission of the non-scheduled flows. The WTRU fills up the selected carrier with non-scheduled and scheduled data up to the available power and/or grant according to the configured logical channel priority.

The remaining carrier(s) is then filled up if data, power and grant are available for that carrier.

Alternatively, the primary carrier may be selected first to be filled up. For example, for the non-scheduled transmission the WTRU may select the carrier with non-scheduled transmission first. Once the non-scheduled transmissions are included in the selected carrier, the WTRU may then proceed to carrier selection for scheduled transmissions using one or a combination of the embodiments described above. Using this alternative embodiment, the WTRU may select a carrier for scheduled transmission that is different from the first one selected for non-scheduled data at the given TTI. As part of this embodiment, the WTRU may perform E-TFC selection and restriction on the newly selected carrier, wherein the E-TFC restriction if performed sequentially for the newly selected carrier takes into account the power used for the E-DCH and E-DPCCH power for the non-scheduled transmission in the other carrier. If the parallel E-TFC restriction is performed the power has been properly allocated therefore the WTRU does not need to re-calculate. The WTRU may then fill up the carrier with scheduled transmission up to allowed power, grant, or available data. If power, data, and grant are available for the other carrier, the WTRU may go back to the other carrier (which contains the initial non-scheduled data) and fill it up with scheduled data.

Alternatively, the secondary carrier may be selected first. For example, if a scheduled flow has a highest priority in the given TTI, the E-TFC selection may be performed such that the carrier for the scheduled transmissions is selected according to one of the embodiments described herein. The E-TFC selection on the secondary carrier may determine, and include, the number of bits according to grant, power and buffer availability and then fill up the primary carrier.

Alternatively, the E-TFC function when treating the non-scheduled transmissions according to the logical channel priority ensures that the data for the non-scheduled transmissions is sent to the proper carrier (e.g., primary carrier). This implies treating the scheduled data first, wherein the carrier to fill up first is selected according to one of the embodiments described above. The E-TFC selection calculates the number of bits that may be transmitted on the selected carrier and fills it up with data from the highest priority channel. If data from this channel has been exceeded, or the maximum amount of data based on scheduled grants has been reached and if power still remains, then the WTRU may fill up data from the next highest priority logical channel. If the next logical channel corresponds to a non-scheduled flow and non-scheduled flow may be transmitted in the anchor carrier only and the current carrier corresponds to the secondary carrier, the WTRU may perform E-TFC selection for the anchor carrier even if power and/or grant remains on the secondary carrier or alternatively, the WTRU may complete transmission on the secondary carrier, e.g., up to available allowed data in buffer or up to allowed grant/power. The E-TFC restriction procedure (e.g., determining a set of supported E-TFCs) is performed for the anchor carrier. If E-TFC restriction is done sequentially it may take into account the E-DPDCH power used in the secondary carrier. The WTRU then fills up the carrier which has non-scheduled flows.

If power still remains and if some grant is still available then the WTRU may perform one or a combination of the following two embodiments for scheduled transmissions. The WTRU may continue filling up the anchor carrier up to maximum power or maximum grant. Once the carrier is filled up and there is still power available or grant available in the other carrier, then the E-TFC selection may go back to the initial selected carrier to fill it up. This would then require the WTRU running an additional E-TFC restriction procedure to take into account the power for the initial transmission in this carrier and the transmission in the anchor carrier. Alternatively, the E-TFC selection procedure ends, even though there is remaining power and grant in the other carrier.

Alternatively, the WTRU may move back to the originally selected carrier and continue to fill up that carrier up to maximum power and/or maximum grant. This may require the WTRU to run E-TFC restriction procedures again. If power still remains in the anchor carrier, then the WTRU may then move back to the anchor carrier.

Similarly, if a DPDCH transmission is allowed on a particular carrier only (e.g., primary carrier only) and DCH data is available, the WTRU may give priority to the primary carrier or the carrier on which DPDCH is allowed. Alternatively, the WTRU may perform TFC selection and schedule the DPDCH data for transmission on the primary carrier and then use one or a combination of the embodiments described herein to decide which carrier to give priority for E-DCH transmission.

Alternatively, in the case where one carrier is power-limited and the other carrier is grant-limited, the WTRU may choose the carrier that is power-limited, for the case where the power is shared on both carriers. A power-limited carrier may be a carrier for which there is not enough power to transmit all the data allowed by the grants (scheduled and/or non-scheduled). A grant-limited carrier may be a carrier which has enough remaining power to transmit more data than allowed by the grant.

Alternatively, the carrier selection may depend on the amount of data available in the buffers. If limited amount of data is available the WTRU may favor the carrier with the highest available power headroom or NRPM or equivalently lowest $P_{DPCCH}$, otherwise one of above-described embodiments may be applied. More specifically, as an example, if TEBS in bits is less than maximum supported payload and less than the number of bits allowed by the grants for both carriers, then the WTRU may chose the carrier with the largest remaining power (or power headroom or NRPM, or the like).

Alternatively, the WTRU may decide to give priority to the carrier that has to transmit an HS-DPCCH in that TTI. Alternatively, the WTRU may choose to give priority to the carrier for which DPCCH has to be transmitted (according to either DPCCH burst cycles on each carrier or inactivity periods on one carrier). More specifically, if one carrier is in discontinues transmission (DTX) cycle 1, while the other carrier is in DTX cycle 2 (DTX cycle 2 is longer than DTX cycle 1), the WTRU may give priority to the carrier in which DTX cycle 1 is ongoing. In case one carrier is in continuous transmission and the other carrier is in DTX, the WTRU may give priority to the carrier for which a continuous transmission is ongoing.

In the case where an HS-DPCCH is transmitted on one carrier only (i.e., there is one HS-DPCCH channelization code to provide feedback or even if two codes are used the WTRU transmits from one carrier only), if an HS-DPCCH has to be transmitted, the WTRU may give priority to that carrier. Alternatively, the WTRU may take into consideration the power used for HS-DPCCH in the NRPM calculation for that carrier and chose a carrier using one of the embodiments described above. The network may allow the WTRU to choose the carrier on which HS-DPCCH feedback is transmitted. More specifically, for dual carrier operation the WTRU is not limited to transmit the HS-DPCCH on the anchor carrier only. This will allow the WTRU to choose the carrier with highest priority or the carrier that optimizes transmission according to one or a combination of the embodiments described above and if HS-DPCCH feedback is required, the feedback is also sent on that carrier.

Alternatively, the WTRU may base its decision to select a carrier on one or a combination of CPICH measurement and HARQ error rates on each carrier, etc.

In the case where a retransmission is ongoing in one of the carriers, the WTRU may perform E-DCH transmission on the other carrier and thus perform E-TFC selection for that carrier only.

As part of the E-TFC selection and the carrier selection procedures, the WTRU performs E-TFC restriction (also referred to as E-DCH transport format combination index (E-TFCI) restriction) in order to determine the maximum supported payload for the anchor carrier and the maximum supported payload for the supplementary carrier, (i.e., the maximum MAC-e or MAC-i protocol data unit (PDU) size that may be sent on the anchor and supplementary uplink carriers, respectively) given the ratio of the maximum allowed/available transmit power and the DPCCH code power. The maximum number of bits for the anchor and supplementary uplink carriers may be determined based on the maximum allowed/available transmit power and DPCCH code power of the anchor carrier and the supplementary carrier, respectively. If one DPCCH is transmitted, the maximum number of bits may be determined based on the power of the transmitted or on a defined or configured offset from the transmitted DPCCH.

In case each carrier has an independent maximum transmit power, the maximum number of bits is determined based on the maximum power allowed for the anchor carrier and the supplementary carrier and the DPCCH code power of the anchor carrier and the supplementary carrier, respectively. In the case where both carriers have a shared maximum transmit power, the WTRU may calculate the maximum number of bits assuming that the shared maximum transmit power is allocated and available to each carrier. In the case where both carriers have a shared maximum transmission power with an additional per-carrier maximum transmission power (e.g., in the case where power is pre-allocated differently between carriers), the WTRU may calculate the maximum number of bits assuming that the maximum transmission power is the minimum of the shared maximum transmission power and the maximum transmission power configured/calculated for each carrier.

The E-TFC restriction may be done at each TTI and pre-calculated for all HARQ power offsets or profiles. Once the data is being filled up the WTRU may determine the set of supported E-TFC based on the selected HARQ power offsets, without having to re-calculate the NRPM, but just pulling it from the lookup table. Alternatively, the WTRU may calculate the NRPM whenever needed.

For some of the embodiments for priority carrier selection disclosed above, the WTRU may first determine the NRPM of each carrier independently, assuming that no data will be transmitted on the other carrier. The independent NRPM calculations may be performed for carriers 1 and 2 as follows:

$$NRPM_{j,1} = (PMax_{j,1} - P_{DPCCH,target1} - P_{DPCCH,target2} - P_{DPDCH} - P_{HS-DPCCH1} - P_{E-DPCCH,j,1})/P_{DPCCH,target1}; \text{ and} \quad \text{Equation (15)}$$

$$NRPM_{j,2} = (PMax_{j,2} - P_{DPCCH,target2} - P_{DPCCH,target1} - P_{DPDCH} - P_{HS-DPCCH2} - P_{E-DPCCH,j,2})/P_{DPCCH,target2}. \quad \text{Equation (16)}$$

$PMax_{j,1}$ is the maximum WTRU transmitter power for E-TFC-j on carrier 1, and $PMax_{j,2}$ is the maximum WTRU transmitter power for E-TFC-j on carrier 2. $PMax_{j,1}$ may be equal to, or different from, $PMax_{j,2}$ depending on the power requirements and/or the number of power amplifiers (PAs) and/or power allocation for each carrier. $P_{DPCCH,target1}$ and $P_{DPCCH,target2}$ may be taken into consideration if the WTRU has to transmit the DPCCH in both carriers regardless of whether E-DCH data is transmitted or not, unless there is inactivity periods due to DTX. $P_{HS-DPCCH2}$ is applicable in the case that a second HS-DPCCH is being transmitted in the second carrier; otherwise the same HS-PDCCH power may be subtracted from both carriers' NRPM calculation. If DPDCH transmission is taking place for the TTI for which E-TFC selection/restriction is being performed, the WTRU may take this into account in the NRPM calculation (i.e., $P_{DPDCH}$ may be subtracted as well). If no DPDCH transmission is taking place (or if DPDCH transmission is not allowed with dual carrier) the $P_{DPDCH}$ may not be taken into account. In the case where DPDCH is only allowed in the primary carrier then only NRPM for the primary carrier may take that into account. Alternatively, the power for DPDCH is taken into account in the calculation of both NRPM when selecting a carrier, regardless of where DPDCH is being transmitted. The same is applicable to the HS-DPCCH. The maximum available supported payload or supported E-TFCIs may then be determined for each carrier independently according to this calculation, or otherwise stated the supported E-TFCs.

Embodiments for E-TFC restriction are described hereafter. The embodiments for the E-TFC restriction described herein may be applicable to any E-TFC selection schemes disclosed above. The E-TFC restriction procedure may be carried out for each uplink carrier sequentially or in parallel for both uplink carriers.

When E-TFC restriction is carried out in parallel for both uplink carriers, a fraction of the total WTRU power may be pre-allocated to each uplink carrier or calculated on a TTI-by-TTI basis by the WTRU. The maximum power allocated to carrier x (regardless of maximum power reduction (MPR) of the E-TFC$_j$) for E-DCH transmission becomes $P_{max,x}$ (x=carrier 1 or carrier 2) in a DC-HSUPA system. Optionally, if non-scheduled transmissions are present, $P_{max,x}$ may also take into consideration the power required by the WTRU to transmit the non-scheduled transmissions. For instance, $P_{max,x} = P_{non-s} + P_{sg}$ where $P_{non-s}$ is the power required for the non-scheduled transmissions calculated as described below and $P_{sg}$ is the power allocated to carrier x to transmit the scheduled transmissions. The sum of the powers allocated to the uplink carriers (e.g., $P_{max,x}$ and $P_{max,y}$) is smaller than or equal to the maximum allowed WTRU power (according to the WTRU power class or as configured by the network). $P_{max,x}$ and $P_{max,y}$ may represent the final allocated power to carrier x and carrier y, respectively (including the powers for the control channels for carrier x and y, respectively). In that case, the normalized remaining power may be calculated independently for each carrier. The NRPM for E-TFCj and carrier x and y may take the following form:

$$NRPM_{j,x} = P_{max,x}/P_{DPCCH,\ target\ x}; \text{ and} \quad \text{Equation (17)}$$

$$NRPM_{j,y} = P_{max,y}/P_{DPCCH,\ target\ y}. \quad \text{Equation (18)}$$

If $P_{max,x}$ and $P_{max,y}$ do not include the powers for the control channels, then the normalized remaining power may be calculated independently for each carrier. The NRPM for E-TFC$_j$ and carriers 1 and 2 may take the following forms:

$$NRPM_{j,1} = (PMax_{j,1} - P_{DPCCH,\ target1} - P_{HS-DPCCH1} - P_{E-DPCCH,j,1})/P_{DPCCH,\ target1}; \text{ and} \quad \text{Equation (19)}$$

$$NRPM_{j,2} = (PMax_{j,2} - P_{DPCCH,\ target2} - P_{E-DPCCH,j,2})/P_{DPCCH,\ target2}. \quad \text{Equation (20)}$$

In equations (19) and (20), it is assumed that no DPDCH is transmitted and the HS-DPCCH may only be transmitted over carrier 1 (e.g., anchor carrier). If no HS-DPCCH is to be transmitted, then $P_{HS\text{-}DPCCH1}=0$. $PMax_{j,1}$ and $PMax_{j,2}$ represent the maximum power on carriers 1 and 2, respectively, taking into account the maximum power reduction allowed for E-TFC$_j$ and the maximum allocated power for each carrier. For E-TFC$_j$, $PMax_{j,x}$, x=1, 2, is calculated by reducing the maximum power allocated to carrier x ($P_{max,x}$) by the maximum power reduction (MRP) allowed for E-TFC$_j$, for example (in dB) as follows:

$$PMax_{j,x,dB} = P_{max,x,dB} - MPR_{E\text{-}TFCj};\qquad \text{Equation (21)}$$

where $MPR_{E\text{-}TFCj}$ is the amount of power reduction for E-TFCj in dB, $P_{max,x,dB}$ is the maximum power allocated for carrier x in dB, and $PMax_{j,x,dB}$ is the resulting maximum power for carrier x and E-TFCj in dB. Alternatively, the maximum power reduction may be taken into account in the initial calculation of $P_{max,x,dB}$ and in that case $PMax_{j,x}=P_{max,x}$. The E-TFC restriction procedure then determines the set of supported and blocked E-TFCs for each carrier at each TTI. Since this operation depends on the HARQ profile of a given MAC-d flow, the WTRU may calculate the supported set for each MAC-d flow for both carriers at each TTI. $P_{max,x}$ may be determined, or pre-configured, or calculated dynamically in a number of ways.

In accordance with another embodiment, the E-TFC restriction procedures for the carriers may be performed sequentially. This embodiment is applicable in the parallel case when a retransmission is ongoing. The WTRU first selects one carrier for E-DCH transmission, which will be referred to as carrier x as described above. If a retransmission is ongoing, carrier x will correspond to the carrier in which a retransmission is ongoing and no E-TFC restriction or E-TFC selection may be performed for carrier x. The other carrier will be referred to as carrier y. It is understood, that E-TFC restriction may be performed for carrier x for other purposes in the WTRU, however, for E-TFC selection purposes E-TFC restriction or otherwise stated the maximum supported payload for this carrier x does not need to determined for the carrier in which a retransmission is ongoing at the given TTI. The selection of the carrier may be performed using one of the embodiments described above. Once carrier x is selected, the E-TFC selection procedure for carrier x has to perform an estimation of the power leftover from TFC selection if DPDCH is present in carrier x or carrier y if DPDCH transmission is allowed in one carrier (if DPDCH transmission is not allowed at all, the power of DPDCH is not considered), from the HS-DPCCH if being transmitted in carrier x or carrier y (if HS-DPCCH transmission is allowed in one carrier), and from DPCCH transmission in carrier y (if being transmitted).

The WTRU estimates the normalized remaining power margin available for E-TFC selection for carrier x, if being performed, based on the following equation for E-TFC candidate j:

$$NRPM_{j,x} = (PMax_{j,x} - P_{DPCCH,target\,x} - P_{DPCCH,target\,y} - P_{DPDCH,x,y} - P_{HS\text{-}DPCCH,x,y} - P_{E\text{-}DPCCH,j,x})/P_{DPCCH,target\,x}.\qquad \text{Equation (22)}$$

The WTRU then estimates the normalized remaining power margin available for E-TFC selection for carrier y based on the following equation for E-TFC candidate j (the NRPM for carrier y is calculated after E-TFC selection for carrier x is completed (i.e., once the WTRU has selected the E-TFCI to be transmitted in carrier x) or alternatively, if a retransmission is ongoing in carrier x). It is understood that the calculation of NRPM or remaining power in case of a retransmission accounts for the power used by the data channel(s) and control channel by the retransmission. This is applicable for all power allocation schemes.

NRPM for carrier y, may be be calculated as follows:

$$NRPM_{j,y} = (PMax_{j,y} - P_{DPCCH,target\,x} - P_{DPCCH,target\,y} - P_{HS\text{-}DPCCH,z} - P_{E\text{-}DPCCH,x} - P_{E\text{-}DPDCH,x} - P_{E\text{-}DPCCH,j,y})/P_{DPCCH,target\,y}\qquad \text{Equation (23)}$$

$PMax_{j,x}$ is the maximum WTRU transmitter power for E-TFC-j. This may correspond to the total shared WTRU transmission power and may be equal to $PMax_{j,y}$ or may be a total allowed maximum power on carrier x. $PMax_{j,y}$ is the maximum WTRU transmitter power for E-TFC-j. This may correspond to the total shared WTRU transmission power and may be equal to $PMax_{j,x}$ or may be a total allowed maximum power on carrier y.

$P_{DPCCH,target,z}$ (z=x or y) is derived as follows. $P_{DPCCH,x}(t)$ and $P_{DPCCH,y}(t)$ represents a slotwise estimate of the current WTRU DPCCH power in carrier x and y respectively at time t. If at time t, the WTRU is transmitting a compressed mode frame in carrier z, where z can take value x or y, then $P_{DPCCH,comp,z}(t) = P_{DPCCH,z}(t) \times (N_{pilot,C}/N_{pilot,N})$ else $P_{DPCCH,comp,z}(t) = P_{DPCCH,z}(t)$. If the WTRU is not transmitting uplink DPCCH during the slot at time t over carrier z, either due to compressed mode gaps or when discontinuous uplink DPCCH transmission operation is enabled then the power may not contribute to the filtered result. Samples of $P_{DPCCH,comp,z}(t)$ may be filtered using a filter period of 3 slotwise estimates of $P_{DPCCH,comp,z}(t)$ when the E-DCH TTI is 2 ms or 15 slotwise estimates of $P_{DPCCH,comp,z}$ when the E-DCH TTI is 10 ms to give $P_{DPCCH,filtered,z}$. If the target E-DCH TTI for which $NRPM_j$ evaluated does not correspond to a compressed mode frame then $P_{DPCCH,target,z} = P_{DPCCH,filtered,z}$. If the target E-DCH TTI for which $NRPM_j$ is being evaluated corresponds to a compressed mode frame then $P_{DPCCH,target,z} = P_{DPCCH,filtered,z} \times (N_{pilot,N}/N_{pilot,C})$. $N_{pilot,C}$ is the number of pilot bits per slot on the DPCCH in compressed frames, and $N_{pilot,N}$ is the number of pilot bits per slot in non-compressed frames.

$P_{DPDCH,z}$ is an estimated DPDCH transmit power, based on $P_{DPCCH,target,z}$ and the gain factors from the TFC selection that has already been made for carrier z. If the target E-DCH TTI for which $NRPM_j$ is being evaluated corresponds to a compressed mode frame then the modification to the gain factors which occur due to compressed mode may be included in the estimate of $P_{DPDCH}$. The DPDCH may be allowed to be transmitted in one carrier, which may be carrier x or carrier y and the $P_{DPDCH,z}$ corresponds to the estimated DPDCH power in the respective carrier (z=x or z=y, respectively). If DPDCH is transmitted in both carriers then $P_{DPDCH,z}$ corresponds to the sum of the estimated DPDCH power in both carriers.

$P_{HS\text{-}DPCCH,z}$ is an estimated HS-DPCCH transmit power based on the maximum HS-DPCCH gain factor based on $P_{DPCCH,target,z}$ and the most recent signalled values of $\Delta_{ACK}$, $\Delta_{NACK}$ and $\Delta_{CQI}$. If the target E-DCH TTI for which $NRPM_j$ is being evaluated corresponds to a compressed mode frame then the modification to the gain factors which occur due to compressed mode may be included in the estimate of $P_{HS\text{-}DPCCH,z}$. The HS-DPCCH may be allowed to be transmitted in one carrier which may be carrier x or carrier y, in which case z=x and z=y, respectively. If HS-DPCCH is transmitted in both carriers then $P_{HS\text{-}DPCCH,z}$ corresponds to the estimated DPDCH power in both carriers.

$P_{E\text{-}DPCCH,j,x}$ is an estimated E-DPCCH transmit power for E-TFCI$_j$. If E-TFCI$_j$ is smaller than or equal to E-TFCI$_{ec,boost}$ the estimate is based on $P_{DPCCH,target\,x}$ and the E-DPCCH gain factor calculated using the most recent signalled value of $\Delta_{E\text{-}DPCCH}$. If E-TFCI$_j$ is greater than E-TFCI$_{ec,boost}$ the estimate is based on the E-DPCCH gain factor, $\beta_{ec,j}$, which is calculated for E-TFCI$_j$. If the target E-DCH TTI for which NRPM$_j$ is being evaluated corresponds to a compressed mode frame then the modification to the gain factors which occur due to compressed mode may be included in the estimate of $P_{E\text{-}DPCCH,j,x}$.

$P_{E\text{-}DPCCH,j,x}$ is an estimated E-DPCCH transmit power for E-TFCI determined for carrier x, and $P_{E\text{-}DPDCH,x}$ is an estimated E-DPDCH transmit power for the E-TFCI determined for carrier x.

$P_{E\text{-}DPCCH,j,y}$ is an estimated E-DPCCH transmit power for E-TFCI$_j$. If E-TFCI$_j$ is smaller than or equal to E-TFCI$_{ec,boost}$ the estimate is based on $P_{DPCCH,target\ y}$ and the E-DPCCH gain factor calculated using the most recent signalled value of $\Delta_{E\text{-}DPCCH}$. If E-TFCI$_j$ is greater than E-TFCI$_{ec,boost}$ the estimate is based on the E-DPCCH gain factor, $\beta_{ec,j}$, which is calculated for E-TFCI$_j$. If the target E-DCH TTI for which NRPM$_j$ is being evaluated corresponds to a compressed mode frame then the modification to the gain factors which occur due to compressed mode may be included in the estimate of $P_{E\text{-}DPCCH,j,y}$. All power variables are expressed in linear power units.

In the case where scheduling information (SI) is transmitted per carrier, SI might be triggered for one carrier and has to be transmitted over that carrier. This implies that the WTRU may have to transmit the SI over that carrier regardless of whether it will be able to transmit any other data on that carrier. Therefore, it is proposed that the WTRU pre-allocates or allocates power for at least the transmission of that SI in the carrier that triggered the SI.

In an example used to pre-allocated power, the E-TFC restriction, for this particular embodiment, may account for the fact that SI will need to be sent on the other carrier and thus allocate power or pre-allocated power for at least one SI and the corresponding E-DPCCH required to transmit the E-TFC for one SI. The WTRU may include the power of the E-DPDCH required to transmit the SI in the calculation of $P_z$, $P_{granted,z}$, or alternatively include in the NRPM calculation as described below.

Since the WTRU may run out of power in the first carrier, the NRPM calculation may remove the power that will be needed for the E-DPDCH and E-DPCCH in the other carrier for SI. This will allow for enough power to be available in the other carrier to transmit at least the SI and the maximum power is not exceeded. The NRPM may be calculated as follows:

$$\text{NRPM}_{j,x} = (P\text{Max}_{j,x} - P_{DPCCH,target\ x} - P_{DPCCH,target\ y} - P_{DPDCH,x,y} - P_{HS\text{-}DPCCH,x,y} - P_{E\text{-}DPCCH,j,x} - P_{E\text{-}DPCCH,0,y} - P_{E\text{-}DPDCH,0,y}) / P_{DPCCH,target\ x};$$

Equation (24)

where, $P_{E\text{-}DPCCH,0,y}$ and $P_{E\text{-}DPDCH,0,y}$ are taken into account when SI is triggered and has to be transmitted on the other carrier and they correspond to the E-DPDCH and E-DPCCH power required to transmit E-TFCI=0 (i.e., the E-TFC to transmit SI).

In the case where the SI may be transmitted in any carrier once triggered, the SI may be sent over the first selected carrier and therefore there no need to account for the power that would have to be used in the other carrier.

When the WTRU calculates the NRPM of carrier x in the sequential approach or in the parallel approach, the WTRU may subtract the $P_{E\text{-}DPCCH,y}$ anticipated to be transmitted based on the scaled grant (i.e., θSGy), where θ being a scaling factor. Optionally, the $P_{E\text{-}DPDCH,y}$ that may be allowed by the new scaled grant may also be subtracted from $P_{max}$. This may be necessary when the scaling factor did not account for the E-DPCCH and E-DPDCH power of both carriers when calculated.

As part of E-TFC selection the WTRU determines the state of each E-TFC based on the available normalized remaining power margin. A given E-TFC may be in either a supported state or a blocked state. Even in situations, where according to the E-TFC restriction no E-TFCs are in a supported state (the available power does not allow the transmission of any of the E-TFCs), the WTRU may consider the E-TFCs included in the minimum set E-TFCs to be in a supported state. With dual carrier operation, the usage of minimum set E-TFC is described below.

Where one minimum E-TFC set is configured, a number of rules on the usage of the minimum set are described herein. In one embodiment, the WTRU may allow minimum set E-TFC in the first selected carrier only. If the WTRU does not have enough power available to transmit data on the second carrier the WTRU may not be allowed to transmit any data on the second carrier, even if it is allowed by the minimum E-TFC set. Alternatively, in that case, the WTRU may apply the minimum E-TFC set on the second selected carrier (i.e., the minimum set E-TFCIs may be used and will be considered as supported on both carriers).

Alternatively, the WTRU may not transmit anything (i.e., does not consider the minimum set E-TFC as supported) on the second carrier if the WTRU is in cell edge condition and does not have enough power to transmit in the first carrier (i.e., the WTRU had to use the minimum E-TFC set or because of the retransmission power in the first carrier the remaining power is not enough to fully allow the transmission of any of the E-TFCIs on the second carrier). Alternatively, if the NRPM is below a predetermined or configured threshold the WTRU may not consider the minimum set E-TFCI as supported on the second carrier (e.g., if NRPM is <0). Alternatively, if the UE power headroom (UPH) is below a threshold, the WTRU may not transmit on the second carrier. Alternatively, the WTRU may choose not to transmit on the second carrier if the amount of remaining data is below a threshold (i.e., TEBS is below a predetermined or configured threshold). Alternatively, the WTRU may be allowed to use the minimum E-TFC set, if configured by the network, on the primary carrier. This will allow the WTRU to transmit at least a minimum E-TFC on the primary carrier even if this carrier is the second selected carrier or is the only carrier, since a retransmission may be ongoing on the other carrier. This may be beneficial when non-scheduled transmissions may only be transmitted on the primary carrier.

Alternatively, the minimum E-TFC set may be only applied to the first selected carrier when two new transmissions are taking place. For the case where a new transmission is taking place on one carrier and a retransmission on the other carrier, the WTRU may make use of the minimum E-TFC on this carrier in which E-TFC selection is taking place. Alternatively, one of the criteria described below may be used in combination to decide when to allow or disallow the minimum set E-TFC on the carrier in which a new transmission is taking place.

Alternatively, the WTRU may be allowed a minimum E-TFC on the carrier that allows non-scheduled transmission. Optionally, the minimum E-TFC may be applied to that carrier if at the given TTI the WTRU has non-scheduled data and it is allowed to transmit non scheduled data on that carrier. This rule may apply regardless of whether it is a second carrier or alternatively it may apply when the second carrier is being treated. The rules for the first select carrier may be similar to the one discussed above.

Alternatively, the minimum E-TFC may be independently configured by the network, and the WTRU follows the network configuration of the minimum E-TFC regardless what carrier is selected first.

Alternatively, a single minimum E-TFC may be configured by the network. For example, if a minimum E-TFC is configured for one carrier by the network while it is absent for the other carrier, the WTRU follows the network configuration of the minimum E-TFC and may apply it for both carriers whether parallel E-TFC restriction procedure or sequential restriction procedure is used.

If no minimum E-TFC is used, and there is no power available the E-TFC selection will output no supported E-TFCs and thus no transmission will take place, unless an SI is present. Optionally, the WTRU may not even perform E-TFC selection on the second carrier if it has determined that the maximum power allowed has already been exceeded by the first selected carrier or the carrier in which a retransmission is taking place.

Alternatively, the WTRU may be configured and allowed to transmit in one carrier at a time. Once the highest priority carrier is selected according to one or a combination of the criteria above, the WTRU may not transmit on the other carrier.

Example embodiments for E-TFC selection for independent maximum power limitation are explained hereafter. The WTRU may have a different transmission powers and maximum allowed power for each carrier, which may depend on the particular device configuration or design. This depends on implementation design, (e.g., a WTRU may be designed with two different power amplifiers and two different antennas), and/or on network control and configuration. It is also applicable if the WTRU pre-allocates the power between the carriers, or allocates the power in parallel, as described in the embodiments above. In these situations, the maximum power or available power that may be used by each carrier corresponds to the allocated power per carrier. The embodiments are also applicable to the case where power is shared between the carriers but the power is allocated or scaled between the carriers prior to filling up the carriers.

Where the powers are pre-allocated or the maximum amount of power is independent on each carrier, the MAC PDUs may have to be filled up sequentially due to the fact that the delivery order of RLC PDUs has to be maintained in order to allow proper operation of higher layers. Additionally, the WTRU may be buffer limited in which case enough data to transmit over one carrier may be available.

In this situation, the WTRU may initially choose the highest priority carrier P1 based on one of the embodiments described above. For instance, the WTRU may select the carrier with the higher power headroom, equivalently the carrier with the lower DPCCH power to be filled up with data first or the primary or secondary carrier may be filled up first. This allows, even a buffer limited WTRU to transmit most of its data, or its highest priority data, over the carrier with the best channel quality or over the carrier that allows transmission of the highest priority data, such as non-scheduled transmissions.

According to the highest priority MAC-d flow, associated HARQ profile and multiplexing list, the WTRU then fills up the available space on the transport block of carrier p1 (i.e., creates MAC-e or MAC-i to be sent on carrier p1), according to the "Maximum Supported Payload p1", "Remaining Scheduled Grant Payload p1", and remaining non-scheduled grant payload, if allowed and configured in the selected carrier, P1. As previously mentioned, this corresponds to the number of bits that may be transmitted according to the allowed power, allowed scheduled grant, and allowed non-serving grant, respectively. In this situation, allowed power and allowed grant may correspond to scaled values of the power and/or grant of each carrier or the configured powers or grants. This may be done if the power or grant is proportionally split between the two carriers or allocated in parallel. If SI needs to be sent, the WTRU may send it in carrier p1, or alternatively send it in the carrier in which the SI is configured to be transmitted.

Once the WTRU has completed the available space on carrier p1, it then fills up next carrier. At this point the WTRU may re-determine the highest priority MAC-d flow that has data to be transmitted and is allowed in the carrier being treated. At this point the highest priority MAC-d flow may be different than the one determined initially, prior to carrier p1 being filled up.

When determining the highest priority MAC-d flow the WTRU may, for every carrier, determine the highest priority MAC-d flow configured with data available amongst all MAC-d flows. In an alternate embodiment, the WTRU may, for every carrier for which E-TFC selection or highest priority MAC-d flow selection is being performed, determine the highest priority MAC-d flow amongst all MAC-d flows allowed to be transmitted on the given carrier.

If the carrier for which E-TFC selection is being performed does not allow a certain type of MAC-d flow, when determining the highest priority MAC-d flow the WTRU may not consider the MAC-d flows that are not allowed for transmission on the given carrier. For instance, if the WTRU is performing E-TFC selection for the second carrier, it may not include non-scheduled MAC-d flows in the selection of highest priority MAC-d flow. So if a non-scheduled MAC-d flow has data available and has the highest configured MAC-d priority the WTRU may not use this MAC-d flow as its highest priority MAC-d flow and may not use the HARQ profile, power offset and HARQ retransmission, and multiplexing list for the TTI for the carrier. For specific example, for HSPA dual carrier UL when treating the second carrier the WTRU may determine the highest priority MAC-d flow amongst all scheduled MAC-d flows.

Once the highest MAC-d flow is determined, the WTRU determines the new allowed MAC-d flows that may be multiplexed in this TTI, and the power offset based on the HARQ profile of the selected MAC-d flow to be used for the new carrier. The WTRU may then determine the Maximum Supported Payload and Remaining Scheduled Grant Payload according to the new power offset and fill up the carrier with data if available accordingly.

Alternatively, the WTRU may determine the Maximum Supported Payload and Remaining Scheduled payload for both carriers at the beginning of the E-TFC selection procedure or prior to filling up the carrier, which implies that the WTRU can use the same power offset for both carriers regardless of whether data from that first highest selected MAC-d flow is being transmitted on both carriers. In this case, the multiplexing list will remain the same on both carriers and may be a limiting factor when not enough data is available from those logical channels, but the WTRU has more power and grant available for transmission of other logical channels.

Once carrier p1 (which may be determined as above and filled up sequentially) is filled up with data, the WTRU immediately moves to the other carrier and continues to fill it up with data.

Alternatively, the carriers may be filled up in parallel, which implies that the data from all the allowed logical channels is split between the two carriers. In order to avoid out-of-order delivery, the data or the RLC buffer has to be split.

For instance, if 10 RLC PDUs with SN 0 to 9 are available, RLC PDUs 0 to 4 are sent to carrier one and 5 to 9 are sent to carrier two. The WTRU then moves to the next logical channel if space still remains and the buffer is again split in the same way.

Alternatively, the E-TFC and carrier filling may be performed in parallel, but each carrier takes data from different logical channels. This implies that the WTRU selects the two highest priority MAC-d flows, determines the HARQ profile for each and the multiplexing list for each and maps them to the two individual carriers. This will allow the WTRU to fill up and perform E-TFC in parallel without risking out-of-order RLC delivery. However, this may result in situations where data from the highest logical channel is still available but the WTRU may no longer send them, since the carrier is full.

In another embodiment, data flows may be carrier specific. In this case the WTRU may perform the E-TFC selection procedure independently for each carrier.

Example embodiments for E-TFC selection for total combined maximum power limitation are described hereafter. Some of the aspects of this embodiments may also be applicable as described above if the power between the two carriers is allocated in parallel or some form of dynamic power allocation is performed.

In a sequential approach, when the WTRU maximum power is shared amongst both carriers, the WTRU may initially select the highest priority carrier (P1) using one of the embodiments described above. E-TFC restriction and selection may still be performed sequentially, wherein the available power and grant used are equivalent to the allocated or scaled power or grant.

Once the WTRU has selected the highest priority carrier, the WTRU performs the E-TFC selection and restriction procedure, where the highest priority MAC-d flow is selected and the power offset, the Maximum Supported payload p1 is determined, the Scheduled Available Payload is selected according to the serving grant of carrier P1 and the non-scheduled available payload is selected. If SI needs to be transmitted, it may be treated with the first selected carrier or alternatively it may be treated on the carrier in which it is allowed to be transmitted. In this case, the WTRU may perform a sequential E-TFC restriction procedure as described above, where the WTRU assumes all the power is available to be used by carrier P1 and assuming that no data is being transmitted on the secondary carrier. The WTRU creates a MAC-e or MAC-i PDU to be transmitted on this carrier according to the E-TFC selection. Alternatively, if the SI is sent in one carrier only (i.e., the anchor carrier only), then the E-TFC selection takes it into account when performing E-TFC for the carrier in which the SI is being sent.

The maximum supported payload, (i.e., E-TFC restriction), for the selected carrier may be determined, for example, according to the NRPM calculation. In the case where the WTRU has a retransmission in carrier x, then no E-TFC selection is performed for carrier x. The WTRU performs E-TFC selection and creates a MAC-i or MAC-e PDU for the carrier y, the remaining carrier.

The WTRU then has to create a MAC-e or MAC-i PDU for the remaining carrier. At this point the WTRU may re-determine (or determine for the first time if a retransmission is ongoing on carrier x) the highest priority MAC-d flow that has data to be transmitted and the power offset based on the HARQ profile of the selected MAC-d flow and the MAC-d flow multiplexing list. Alternatively, the WTRU uses the same power offset determined initially in the procedure.

The WTRU then performs the E-TFC restriction procedure for this second carrier. The WTRU may take into account the power that will be used from the first carrier and the remaining available power is used when calculating the maximum supported payload or when determining the set of supported E-TFCIs. Alternatively, the WTRU may subtract a "backoff power" (i.e., the particular power losses experienced when the WTRU transmits on two carriers in the same TTI), prior to performing the E-TFC restriction on the second carrier, (i.e., the second selected carrier), when two new transmissions take place or when one new transmission is taking place due to a HARQ retransmission in the other carrier.

In these embodiments described herein, the WTRU may be configured to not to transmit a DPCCH when it is determined that data does not need to be sent. The WTRU may also be configured to not transmit any data on a second carrier if it does not have enough power where the maximum power is allocated per carrier. For instance, if one of the carriers does not have enough power, the WTRU may use one carrier to transmit (the one that has the highest UPH or highest NRPM), instead of using the minimum set E-TFCI, or alternatively, the WTRU may not transmit in one of the carriers if both do not have enough power. The WTRU may use the minimum set on one of the carriers and may not transmit on the second.

The MAC-i or MAC-e PDU is then filled up according to the determined maximum supported payload, the scheduled available payload (according to the serving grant of this carrier), and the non-scheduled available payload, if applicable.

In another embodiment, the WTRU may select the E-TFC on each carrier in such a way that the transmission power (over all UL channels, i.e., DPCCH, E-DPCCH, HS-DPCCH, E-DPDCH) on each carrier is the same or the difference between the two is less than a pre-configured maximum value. This may be achieved, for instance, by calculating for a given transmission power level which E-TFCs may be transmitted on each carrier given the transmission power of the DPCCH and other channels on each carrier. For instance, assuming that the DPCCH power levels are 7 dBm and 10 dBm on, say, carriers 1 and 2 respectively, and that the power levels of the HS-DPCCH and E-DPCCH are each −3 dB below that of the DPCCH, if the transmission power level on each carrier is 18 dBm, the power headrooms on each carrier are 8 dB and 5 dB respectively, and the corresponding E-TFC sizes may be 600 bits and 300 bits. Thus the WTRU may transmit with equal power (of 18 dBm) on both carriers by selecting an E-TFC of 600 bits on the carrier 1 and an E-TFC of 300 bits on carrier 2.

This principle may be applied in different cases. If the WTRU transmission is limited by the maximum UL power, the WTRU may select the E-TFC on each carrier by splitting the maximum UL power equally between the two carriers (thus the UL power available to each carrier would be 3 dB below the maximum) and determining the maximum supported E-TFC on each carrier using the method disclosed above. If the WTRU transmission is limited by the amount of data in the WTRU buffer, the WTRU may seek the transmission power level of both carriers such that the amount of data that may be transmitted with the resulting E-TFCs on each carrier corresponds to the amount of data in the buffer.

In another embodiment, the WTRU may select the E-TFC on each carrier in such a way that the interference load incurred on each carrier is same or approximately the same. The interference load incurred on a carrier may, for instance, be estimated as the power ratio between the E-DPDCH power and the DPCCH power, which corresponds to the power ratio used for scheduling. Thus, provided that the scheduling grant and the power headroom is sufficient on both carriers, the WTRU selects the E-TFC on each carrier by determining how many bytes may be transmitted from the WTRU buffer, based on grant and by determining the needed E-TFC size on each carrier by dividing this number of bytes by 2 and applying the appropriate MAC headers.

This method would result equal power ratios on each carrier provided that mapping between reference power ratios and reference E-TFCs is the same between the carriers, and provided that all the data belong to logical channels that have the same HARQ offset. In case where the data belongs to logical channels that do not all have the same HARQ offset, the WTRU has to find which sharing of bytes that result in the same power ratio for both E-TFCs.

Example embodiments are described below that combine the embodiments described herein. These embodiments are merely illustrative, and other combinations of the embodiments described herein are contemplated by the present invention. The actions may optionally be performed in any combinations (e.g., across more than one embodiment). In particular, actions related to the anchor carrier may also be applicable to the secondary carrier.

A first of these embodiments takes a parallel approach with allocation handled at the E-TFC restriction level. In this embodiment, the WTRU determines if it is power-limited. The WTRU calculates the amount of power for the E-DPDCH data as follows:

$$P_{DATA,max} = P_{max} - \left(\sum_{z=1}^{2} P_{DPCCH,z} + P_{HS-DPCCH,z} + P_{E-DPCCH,z}\right), \quad \text{Equation (25)}$$

where $P_{max}$ accounts for the necessary power backoff for dual-carrier operations, and the power of the E-DPCCH for the carrier z (z=x or y) is calculated based on the maximum E-DPDCH power for that carrier according to the serving grant. And then if $P_x + P_y > P_{DATA,max}$, the WTRU is power limited. $P_z$ (z=x or y) in these example embodiments may correspond to the power required for scheduled E-DPDCH transmissions. In a mathematical formulation $P_z$ may correspond to, may mean, or may be defined as $P_{E-DPDCH,z}$ according to equation (5). More specifically:

$$P_z = P_{E-DPDCH,z} = SG_z \times P_{DPCCH,z}. \quad \text{Equation (26)}$$

The WTRU calculates the fraction of remaining power to be allocated to each carrier, according to any of the embodiments described above. The normalized remaining power for each carrier may be calculated, for example, as follows:

$$NRPM,x = \rho_x(P_{DATA,max})/P_{DPCCH,x}, \text{ and} \quad \text{Equation (27)}$$

$$NRPM,y = \rho_y(P_{DATA,max})/P_{DPCCH,y}, \quad \text{Equation (28)}$$

where $\rho_z$ (z=x or y) is the fraction of remaining power allocated to carrier z, based on some power allocation rule. Throughout this example embodiments, $\rho_z(P_{DATA,max})$ represents the power allocated to carrier z for E-DCH transmission, using any of the power allocation schemes/embodiments. This in an another example formulation may also correspond to $P_{max,z}$ or $P_{E-DPDCHmod,z}$ or $(P_{E-DPDCHmod,z} + P_{non-SG})$.

Alternatively, the normalized remaining power for each carrier may be calculated, for example, as follows:

$$NRPM,x = \left[P_{max} - \left(\sum_{z=1}^{2} P_{DPCCH,z} + P_{HS-DPCCH,z} + P_{E-DPCCH,z}\right)\right] / P_{DPCCH,x} - SG_{input,y}, \quad \text{Equation (29)}$$

$$NRPM,y = \left[P_{max} - \left(\sum_{z=1}^{2} P_{DPCCH,z} + P_{HS-DPCCH,z} + P_{E-DPCCH,z}\right)\right] / P_{DPCCH,y} - SG_{input,x}, \quad \text{Equation (30)}$$

where $SG_{input,x}$ and $SG_{input,y}$ are the fictitious serving grants for carriers x and y, respectively.

The WTRU then executes E-TFC restriction based on these two NRPM for each carrier separately. The conventional E-TFC Selection may then be executed for one carrier at a time without any changes to the serving grants, starting with the anchor carrier over which the non-scheduled transmissions are being transmitted or with any of the carriers selected according to any of the procedures described above.

A further embodiment takes a parallel approach with allocation handled at the E-TFC restriction level and enables protection of non-scheduled transmission. In this embodiment, the WTRU determines if it is power-limited. The WTRU calculates the amount of power for the E-DPDCH data as in equation (25). If $P_x + P_y > P_{DATA,max}$, or optionally if $P_x + P_y + P_{non-SG} > P_{DATA,max}$ if $P_x$ does not include the power for the non-scheduled transmissions, the WTRU is power limited. The WTRU calculates the fraction of remaining power to be allocated to each carrier, according to any of the embodiments described above. The normalized remaining power for each carrier may be calculated as in equations (26) and (26). The WTRU then executes E-TFC restriction based on these two NRPM for each carrier separately. The WTRU then executes E-TFC selection for each carrier separately. For the anchor carrier, the WTRU uses a virtual serving grant to ensure that non-scheduled transmissions are transmitted. This virtual serving grant may be calculated as follows:

$$SG_{input,x} = (\rho_x P_{DATA,max} - P_{non-SG})/P_{DPCCH,x}. \quad \text{Equation (31)}$$

where it is assumed that the power allocation ensures that this virtual serving grant is non-negative. E-TFC selection is run using the conventional approach for the secondary carrier.

Yet another embodiment takes a parallel approach with allocation handled at the E-TFC restriction level and provides for absolute protection of non-scheduled transmission. In this embodiment, the WTRU determines if it is power-limited by for example taking into account the power required for scheduled and/or non-scheduled and control channels on both carriers according to any of the embodiments described above.

The WTRU calculates the amount of power for the scheduled E-DPDCH data as follows:

$$P_{DATA,max} = P_{max} - \left(P_{non-SG} + \sum_{z=1}^{2} P_{DPCCH,z} + P_{HS-DPCCH,z} + P_{E-DPCCH,z}\right), \quad \text{Equation (32)}$$

where $P_{max}$ accounts for the necessary power backoff for dual-carrier operations, and the power of the E-DPCCH for the carrier z (z=x or y) is calculated based on the maximum E-DPDCH power for that carrier according to the serving grant. $P_{DATA,max}$ here corresponds to the power available for scheduled E-DPDCH. If $P_x+P_y>P_{DATA,max}$, the WTRU is power limited. The WTRU calculates the fraction of remaining power to be allocated to each carrier, according to any of the embodiments described above where the power of the non-scheduled transmission is taken into account for the first carrier. The normalized remaining power for each carrier may be calculated as follows:

$$NRPM,x=(\rho_x P_{DATA,max}+P_{non-SG})/P_{DPCCH,x}; \text{ and} \quad \text{Equation (33)}$$

$$NRPM,y=\rho_y P_{DATA,max}/P_{DPCCH,y}, \quad \text{Equation (34)}$$

where $\rho_z$ is the fraction of remaining power allocated to carrier z for the scheduled transmissions, based on some power allocation rule optionally taking into account that non-scheduled transmissions may be taking place. The WTRU then executes E-TFC restriction based on these two NRPM for each carrier separately. For carrier x, the power of the non-scheduled transmission is added to the remaining power on the first carrier to ensure that the supported E-TFCIs for carrier x may also carry the non-scheduled transmissions. It is understood that if in an example implementation, if $\rho_x P_{DATA,max}$ includes the power allocated to carrier x, or primary carrier, for both scheduled and non-scheduled, $P_{non-SG}$ does not need to be added to the formula.

The WTRU then executes E-TFC selection for each carrier separately. The WTRU uses as an input to the E-TFC selection the full serving grant (without scaling) on both carriers, allowing the headroom on each carrier to be used as a pool of resources for both scheduled and non-scheduled and respecting the logical channel priority of MAC-d flows with data available.

In a different example implementation 3, for the anchor carrier, the WTRU uses a virtual serving grant to ensure that non-scheduled transmissions are transmitted. This virtual serving grant may be calculated as follows:

$$SG_{input,x}=(\rho_x P_{DATA,max})/P_{DPCCH,x}. \quad \text{Equation (35)}$$

E-TFC selection is run using the conventional approach for the secondary carrier, optionally also using a virtual serving grant calculated the same way.

A further embodiment handles allocation at the E-TFC restriction level and provides for absolute protection of non-scheduled transmission and power re-allocation. In this embodiment, the WTRU determines if it is power-limited. The WTRU calculates the amount of power for the scheduled E-DPDCH data as in equation (32). If $P_x+P_y>P_{DATA,max}$, the WTRU is power limited. The WTRU calculates the fraction of remaining power to be allocated to each carrier, according to any of the rules described above where the power of the non-scheduled transmission is taken into account for the first carrier. The normalized remaining power for each carrier may be calculated as in equation (33). The WTRU then executes E-TFC restriction for the first carrier based on NRPM,x. For carrier x, the power of the non-scheduled transmission is added to the remaining power on the first carrier to ensure that the supported E-TFCIs for carrier x may also carry the non-scheduled transmissions.

The WTRU then executes E-TFC selection for the anchor carrier (carrier x here). For the anchor carrier, the WTRU uses a virtual serving grant to ensure that non-scheduled transmissions are transmitted. This virtual serving grant may be calculated as in equation (35). E-TFC selection is run using the conventional approach for the secondary carrier, with E-TFC restriction based on the total remaining power after E-TFC selection is executed on the anchor carrier and optionally with the restriction that no non-scheduled flows are transmitted. When filling up the second carrier the UE may use the full serving grant for the secondary as an input to the E-TFC selection.

Another embodiment takes a parallel approach with allocation handled at the grant level and provides for absolute protection of non-scheduled transmission. In this embodiment, the WTRU determines if it is power-limited. The WTRU calculates the amount of power for the scheduled E-DPDCH data as in equation (32). If $P_x+P_y>P_{DATA,max}$ or if $P_x+P_y>P_{DATA,max}-P_{non-SG}$, if $P_{DATA,max}$ does not take into account non-scheduled already according to equation (25) for example, the WTRU is power limited. The WTRU calculates the fraction of remaining power to be allocated to each carrier, according to any of the rules described above where the power of the non-scheduled transmission is taken into account for the first carrier. For example, the virtual grant for each carrier may be given as follows:

$$SG_{input,x}=\Phi SG_x; \text{ and} \quad \text{Equation (36)}$$

$$SG_{input,y}=\Phi SG_y, \quad \text{Equation (37)}$$

where $\Phi$ is given by:

$$\Phi=(P_{DATA,max})/(P_x+P_y). \quad \text{Equation (38)}$$

The WTRU executes E-TFC restriction for the two carriers, assuming no E-DPDCH is being transmitted on any of the two carriers, e.g. according to equation (25). According to this embodiment, NRPM for each carrier would be equivalent to:

$$NRPM,x=P_{DATA,max}/P_{DPCCH,x}, \text{ and} \quad \text{Equation (39)}$$

$$NRPM,y=P_{DATA,max}/P_{DPCCH,y}, \quad \text{Equation (40)}$$

or equivalent to equations (26) or (27) where $\rho_z$ is equal to 1. If $P_{DATA,max}$ has taken $P_{non-SG}$ into account according to equation (31) then:

$$NRPM,x=(P_{DATA,max}+P_{non-SG})/P_{DPCCH,x}, \text{ and} \quad \text{Equation (41)}$$

$$NRPM,y=P_{DATA,max}/P_{DPCCH,y}. \quad \text{Equation (42)}$$

With this example embodiment, the set of supported E-TFCI for each carrier will correspond to the E-TFCIs that can be transmitted by the UE if no data is transmitted in the other carrier. However, since the grant is limited by the virtual grants, which were calculated accounting for the non-scheduled transmissions, then the total transmission power will not exceed the maximum allowed power (unless minimum set E-TFC is used). The WTRU will fill up each carrier according to the non-scheduled grant and available non-scheduled data, according to the virtual grant in order of logical channel priority. The conventional E-TFC selection is then executed on the primary carrier and then on the secondary carrier with the optional restriction that non-scheduled flows may only be mapped on the anchor carrier.

It should be understood that throughout this disclosure, the WTRU may not need to determine or calculate whether the WTRU is power limited and allocate the power according to any of the embodiments described above, by ensuring that the power allocated to each carrier for scheduled transmissions does not exceed the power allowed by the actual serving grant. For example, this may be achieved by taking the minimum between the $SG_z$ and $SG_{input,z}$, or determining the scaling factor to be a minimum of calculated scaling factor and 1.

Embodiments for dual-carrier power back-off and maximum power reduction for multicarrier operations are disclosed hereafter. To relieve the WTRU power amplifier design and power consumption, the WTRU is typically allowed a certain maximum power reduction (MPR). This power reduction margin allows a WTRU implementation to reduce the maximum transmission power (this is also referred to as power back-off) to avoid causing unintended adjacent carrier interference due to power amplifier non-linearity.

Typically, the amount of power back-off depends on the combination of signals being transmitted. Conventionally for single carrier operations, the maximum power reduction allowed for TFC and E-TFC restriction procedures for different cases are specified. When performing E-TFC restriction for example, the maximum transmission power $PMax_j$ is allowed to be reduced by up to the MPR (E-TFC-MPR) amount corresponding to the signal configuration case corresponding to E-TFC j, as shown in Table 2.

TABLE 2

Inputs for E-TFC selection

| | | | | | | E-DPDCH | | E-TFC-MPR |
|---|---|---|---|---|---|---|---|---|
| Case | $\beta_c$ | $\beta_{hs}$ | $\beta_d$ | $\beta_{ec}$ | $\beta_{ed}$ | SFmin | Ncodes | (dB) |
| 1 | >0 | 0 | 0 | >0 | >0 | ≧4 | 1 | 0.25 |
| 2 | >0 | ≧0 | 0 | >0 | >0 | 2 | 4 | 0.50 |
| 3 | >0 | 0 | >0 | >0 | >0 | ≧4 | 1 | 0.75 |
| 4 | >0 | >0 | >0 | >0 | >0 | ≧4 | 1 | 1.50 |
| 5 | >0 | ≧0 | >0 | >0 | >0 | 4 | 2 | 0.75 |
| 6 | >0 | ≧0 | >0 | >0 | >0 | 2 | 2 | 0.50 |

NOTE:
For inputs {$\beta_c$, $\beta_{hs}$, $\beta_d$, $\beta_{ec}$, $\beta_{ed}$, SFmin, Ncodes} not specifed above the E-TFC-MPR (dB) = 0

In accordance with one embodiment, a power back-off may be applied when transmitting on two uplink carriers rather than one. The WTRU determines the amount of data to be transmitted on both carriers according to any of the embodiments described herein, and may apply a power back-off (i.e., reduction in total transmission power or per-carrier transmission power) if data is to be sent on two carriers. The application of a power back-off would then result in the use of a smaller E-TFCI on each carrier. The WTRU may determine whether more data may be sent using a single carrier without power back-off or using two carriers with power back-off, and select the option allowing for transmission of most total number of bits.

For dual-carrier operations, new sets of MPR tables may be defined, or the conventional table for E-TFC restriction may be extended to support additional cases such that all the existing (1-6) or relevant cases in combination with the case where a second DPCCH on the supplementary carrier is present, all the existing (1-6) or relevant cases in combination with the case where a second DPCCH and HS-DPCCH on the supplementary carrier are present, and all the existing (1-6) or relevant cases in combination with the case where a second DPCCH and HS-DPCCH on the supplementary carrier are present in addition to different cases of E-DCH configurations. In the case where no DPDCH is allowed when a WTRU is configured for DC-HSUPA operations, then the first 2 cases in Table 2 become relevant.

In accordance with one embodiment, when performing the E-TFC restriction procedure sequentially, (i.e., the E-TFC restriction procedure for carrier x is carried out before the E-TFC restriction procedure for carrier y), when performing E-TFC restriction for carrier x, the calculation of $PMax_{j,x}$ may take into account, in addition to the channels transmitted in carrier x, an additional power reduction due to the presence of DPCCH and potentially other channels such as the HS-DPCCH on carrier y. This maximum allowed power reduction may be obtained from a new E-TFC-MPR Table 3, for instance. In Table 3, the MPR values X1-X4 are fixed numbers determined for example through simulations or measurements, and when performing E-TFC restriction for the first carrier selected (e.g., when performing E-TFC restriction sequentially) the WTRU determines for each E-TFCi the E-TFC-MPR according to the table and may apply it to the maximum transmit power. Similarly, when performing E-TFC restriction for carrier y, the calculation of $PMax_{j,y}$ may take into account, in addition to the channels transmitted in carrier y, (i.e., DPCCH, E-DPCCH, E-DPDCH, and potentially the HS-DPCCH), an additional power reduction due to the presence of carrier x, for which the actual E-DCH transport format has been selected. This maximum allowed power reduction may be obtained from a new E-TFC-MPR Table 4, for instance.

TABLE 3

Inputs for E-TFC selection

| | Carrier 1 | | | | | Carrier 2 | | E-DPDCH (in Carrier 1) | | E-TFC- |
|---|---|---|---|---|---|---|---|---|---|---|
| Case | $\beta_c$ | $\beta_{hs}$ | $\beta_d$ | $\beta_{ec}$ | $\beta_{ed}$ | $\beta_c$ | $\beta_{hs}$ | SFmin | Ncodes | MPR (dB) |
| 1 | >0 | 0 | 0 | >0 | >0 | 0 | 0 | ≧4 | 1 | 0.25 |
| 2 | >0 | ≧0 | 0 | >0 | >0 | 0 | 0 | 2 | 4 | 0.50 |
| 3* | >0 | 0 | 0 | >0 | >0 | >0 | 0 | ≧4 | 1 | X1 |
| 4* | >0 | ≧0 | 0 | >0 | >0 | >0 | 0 | 2 | 4 | X2 |
| 5* | >0 | 0 | 0 | >0 | >0 | >0 | >0 | ≧4 | 1 | X3 |
| 6* | >0 | ≧0 | 0 | >0 | >0 | >0 | >0 | 2 | 4 | X4 |

NOTE:
For inputs {$\beta_c$, $\beta_{hs}$, $\beta_d$, $\beta_{ec}$, $\beta_{ed}$, SFmin, Ncodes} not specifed above the E-TFC-MPR (dB) = 0

Then for the second carrier the WTRU knows that data will be transmitted on the first carrier (otherwise the second carrier would not be filled with data). In Table 4, the MPR values Y1-Y6 are fixed numbers determined for example through simulations or measurements.

TABLE 4

Inputs for E-TFC selection

| | Carrier 1 | | | | | Carrier 2 | | | | | E-DPDCH | | | | E-TFC- |
|---|---|---|---|---|---|---|---|---|---|---|---|---|---|---|---|
| | | | | | | | | | | | Carrier 1 | | Carrier 2 | | |
| Case | $\beta_c$ | $\beta_{hs}$ | $\beta_d$ | $\beta_{ec}$ | $\beta_{ed}$ | $\beta_c$ | $\beta_{hs}$ | $\beta_d$ | $\beta_{ec}$ | $\beta_{ed}$ | SFmin | Ncodes | SFmin | Ncodes | MPR (dB) |
| 1** | >0 | 0 | 0 | >0 | >0 | >0 | 0 | 0 | >0 | >0 | ≧4 | 1 | ≧4 | 1 | Y1 |
| 2** | >0 | 0 | 0 | >0 | >0 | >0 | 0 | 0 | >0 | >0 | ≧4 | 1 | 2 | 4 | Y2 |
| 3** | >0 | 0 | 0 | >0 | >0 | >0 | >0 | 0 | >0 | >0 | 2 | 4 | ≧4 | 1 | Y3 |
| 4** | >0 | 0 | 0 | >0 | >0 | >0 | >0 | 0 | >0 | >0 | 2 | 4 | 2 | 4 | Y4 |

TABLE 4-continued

| | Inputs for E-TFC selection | | | | | | | | | | | | | |
|---|---|---|---|---|---|---|---|---|---|---|---|---|---|---|
| | | | | | | | | | | | E-DPDCH | | | |
| | Carrier 1 | | | | | Carrier 2 | | | | | Carrier 1 | | Carrier 2 | | E-TFC- |
| Case | $\beta_c$ | $\beta_{hs}$ | $\beta_d$ | $\beta_{ec}$ | $\beta_{ed}$ | $\beta_c$ | $\beta_{hs}$ | $\beta_d$ | $\beta_{ec}$ | $\beta_{ed}$ | SFmin | Ncodes | SFmin | Ncodes | MPR (dB) |
| 5** | >0 | >0 | 0 | >0 | >0 | >0 | 0 | 0 | >0 | >0 | ≧4 | 1 | ≧4 | 1 | Y5 |
| 6** | >0 | >0 | 0 | >0 | >0 | >0 | 0 | 0 | >0 | >0 | 2 | 4 | 2 | 4 | Y6 |

NOTE:
For inputs {$\beta_c$, $\beta_{hs}$, $\beta_d$, $\beta_{ec}$, $\beta_{ed}$, SFmin, Ncodes} not specifed above the E-TFC-MPR (dB) = 0

When a WTRU is configured for DC-HSUPA operations, E-TFC selection and thus E-TFC restriction may be carried out for a single transport block when for example there is a re-transmission on a carrier and the other carrier is free. In such cases, the MPR for E-TFC restriction may be based on a similar procedure but starting with the MPR calculation for carrier 2 (as data is already being sent on carrier 1). An E-TFC-MPR table such as the one shown in Table 4 may be used for this purpose.

In another embodiment, a fixed MPR offset may be applied to the values in the conventional tables when data or control information is being transmitted over a second carrier. More specifically, this fixed DC-HSUPA-MPR value (in dB) may be added to the E-TFC-MPR value calculated for each carrier individually when carrying out E-TFC restriction. For example, the WTRU may calculate the MPR as follows. If DC-HSUPA is activated and E-TFC selection is carried out, for each carrier and each E-TFCI, the WTRU may calculate a first "single-carrier MPR" according to the E-TFC restriction legacy procedure (e.g., using Table 2). For each carrier, the WTRU then adds the DC-HSUPA-MPR value to this single-carrier MPR value calculated above. For each carrier, the WTRU then uses this total MPR in the calculation of the maximum power for that carrier.

In another example, where for example the E-TFC restriction is carried out sequentially, the WTRU may calculate the MPR as follows. In calculating the MPR for the first carrier to which E-TFC restriction is applied the WTRU calculates first a "single-carrier MPR" according to the E-TFC restriction legacy procedure, (e.g., using Table 2). Optionally, the WTRU adds the DC-HSUPA-MPR value to this single-carrier MPR value calculated. Optionally, the WTRU adds the DC-HSUPA-MPR value to this single-carrier MPR value calculated if one or more of the following conditions are met (in any order or combination): (1) the power of the DPCCH on the other carrier is non-zero or will be non-zero for at least one of the slot in the upcoming TTI, or (2) the HS-DPCCH is being or will be transmitted on the other carrier.

In calculating the MPR for the second carrier to which E-TFC restriction is applied the WTRU may calculate first a "single-carrier" MPR according to the E-TFC restriction legacy procedure (e.g., using Table 2). Optionally, the WTRU adds the DC-HSUPA-MPR value to this single-carrier MPR value calculated. Optionally, the WTRU adds the DC-HSUPA-MPR to this single-carrier MPR value calculated if one or more of the following conditions are met (in any order or combination): (1) the power of the E-DPDCH (and the E-DPCCH) on the first carrier is non-zero, (2) the power of the E-DPDCH on the first carrier is above a threshold, where the WTRU receives the value of this threshold via higher layer signaling or the value of the threshold is pre-configured, (3) the number of channelization codes of the E-DPDCH on the first carrier is larger than or equal to a given value, where this value is signaled by the network or pre-configured in the specifications, (4) the smallest spreading factor used on the first carrier E-DPDCH is smaller than or equal to a pre-configured value, (5) or the first carrier has non-zero power on the HS-DPCCH.

In another embodiment, the WTRU may use the legacy or conventional E-TFC restriction procedure with MPR when a single carrier is activated and when more than one carrier is activated the WTRU may use a fixed MPR value. Alternatively, the WTRU may use a fixed MPR when two carriers are activated and E-DCH transmission occurs on both carriers. Otherwise, the WTRU applies the MPR based on the legacy procedure calculated using the carrier with E-DCH transmission and no additional MPR is taken into considerations for the other carrier. Alternatively, the WTRU may use a fixed MPR when two carriers are activated and more than one physical channel is being transmitted on each carrier. Otherwise, the WTRU applies the MPR based on the legacy procedure calculated using the carrier with E-DCH transmission and no additional MPR is taken into considerations for the other carrier. Alternatively, the WTRU may use a fixed MPR when two carriers are activated and at least the DPCCH is transmitted on each carrier simultaneously. Otherwise, the WTRU applies the MPR based on the legacy procedure calculated using the carrier with E-DCH transmission and no additional MPR is taken into considerations for the other carrier. The fixed MPR value may correspond to the largest MPR value in Table 2. The WTRU may pre-calculate the MPR for all relevant E-TFCI and carrier combinations.

When power reduction is applied for E-TFC$_{j,z}$, where z=x or z=y, the value of $P_{MAX}$ is reduced by the amount of power back-off for the E-TFCj and carrier x or y. The maximum WTRU transmitter power becomes as follows:

Maximum WTRU transmitter power (in dBm)=
MIN{Maximum allowed UL TX Power (in dBm), $P_{MAX,dBm} - P_{BACKOFF,j,z}$}, Equation (43)

where Maximum allowed UL TX power is set by UTRAN, $P_{MAX,dBm}$ is the WTRU nominal maximum transmit power is defined by the WTRU power class (in dBm), and $P_{BACKOFF,j,z}$ is the amount of power backoff applied for E-TFCj and carrier z=x or z=y (in dB).

The scheduling information (SI) may be modified such that it provides the UL power headroom measurement for each carrier individually. More specifically, the format of the SI may be expanded to include UPH for the supplementary carrier, as shown in FIG. 11, where UPH1 and UPH2, correspond to the ratio of the maximum WTRU transmission power and the corresponding anchor and supplementary DPCCH code power, respectively.

Alternatively, the WTRU may report one UPH measurement, and the Node-B may infer the UPH of the other carrier based on the noise rise difference between the carriers.

Alternatively, a single UPH may be calculated and reported as:

$$UPH = P_{max,tx}/(i\, P_{DPCCH1} + P_{DPCCH2})' \qquad \text{Equation (44)}$$

where $P_{max,tx}$ is the total maximum output power that may be transmitted by the WTRU and $P_{DPCCH1}$ and $P_{DPCCH2}$ represent the transmitted code power on DPCCH of carrier 1 and carrier 2, respectively. In the case where per-carrier maximum transmission powers are configured, then $P_{max,tx}$ represents the sum of the per-carrier maximum transmission powers.

Alternatively, the scheduling information format remains unchanged, but the WTRU may report the SI individually in each carrier. For instance, if the SI is sent over the anchor carrier it reports the UPH of the anchor carrier, and if it sent over the supplementary carrier it reports the UPH of the supplementary carrier.

When performing the E-TFC restriction procedure, the WTRU needs to calculate the E-DPDCH and E-DPCCH gain factor (in case E-DPCCH power boosting is configured) for each E-TFCI and each HARQ offset configured. These gain factors depends on a set of parameters configured by the network. The WTRU may receive a configuration message enabling the calculation of these gain factors. The configuration message includes at least one or more of the following parameters: a set of reference E-TFCIs, E-DPDCH power offsets, a HARQ offset for each MAC-d flow configured, $E\text{-}TFCI_{ec,boost}$ indicating the E-TFCI above which E-DPCCH power boosting will be applied, a gain factor for E-DPCCH, traffic to total pilot power (for E-DPCCH power boosting), etc. Every time the WTRU requires the gain factor for a given E-TFCI, the WTRU uses the power interpolation or extrapolation formula and potentially the E-DPCCH power boosting formula to calculate the gain factor.

Alternatively, the WTRU may pre-calculate for each of the E-TFCIs the gain factor required for all HARQ offsets configured or all MAC-d flow. The WTRU stores the resulting power offsets for future use (e.g., every time E-TFC restriction is executed). When the WTRU requires a set of power offsets for a given HARQ offset and E-TFCI, the WTRU may look-up the requested value in the pre-calculated table. This approach may be used for any of the E-TFC restriction/selection procedures described above.

In this invention, the WTRU may pre-calculate the set of supported E-TFCIs for every HARQ offset ahead of the time these values are required in the E-TFC selection procedure. For example, the set of supported E-TFCIs for each HARQ offset configured may be calculated and stored in memory at the beginning of every TTI, independently for each carrier. When needed by the E-TFC selection procedure the WTRU may then read the desired set of values from the WTRU memory. Thus when referring to the execution of the E-TFC restriction procedure in this invention, it should be understood that in many cases the actual computations of the set of supported E-TFCIs may have already been carried out (e.g.: at the TTI boundary) and thus the execution of the E-TFC restriction may refer to the WTRU reading the set of supported E-TFCIs from memory.

In other embodiments, modulation schemes may be optimized across multiple carriers. For purposes of describing these embodiments, reference will be made to 16 quadrature amplitude modulation (16QAM) and quadrature phase shift keying (QPSK). Various 16QAM and QPSK scenarios as well as E-DPCCH boosting are disclosed hereafter. For the sequential approaches described herein, the WTRU may select one of the carriers to fill up with data first. In a situation where the WTRU is power limited and the grant on that carrier is large enough to allow the transmission of data using 16QAM or E-DPCCH boosting, data transmission may be inefficient if 16QAM is used in one carrier and not enough power remains on the other carrier. In one embodiment, for example, it may be more efficient in terms of data transmission and power utilization to transmit on two carriers using QPSK than to transmit 16QAM in one carrier only. Indeed, as higher order modulation typically requires more energy per bit than lower-order modulations it may be more energy efficient for the WTRU to use 16QAM only when the largest E-TFC which uses QPSK is used on both carriers and the WTRU has sufficient power and grant to transmit additional data. Doing so may not only improve the WTRU battery life but also improve the network capacity for a given user experience.

By way of further example, in another embodiment, the WTRU may not use 16QAM when the WTRU is power-limited. For example, when the WTRU is power-limited, two carriers filled with QPSK may carry more data than one carrier with 16QAM and potentially another carrier with QPSK or binary phase shift keying (BPSK). Furthermore, the latter configuration, of one carrier with 16QAM and another carrier with QPSK or BPSK may consume additional WTRU battery power, and reduce the throughput of WTRU and reduce network capacity.

In yet another embodiment, the WTRU may be configured not to use 16QAM when the WTRU is buffer-limited. It may be more operationally efficient for the WTRU to empty its buffer with two carriers filled with QPSK instead of a single carrier with 16QAM or one carrier with 16QAM and another carrier with QPSK or BPSK. This would improve battery life and increase network capacity.

In accordance with one embodiment, the WTRU may perform an E-TFC selection procedure for DC-HSUPA at least twice (i.e., E-TFC restriction procedures for DC-HSUPA are executed twice). In a first tentative E-TFC selection procedure, the WTRU calculates the E-TFC by not allowing E-TFCIs that are known to require 16QAM operations. This additional restriction may be carried out for example during the E-TFC restriction procedure for each carrier such that these E-TFCIs would appear blocked to the E-TFC selection procedure. The WTRU may then record the two transport block sets (TBSs) that result from the E-TFC selection procedures (one per carrier), record the total number of data bits (or optionally data bits in addition to header bits and/or padding bits) that would be transmitted across the two carriers, and create the PDUs corresponding to these TBSs.

In a second tentative E-TFC selection procedure, the WTRU calculates the E-TFC with no further restriction on the E-TFCIs. This is achieved by executing the regular E-TFC restriction procedure. The WTRU may then record the two TBSs that result from the E-TFC selection procedures (one per carrier), record the total number of data bits (or optionally data bits in addition to header bits and/or padding bits) that would be transmitted across the two carriers, and create the PDUs corresponding to these TBS.

The WTRU then compares the total number of bits that would be transmitted for each procedure (either using the sum of TBS selected or the total number of data bits as calculated above) and selects the tentative E-TFCs that amount to the largest number of bits in total. The WTRU then may create and transmit the MAC PDUs. If the PDUs were created in advance, the WTRU may transmit the pair of PDUs that correspond to the largest aggregate number of bits and discard the other two PDUs.

In accordance with another embodiment, the E-TFC restriction procedure may be updated to restrict the WTRU from utilizing 16QAM in one carrier only.

This restriction may be applied when one or a combination of the following conditions are true:

(1) The WTRU shared available headroom is below a threshold, where the headroom here may be an averaged headroom (e.g., UPH) or an instantaneous headroom;

(2) The NRPM is below a threshold;

(3) The WTRU shared available headroom is below a threshold and the grant of one or the first selected carrier is above a threshold;

(4) The grant on the first selected carrier is greater than shared available headroom or the NRPM; or (5) The sum of the grants is larger than a threshold and the grant on one of the carriers is above a threshold.

The threshold described above may be predefined in the WTRU or configured by the network or determined by the WTRU based on other configured values.

Alternatively, this restriction may be applied and performed consecutively. When one of the conditions described above is met the WTRU may attempt to disallow 16QAM or E-DPCCH boosting in one carrier only. The E-TFC restriction may be performed for the first selected carrier. When E-TFC restriction is performed the WTRU may block the range of E-TFCI that would result in the WTRU transmitting using 16QAM or E-DPCCH boosting. The E-TFC restriction function may determine which E-TFCIs to block using one or a combination of the following criteria:

(1) All E-TFCIs greater than or equal to E-TFCI$_{boost}$;

(2) All E-TFCIs greater than or equal to the E-TFCI that would trigger the WTRU to use 16QAM. This value may be calculated and determined by the WTRU initially;

(3) An E-TFCI to use for blocking may be configured by the network; or (4) The WTRU block all E-TFCIs above certain number of bits, (e.g., 1000 bits).

The E-TFC selection is performed according to the allowed grant and supported E-TFCIs and the first carrier is filled up with data according to this value and the relevant E-TFC selection procedure. The WTRU then proceeds to the second carrier and runs E-TFC restriction for the second carrier. The E-TFC restriction procedure for the second carrier may also block the E-TFCIs as described above. Once the second carrier is filled up according to the supported E-TFCIs and the allowed grants, the WTRU may stop the E-TFC selection procedure, or alternatively go back to the first selected carrier if power and grant still remains. When E-TFC restriction is run for the second time no E-TFCI that make use of 16QAM or E-DPCCH boost are blocked, unless not allowed by power as the normal E-TFC restriction procedure. Alternatively, the WTRU just performs normal E-TFC selection. The WTRU may also go back to the second carrier again if power still remains. This procedure requires iterative E-TFC selection procedure and may increase complexity. However, if this procedure is performed when the criteria described above is met, the WTRU may not need to do iterative processes.

Alternatively, when the E-TFC restriction is run on the second carrier, the WTRU may not block any of the above mentioned E-TFCIs. This way if the WTRU has enough power and grant it may transmit more data. Once the second carrier is filled up this way, the E-TFC selection procedure may end, or alternatively the WTRU may try to continue filling up the initial carrier if power, grant and data remains.

Embodiments for considering power imbalance are described hereafter. When two carriers are being transmitted with large power imbalance, the signal-to-noise ratio (SNR) of the carrier with the smaller power may be deteriorated by the presence of the other carrier. When a carrier suffers from adjacent carrier interference (e.g., due to a power imbalance) the SIR measured at the Node-B is reduced due to the reduction of SIR at the transmitter. The problems incurred from a large power imbalance may be mitigated as part of the E-TFC selection and E-TFC restriction procedure.

In accordance with one embodiment, the occurrence of power imbalance between the two carriers may be reduced by further restricting the set of supported E-TFCs during the E-TFC restriction procedure such that the resulting power imbalance is maintained within a specific limit or threshold. This may be accomplished, for example, by reducing the effective PMax$_j$ in the NRPM$_j$ calculation in the E-TFC restriction procedure.

Alternatively, the WTRU may estimate the normalized remaining power margin available for E-TFC selection based on the following equation for E-TFC candidate j:

$$\text{NRPM}_j = (P\text{Max}_j - P_{imbalance,j} - P_{DPCCH,target} - P_{DPDCH} - P_{HS\text{-}DPCCH} - P_{E\text{-}DPCCH,j})/P_{DPCCH,target}; \quad \text{Equation (45)}$$

where it is assumed that PMax$_j$ represents the remaining maximum power for a given carrier. PMaxj may include the contribution of the channels being transmitted over the other carrier, if applicable. The parameter P$_{imbalance,j}$ may be configured by the network or calculated by the WTRU.

In order to simplify WTRU operation, a power imbalance situation may be considered to occur when the difference between the total transmit power (including all channels) and the transmit DPCCH power in the other carrier is larger than a threshold (P$_{Thresh}$). The WTRU chooses one of the carriers to fill up first (carrier x corresponds to the highest priority carrier (i.e., first carrier to be filled up) and carrier y corresponds to the second carrier to be filled up if power or grant remains).

For each E-TFC candidate j, the WTRU may calculate the total transmission power for E-TFC$_j$ for carrier z (where z is the carrier index x or y) as follows:

$$P_{tot,z,j} = P_{DPCCH,target\ z} + P_{HS\text{-}DPCCH} + P_{E\text{-}DPCCH,z,j} + P_{E\text{-}DPDCH,z,j}. \quad \text{Equation (46)}$$

P$_{HS\text{-}DPCCH}$ is taken into account when carrier z corresponds to the anchor carrier or the carrier in which HS-DPCCH is being transmitted.

If $|P_{tot,z,j} - P_{DPCCH,target\ k}| > P_{Thresh}$:

Then $P_{imbalance,j,z} = |P_{tot,z,j} - P_{DPCCH,target\ k}| - P_{Thresh}$;

else $P_{imbalance,j,z} = 0$ k is the carrier index where k≠z (e.g., if z is carrier x then k represents carrier y and vice versa).

NRPM for carrier x is computed as follows:

$$\text{NRPM}_{j,x} = (P\text{Max}_{j,x} - P_{DPCCH,target\ x} - P_{DPCCH,target\ y} - P_{DPDCH,x,y} - P_{HS\text{-}DPCCH,x,y} - P_{E\text{-}DPCCH,j,x} - P_{imbalance,j,x})/P_{DPCCH,\ target\_x}. \quad \text{Equation (47)}$$

Optionally, P$_{imbalance,j,z}$ may be taken into account if it is greater than zero and the above conditions are met. If P$_{imbalance,j,z}$ is less than zero then P$_{imbalance,j,z}$ may be set to zero or equivalently not taken into account in the NRPM calculations.

P$_{thresh}$ may be configured by the network, determined by the WTRU, or, calculated based on specific device designs or requirements. The P$_{thresh}$ may be a static number or alternatively, may dynamically change based on the candidate E-TFC j.

The WTRU then chooses the supported E-TFC according to the NRPM for carrier x. Since the power imbalance is taken into account in the NRPM, the supported E-TFC(s) will include the E-TFC for which no power imbalance issues will result.

The same power imbalance check may be performed for carrier y once E-TFC selection is performed in carrier x or if a retransmission is ongoing in carrier x. If a retransmission is ongoing on carrier x, no E-TFC selection will be performed for carrier x, but the power of the retransmission in carrier x is taken into account in the E-TFC restriction of carrier y.

More specifically, the $NRPM_{j,y}$ is calculated as follows:

$$NRPM_{j,y} = (PMax_{j,y} - P_{DPCCH,target\,x} - P_{DPCCH,target\,y} - P_{DPDCH,x,y} - P_{HS-DPCCH,x,y} - P_{E-DPCCH,x} - P_{E-DPDCH,x} - P_{E-DPCCH,j,y} - P_{imbalance,j,y}) / P_{DPCCH,target\,y};$$

Equation (48)

where $P_{imbalance,j,y}$ may be equivalently calculated as described above, where z=y and k=x, and $P_{E-DPDCH,z,j}$ is an estimated E-DPDCH transmit power for the $E-TFCI_j$ determined for carrier z.

Alternatively, the WTRU may consider a power imbalance if the difference between the total transmitted power $P_{tot,y}$ and the total transmitted power in carrier x $P_{tot,x}$ is greater than a threshold, $P_{thresh}$.

Optionally, if a retransmission in carrier x is ongoing and the power in carrier x is too high with respect to the determined power in carrier y, or vice versa, the E-TFC selection may take this into account and alleviate the problem by padding. This situation may occur if the WTRU is buffer limited and there is enough grant and power available in the other carrier. More specifically, if the difference of total power between the two carriers ($P_{diff}$) is greater than $P_{thresh}$, the WTRU may fill up the difference ($P_{thresh} - P_{diff}$) with padding bits.

Some additional examples cases of sequential E-TFC restriction procedures are described hereafter. The WTRU may transmit DPCCH in both carriers every TTI. Alternatively, the WTRU may optimize power consumption by not transmitting DPCCH in both carriers in the same TTI if certain conditions are satisfied. When no E-DCH data is transmitted in one of the carriers it may be beneficial that the WTRU does not transmit DPCCH on that carrier. In this case, the WTRU may transmit DPCCH on that carrier according to a configured cycle or according to an inactivity period (i.e., period in which no data is transmitted in one of the carriers). This will avoid long periods of DPCCH silence. For instance, after x TTIs of silence periods the WTRU may transmit a DPCCH burst to allow for proper power control.

A WTRU selects a carrier to treat first according to one of the embodiments for carrier selection described above. The carriers are identified as x and y, where x is the carrier selected first and y is the other carrier and x does not necessarily correspond to the anchor carrier.

The WTRU determines whether the WTRU is required to transmit DPCCH and/or HS-DPCCH on both carriers or on a single carrier. The WTRU may determine whether any of the control channels have to be transmitted on both carriers or not based on one or any combination of the following: whether the WTRU is scheduled for a DPCCH burst on that TTI on both carriers (i.e., according to the DTX cycles on each carrier); whether the WTRU behaviour allows the WTRU not to transmit DPCCH when no E-DCH data is transmitted or when no HS-DPCCH is transmitted on that carrier; whether the WTRU has to transmit HS-DPCCH on both carriers; or when the WTRU has chosen one of the carriers to transmit E-DCH data based on one of the embodiments described above, whether a DPCCH or HS-DPCCH is required on the remaining carrier.

If it is determined that no DPCCH or HS-DPCCH is necessarily required on carrier y, the WTRU may perform E-TFC restriction procedure for carrier x where the $NRPM_{j,x}$ is equivalent to:

$$NRPM_{j,x} = (PMax_{j,x} - P_{DPCCH,target\,x} - P_{DPDCH,x} - P_{HS-DPCCH,x} - P_{E-DPCCH,j,x}) / P_{DPCCH,target\,x}.$$

Equation (49)

In equation (49), if DPDCH is not allowed in carrier x or if no DPDCH is scheduled for transmission, the $P_{DPDCH,x}$ may not be taken into account.

If DPDCH is being transmitted in carrier y and carrier x is selected first for E-DCH transmission:

$$NRPM_{j,x} = (PMax_{j,x} - P_{DPCCH,target\,x} - P_{DPDCH,y} - P_{DPCCH,target\,y} - P_{HS-DPCCH,x} - P_{E-DPCCH,j,x}) / P_{DPCCH,target\,x}.$$

Equation (50)

Based on E-TFC selection and E-TFC restriction the WTRU determines the number of bits that may be transmitted on the selected carrier x, according to the available remaining power determined based on the above NRPM, the available serving grant for that carrier and the non-scheduled grant. A MAC-i PDU for carrier x may then be created or an E-TFCI may be determined.

The WTRU then performs E-TFC restriction procedure for carrier y, where $NRPM_{j,y}$ may be determined as follows:

$$NRPM_{j,y} = (PMax_{j,y} - P_{DPCCH,target\,x} - P_{DPDCHx/y} - P_{HS-DPCCHx/y} - P_{E-DPCCH,j,x} - P_{E-DPDCH,x} - P_{DPCCH,target\,y} - P_{HS-DPCCHy} - P_{E-DPCCH,j,y} - P_{backoff}) / P_{DPCCH,target\,y}.$$

Equation (51)

$P_{backoff}$ (maximum power reduction) may be subtracted explicitly in the NRPM calculation as shown in equation (51) or it may be taken into account in the determined value of $Pmax_{j,y}$, which will be explained below. The value may be a static value, or alternatively may depend on a number of factors and resources used in the additional carrier.

The WTRU may then determine whether E-DCH data may be transmitted in carrier y. The WTRU may determine not to transmit E-DCH on carrier y in one or a combination of conditions that the NRPMy is below a configured threshold, the largest supported E-TFC as obtained from the E-TFC restriction procedure is smaller than or equal to the largest E-TFC of the minimum E-TFC set, the determined "Maximum Supported Payload" (from the E-TFC restriction procedure) is below a configured threshold, the minimum value between the remaining scheduled grant payload and the maximum supported payload for carrier y is below a configured or predetermined threshold, and/or the remaining scheduled grant payload for carrier y is below a configured or predetermined threshold, etc. If the WTRU is transmitting E-DCH in the new carrier, the DPCCH transmission also has to take place in that TTI.

If the WTRU determines that a DPDCH and/or HS-DPCCH needs to be transmitted on carrier y the following calculation may be performed for $NRPM_{j,x}$:

$$NRPM_{j,x} = (PMax_{j,x} - P_{DPCCH,target\,x} - P_{DPDCH,x} - P_{HS-DPCCH,x} - P_{E-DPCCH,j,x} - P_{DPDCH,y} - P_{HS-DPCCH,y} - P_{backoff}) / P_{DPCCH,target\,x}.$$

Equation (52)

The above equation (52) affects the maximum supported payload x determined as part of E-TFC restriction. This formulation of $NRPM_{j,x}$ in equation (52) may be used for both cases, wherein if the WTRU determines that no DPCCH or no HS-DPCCH is being transmitted the corresponding powers are not taken into account. $P_{backoff}$ corresponds to the additional power losses incurred if the WTRU transmits on both carriers, (e.g., due to power restriction for maintaining linearity at the transmitter). This value may be a constant or may depend on other factors. The NRPM calculations described above are scaled accordingly if the TTI for which the procedure is being performed corresponds to a compressed mode gap.

If a retransmission is ongoing in one of the carriers (i.e., carrier x) then E-TFC selection and E-TFC restriction is done for the remaining carrier y, where:

$$NRPM_{j,y} = (PMax_{j,y} - P_{DPCCH,target\,x} - P_{DPDCH,x/y} - P_{HS-DPCCH,x/y} - P_{E-DPCCH,j,x} - P_{E-DPDCH,j,x} - P_{DPCCH,target\,y} - P_{HS-DPCCH,y} - P_{E-DPCCH,j,y} - P_{backoff})/P_{DPCCH,target\,y}$$

Equation (53)

Although features and elements are described above in particular combinations, each feature or element can be used alone without the other features and elements or in various combinations with or without other features and elements. The methods or flow charts provided herein may be implemented in a computer program, software, or firmware incorporated in a computer-readable storage medium for execution by a general purpose computer or a processor. Examples of computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine.

A processor in association with software may be used to implement a radio frequency transceiver for use in a wireless transmit receive unit (WTRU), user equipment (UE), terminal, base station, radio network controller (RNC), or any host computer. The WTRU may be used in a autonomous environment such as a sensor network or machine-to-machine network environment, or the WTRU may be used in conjunction with other modules, implemented in hardware and/or software, such as a camera, a video camera module, a videophone, a speakerphone, a vibration device, a speaker, a microphone, a television transceiver, a hands free headset, a keyboard, a Bluetooth® module, a frequency modulated (FM) radio unit, a liquid crystal display (LCD) display unit, an organic light-emitting diode (OLED) display unit, a digital music player, a media player, a video game player module, an Internet browser, and/or any wireless local area network (WLAN) or Ultra Wide Band (UWB) module.

What is claimed is:

1. A method implemented in a wireless transmit/receive unit (WTRU) for uplink transmission using multiple uplink carriers, the method comprising:
   determining that more than one uplink carrier is activated;
   determining that a first uplink carrier is associated with a retransmission and a second uplink carrier is associated with a transmission;
   calculating a remaining power associated with the transmission by subtracting from a maximum allowed transmit power a power required for a dedicated physical control channel (DPCCH) power for each uplink carrier, a power required for a high speed dedicated physical control channel (HS-DPCCH), a power required for an enhanced dedicated channel (E-DCH) dedicated physical data channel (E-DPDCH) for the retransmission, and a power required for an E-DCH dedicated physical control channel (E-DPCCH) for the retransmission;
   calculating a normalized remaining power margin by:
   subtracting from the remaining power a power required for an E-DCH dedicated physical control channel (E-DPCCH) for the second uplink carrier, and
   dividing a result by a power required for a dedicated physical control channel (DPCCH) associated with the second uplink carrier; and
   performing an E-DCH transport format combination (E-TFC) selection.

2. The method of claim 1, wherein the subtraction from the remaining power provides the result.

3. The method of claim 1, wherein the normalized remaining power margin is available for the E-TFC selection for an E-TFC candidate j.

4. The method of claim 1, wherein the E-TFC selection relates to the transmission.

5. A wireless transmit/receive unit (WTRU) for uplink transmission using multiple uplink carriers, the WTRU comprising:
   a processor configured to:
   determine that more than one uplink carrier is activated;
   determine that a first uplink carrier is associated with a retransmission and a second uplink carrier is associated with a transmission;
   calculate a remaining power associated with the transmission by subtracting from a maximum allowed transmit power a power required for a dedicated physical control channel (DPCCH) power for each uplink carrier, a power required for a high speed dedicated physical control channel (HS-DPCCH), a power required for an enhanced dedicated channel (E-DCH) dedicated physical data channel (E-DPDCH) for the retransmission, and a power required for an E-DCH dedicated physical control channel (E-DPCCH) for the retransmission;
   calculate a normalized remaining power margin by being further configured to:
   subtract from the remaining power a power required for an E-DCH dedicated physical control channel (E-DPCCH) for the second uplink carrier, and
   divide a result by a power required for a dedicated physical control channel (DPCCH) associated with the second uplink carrier; and
   perform an E-DCH transport format combination (E-TFC) selection.

6. The WTRU of claim 5, wherein the subtraction from the remaining power provides the result.

7. The WTRU of claim 5, wherein the normalized remaining power margin is available for the E-TFC selection for an E-TFC candidate j.

8. The WTRU of claim 5, wherein the E-TFC selection relates to the transmission.

* * * * *